(12) United States Patent
Chtchetinine et al.

(10) Patent No.: US 8,692,768 B2
(45) Date of Patent: Apr. 8, 2014

(54) INTERACTIVE INPUT SYSTEM

(75) Inventors: Alex Chtchetinine, Calgary (CA);
David E. Holmgren, Calgary (CA);
Brinda Kabada, Calgary (CA); Grant McGibney, Calgary (CA); Daniel McReynolds, Calgary (CA); Yun Zhang, Calgary (CA); Ye Zhou, Calgary (CA)

(73) Assignee: SMART Technologies ULC (CA)

( * ) Notice: Subject to any disclaimer, the term of this patent is extended or adjusted under 35 U.S.C. 154(b) by 459 days.

(21) Appl. No.: 12/501,088

(22) Filed: Jul. 10, 2009

(65) Prior Publication Data
US 2011/0006981 A1    Jan. 13, 2011

(51) Int. Cl.
*G06F 3/033* (2013.01)

(52) U.S. Cl.
USPC .......................................... 345/157; 345/173

(58) Field of Classification Search
USPC ................................ 345/156–157, 173–178; 178/18.01–18.11
See application file for complete search history.

(56) References Cited

U.S. PATENT DOCUMENTS

| | | |
|---|---|---|
| 4,107,522 A | 8/1978 | Walter |
| 4,144,449 A | 3/1979 | Funk et al. |
| 4,247,767 A | 1/1981 | O'Brien et al. |
| 4,507,557 A | 3/1985 | Tsikos |
| 4,558,313 A | 12/1985 | Garwin et al. |
| 4,672,364 A | 6/1987 | Lucas |
| 4,737,631 A | 4/1988 | Sasaki et al. |
| 4,742,221 A | 5/1988 | Sasaki et al. |
| 4,746,770 A | 5/1988 | McAvinney |
| 4,762,990 A | 8/1988 | Caswell et al. |
| 4,782,328 A | 11/1988 | Denlinger |
| 4,818,826 A | 4/1989 | Kimura |
| 4,820,050 A | 4/1989 | Griffin |
| 4,822,145 A | 4/1989 | Staelin |
| 4,831,455 A | 5/1989 | Ishikawa |
| 4,868,912 A | 9/1989 | Doering |
| 4,980,547 A | 12/1990 | Griffin |
| 5,025,314 A | 6/1991 | Tang et al. |
| 5,097,516 A | 3/1992 | Amir |
| 5,109,435 A | 4/1992 | Lo et al. |

(Continued)

FOREIGN PATENT DOCUMENTS

| | | |
|---|---|---|
| CA | 2412878 | 1/2002 |
| CA | 2493236 | 12/2003 |

(Continued)

OTHER PUBLICATIONS

International Search Report for PCT/CA2008/001350 mailed Oct. 17, 2008 (5 Pages).

(Continued)

*Primary Examiner* — Amare Mengistu
*Assistant Examiner* — Stacy Khoo
(74) *Attorney, Agent, or Firm* — Katten Muchin Rosenman LLP

(57) ABSTRACT

A method for resolving ambiguities between at least two pointers in a plurality of input regions defining an input area of an interactive input system. The method includes capturing images of the plurality of input regions, the images captured by a plurality of imaging devices having a field of view of at least a portion of the input area, processing image data from the images to identify a plurality of targets for the at least two pointers within the input area, and analyzing the plurality of targets to resolve a real location associated with each pointer.

14 Claims, 40 Drawing Sheets

(56) References Cited

U.S. PATENT DOCUMENTS

| | | |
|---|---|---|
| 5,130,794 A | 7/1992 | Ritchey |
| 5,140,647 A | 8/1992 | Ise et al. |
| 5,162,618 A | 11/1992 | Knowles |
| 5,168,531 A | 12/1992 | Sigel |
| 5,196,835 A | 3/1993 | Blue et al. |
| 5,239,373 A | 8/1993 | Tang et al. |
| 5,317,140 A | 5/1994 | Dunthorn |
| 5,359,155 A | 10/1994 | Helser |
| 5,374,971 A | 12/1994 | Clapp et al. |
| 5,414,413 A | 5/1995 | Tamaru et al. |
| 5,448,263 A | 9/1995 | Martin |
| 5,483,261 A | 1/1996 | Yasutake |
| 5,483,603 A | 1/1996 | Luke et al. |
| 5,484,966 A | 1/1996 | Segen |
| 5,490,655 A | 2/1996 | Bates |
| 5,502,568 A | 3/1996 | Ogawa et al. |
| 5,525,764 A | 6/1996 | Junkins et al. |
| 5,528,263 A | 6/1996 | Platzker et al. |
| 5,528,290 A | 6/1996 | Saund |
| 5,537,107 A | 7/1996 | Funado |
| 5,554,828 A | 9/1996 | Primm |
| 5,581,276 A | 12/1996 | Cipolla et al. |
| 5,581,637 A | 12/1996 | Cass et al. |
| 5,594,469 A | 1/1997 | Freeman et al. |
| 5,594,502 A | 1/1997 | Bito et al. |
| 5,617,312 A | 4/1997 | Iura et al. |
| 5,638,092 A | 6/1997 | Eng et al. |
| 5,670,755 A | 9/1997 | Kwon |
| 5,686,942 A | 11/1997 | Ball |
| 5,729,704 A | 3/1998 | Stone et al. |
| 5,734,375 A | 3/1998 | Knox et al. |
| 5,736,686 A | 4/1998 | Perret, Jr. et al. |
| 5,737,740 A | 4/1998 | Henderson et al. |
| 5,745,116 A | 4/1998 | Pisutha-Arnond |
| 5,764,223 A | 6/1998 | Chang et al. |
| 5,771,039 A | 6/1998 | Ditzik |
| 5,790,910 A | 8/1998 | Haskin |
| 5,801,704 A | 9/1998 | Oohara et al. |
| 5,818,421 A | 10/1998 | Ogino et al. |
| 5,818,424 A | 10/1998 | Korth |
| 5,819,201 A | 10/1998 | DeGraaf |
| 5,825,352 A | 10/1998 | Bisset et al. |
| 5,831,602 A | 11/1998 | Sato et al. |
| 5,911,004 A | 6/1999 | Ohuchi et al. |
| 5,914,709 A | 6/1999 | Graham et al. |
| 5,920,342 A | 7/1999 | Umeda et al. |
| 5,936,615 A | 8/1999 | Waters |
| 5,943,783 A | 8/1999 | Jackson |
| 5,963,199 A | 10/1999 | Kato et al. |
| 5,982,352 A | 11/1999 | Pryor |
| 5,988,645 A | 11/1999 | Downing |
| 6,002,808 A | 12/1999 | Freeman |
| 6,008,798 A | 12/1999 | Mato, Jr. et al. |
| 6,031,531 A | 2/2000 | Kimble |
| 6,061,177 A | 5/2000 | Fujimoto |
| 6,075,905 A | 6/2000 | Herman et al. |
| 6,100,538 A | 8/2000 | Ogawa |
| 6,104,387 A | 8/2000 | Chery et al. |
| 6,118,433 A | 9/2000 | Jenkin et al. |
| 6,122,865 A | 9/2000 | Branc et al. |
| 6,128,003 A | 10/2000 | Smith et al. |
| 6,141,000 A | 10/2000 | Martin |
| 6,147,678 A | 11/2000 | Kumar et al. |
| 6,153,836 A | 11/2000 | Goszyk |
| 6,161,066 A | 12/2000 | Wright et al. |
| 6,179,426 B1 | 1/2001 | Rodriguez, Jr. et al. |
| 6,188,388 B1 | 2/2001 | Arita et al. |
| 6,191,773 B1 | 2/2001 | Maruno et al. |
| 6,208,329 B1 | 3/2001 | Ballare |
| 6,208,330 B1 | 3/2001 | Hasegawa et al. |
| 6,209,266 B1 | 4/2001 | Branc et al. |
| 6,226,035 B1 | 5/2001 | Korein et al. |
| 6,229,529 B1 | 5/2001 | Yano et al. |
| 6,252,989 B1 | 6/2001 | Geisler et al. |
| 6,256,033 B1 | 7/2001 | Nguyen |
| 6,262,718 B1 | 7/2001 | Findlay et al. |
| 6,310,610 B1 | 10/2001 | Beaton et al. |
| 6,323,846 B1 | 11/2001 | Westerman et al. |
| 6,328,270 B1 | 12/2001 | Elberbaum |
| 6,335,724 B1 | 1/2002 | Takekawa et al. |
| 6,337,681 B1 | 1/2002 | Martin |
| 6,339,748 B1 | 1/2002 | Hiramatsu |
| 6,353,434 B1 | 3/2002 | Akebi et al. |
| 6,359,612 B1 | 3/2002 | Peter et al. |
| 6,414,671 B1 | 7/2002 | Gillespie et al. |
| 6,414,673 B1 | 7/2002 | Wood et al. |
| 6,421,042 B1 | 7/2002 | Omura et al. |
| 6,427,389 B1 | 8/2002 | Branc et al. |
| 6,429,856 B1 | 8/2002 | Omura et al. |
| 6,496,122 B2 | 12/2002 | Sampsell |
| 6,497,608 B2 | 12/2002 | Ho et al. |
| 6,498,602 B1 | 12/2002 | Ogawa |
| 6,507,339 B1 | 1/2003 | Tanaka |
| 6,512,838 B1 | 1/2003 | Rafii et al. |
| 6,517,266 B2 | 2/2003 | Saund |
| 6,518,600 B1 | 2/2003 | Shaddock |
| 6,522,830 B2 | 2/2003 | Yamagami |
| 6,529,189 B1 | 3/2003 | Colgan et al. |
| 6,530,664 B2 | 3/2003 | Vanderwerf et al. |
| 6,531,999 B1 | 3/2003 | Trajkovic |
| 6,545,669 B1 | 4/2003 | Kinawi et al. |
| 6,559,813 B1 | 5/2003 | DeLuca et al. |
| 6,563,491 B1 | 5/2003 | Omura |
| 6,567,078 B2 | 5/2003 | Ogawa |
| 6,567,121 B1 | 5/2003 | Kuno |
| 6,570,612 B1 | 5/2003 | Saund et al. |
| 6,577,299 B1 | 6/2003 | Schiller et al. |
| 6,587,099 B2 | 7/2003 | Takekawa |
| 6,594,023 B1 | 7/2003 | Omura et al. |
| 6,597,348 B1 | 7/2003 | Yamazaki et al. |
| 6,608,619 B2 | 8/2003 | Omura et al. |
| 6,626,718 B2 | 9/2003 | Hiroki |
| 6,630,922 B2 | 10/2003 | Fishkin et al. |
| 6,633,328 B1 | 10/2003 | Byrd et al. |
| 6,650,822 B1 | 11/2003 | Zhou |
| 6,674,424 B1 | 1/2004 | Fujioka |
| 6,683,584 B2 | 1/2004 | Ronzani et al. |
| 6,690,357 B1 | 2/2004 | Dunton et al. |
| 6,690,363 B2 | 2/2004 | Newton |
| 6,690,397 B1 | 2/2004 | Daignault, Jr. |
| 6,710,770 B2 | 3/2004 | Tomasi et al. |
| 6,736,321 B2 | 5/2004 | Tsikos et al. |
| 6,741,250 B1 | 5/2004 | Furlan et al. |
| 6,747,636 B2 | 6/2004 | Martin |
| 6,756,910 B2 | 6/2004 | Ohba et al. |
| 6,760,009 B2 | 7/2004 | Omura et al. |
| 6,760,999 B2 | 7/2004 | Branc et al. |
| 6,774,889 B1 | 8/2004 | Zhang et al. |
| 6,803,906 B1 | 10/2004 | Morrison et al. |
| 6,864,882 B2 | 3/2005 | Newton |
| 6,911,972 B2 | 6/2005 | Brinjes |
| 6,919,880 B2 | 7/2005 | Morrison et al. |
| 6,933,981 B1 | 8/2005 | Kishida et al. |
| 6,947,032 B2 | 9/2005 | Morrison et al. |
| 6,954,197 B2 | 10/2005 | Morrison et al. |
| 6,972,401 B2 | 12/2005 | Akitt et al. |
| 6,972,753 B1 | 12/2005 | Kimura et al. |
| 7,007,236 B2 | 2/2006 | Dempski et al. |
| 7,015,418 B2 | 3/2006 | Cahill et al. |
| 7,030,861 B1 | 4/2006 | Westerman et al. |
| 7,084,868 B2 | 8/2006 | Farag et al. |
| 7,098,392 B2 | 8/2006 | Sitrick et al. |
| 7,121,470 B2 | 10/2006 | McCall et al. |
| 7,176,904 B2 | 2/2007 | Satoh |
| 7,184,030 B2 | 2/2007 | McCharles et al. |
| 7,187,489 B2 | 3/2007 | Miles |
| 7,190,496 B2 | 3/2007 | Klug et al. |
| 7,202,860 B2 | 4/2007 | Ogawa |
| 7,232,986 B2 | 6/2007 | Worthington et al. |
| 7,236,132 B1 | 6/2007 | Morrison et al. |
| 7,274,356 B2 | 9/2007 | Ung et al. |
| 7,355,593 B2 | 4/2008 | Hill et al. |
| 7,414,617 B2 | 8/2008 | Ogawa |
| 7,559,664 B1 | 7/2009 | Walleman et al. |

(56) References Cited

U.S. PATENT DOCUMENTS

| | | |
|---|---|---|
| 7,619,617 B2 | 11/2009 | Morrison et al. |
| 7,692,625 B2 | 4/2010 | Morrison et al. |
| 2001/0019325 A1 | 9/2001 | Takekawa |
| 2001/0022579 A1 | 9/2001 | Hirabayashi |
| 2001/0026268 A1 | 10/2001 | Ito |
| 2001/0033274 A1 | 10/2001 | Ong |
| 2002/0036617 A1 | 3/2002 | Pryor |
| 2002/0050979 A1 | 5/2002 | Oberoi et al. |
| 2002/0067922 A1 | 6/2002 | Harris |
| 2002/0080123 A1 | 6/2002 | Kennedy et al. |
| 2002/0145595 A1 | 10/2002 | Satoh |
| 2002/0163530 A1 | 11/2002 | Takakura et al. |
| 2003/0001825 A1 | 1/2003 | Omura et al. |
| 2003/0025951 A1 | 2/2003 | Pollard et al. |
| 2003/0043116 A1 | 3/2003 | Morrison et al. |
| 2003/0046401 A1 | 3/2003 | Abbott et al. |
| 2003/0063073 A1 | 4/2003 | Geaghan et al. |
| 2003/0071858 A1 | 4/2003 | Morohoshi |
| 2003/0085871 A1 | 5/2003 | Ogawa |
| 2003/0095112 A1 | 5/2003 | Kawano et al. |
| 2003/0142880 A1 | 7/2003 | Hyodo |
| 2003/0151532 A1 | 8/2003 | Chen et al. |
| 2003/0151562 A1 | 8/2003 | Kulas |
| 2004/0021633 A1 | 2/2004 | Rajkowski |
| 2004/0031779 A1 | 2/2004 | Cahill et al. |
| 2004/0046749 A1 | 3/2004 | Ikeda |
| 2004/0108990 A1 | 6/2004 | Lieberman |
| 2004/0149892 A1 | 8/2004 | Akitt et al. |
| 2004/0150630 A1 | 8/2004 | Hinckley et al. |
| 2004/0169639 A1 | 9/2004 | Pate et al. |
| 2004/0178993 A1 | 9/2004 | Morrison et al. |
| 2004/0178997 A1 | 9/2004 | Gillespie et al. |
| 2004/0179001 A1 | 9/2004 | Morrison et al. |
| 2004/0189720 A1 | 9/2004 | Wilson et al. |
| 2004/0252091 A1 | 12/2004 | Ma et al. |
| 2005/0052427 A1 | 3/2005 | Wu et al. |
| 2005/0057524 A1 | 3/2005 | Hill et al. |
| 2005/0083308 A1 | 4/2005 | Homer et al. |
| 2005/0151733 A1 | 7/2005 | Sander et al. |
| 2005/0156900 A1* | 7/2005 | Hill et al. .................. 345/173 |
| 2005/0190162 A1 | 9/2005 | Newton |
| 2005/0243070 A1 | 11/2005 | Ung et al. |
| 2005/0248540 A1 | 11/2005 | Newton |
| 2005/0276448 A1 | 12/2005 | Pryor |
| 2006/0022962 A1 | 2/2006 | Morrison et al. |
| 2006/0158437 A1 | 7/2006 | Blythe et al. |
| 2006/0202953 A1 | 9/2006 | Pryor et al. |
| 2006/0227120 A1 | 10/2006 | Eikman |
| 2006/0274067 A1 | 12/2006 | Hikai |
| 2007/0019103 A1 | 1/2007 | Lieberman et al. |
| 2007/0075648 A1 | 4/2007 | Blythe et al. |
| 2007/0075982 A1 | 4/2007 | Morrison et al. |
| 2007/0116333 A1 | 5/2007 | Dempski et al. |
| 2007/0126755 A1 | 6/2007 | Zhang et al. |
| 2007/0139932 A1 | 6/2007 | Sun et al. |
| 2007/0236454 A1 | 10/2007 | Ung et al. |
| 2008/0062149 A1 | 3/2008 | Baruk |
| 2008/0129707 A1 | 6/2008 | Pryor |
| 2008/0211766 A1 | 9/2008 | Westerman et al. |
| 2008/0284733 A1 | 11/2008 | Hill et al. |
| 2009/0146972 A1 | 6/2009 | Morrison et al. |
| 2010/0073318 A1* | 3/2010 | Hu et al. .................. 345/174 |
| 2010/0079407 A1* | 4/2010 | Suggs ........................ 345/175 |
| 2010/0214268 A1* | 8/2010 | Huang et al. ............. 345/175 |
| 2012/0007804 A1* | 1/2012 | Morrison et al. ......... 345/158 |

FOREIGN PATENT DOCUMENTS

| | | |
|---|---|---|
| DE | 198 10 452 | 12/1998 |
| EP | 0 279 652 | 8/1988 |
| EP | 0 347 725 | 12/1989 |
| EP | 0 657 841 | 6/1995 |
| EP | 0 762 319 | 3/1997 |
| EP | 0 829 798 | 3/1998 |
| EP | 1 450 243 | 8/2004 |
| EP | 1 297 488 | 11/2006 |
| GB | 2204126 | 11/1988 |
| JP | 57-211637 | 12/1982 |
| JP | 61-196317 | 8/1986 |
| JP | 61-260322 | 11/1986 |
| JP | 3-054618 | 3/1991 |
| JP | 4-350715 | 12/1992 |
| JP | 4-355815 | 12/1992 |
| JP | 5-181605 | 7/1993 |
| JP | 5-189137 | 7/1993 |
| JP | 5-197810 | 8/1993 |
| JP | 7-110733 | 4/1995 |
| JP | 7-230352 | 8/1995 |
| JP | 8-016931 | 2/1996 |
| JP | 8-108689 | 4/1996 |
| JP | 8-240407 | 9/1996 |
| JP | 8-315152 | 11/1996 |
| JP | 9-091094 | 4/1997 |
| JP | 9-224111 | 8/1997 |
| JP | 9-319501 | 12/1997 |
| JP | 10-105324 | 4/1998 |
| JP | 11-051644 | 2/1999 |
| JP | 11-064026 | 3/1999 |
| JP | 11-085376 | 3/1999 |
| JP | 11-110116 | 4/1999 |
| JP | 2000-105671 | 4/2000 |
| JP | 2000-132340 | 5/2000 |
| JP | 2001-075735 | 3/2001 |
| JP | 2001-282456 | 10/2001 |
| JP | 2001-282457 | 10/2001 |
| JP | 2002-236547 | 8/2002 |
| JP | 2003-158597 | 5/2003 |
| JP | 2003-167669 | 6/2003 |
| JP | 2003-173237 | 6/2003 |
| WO | WO 98/07112 | 2/1999 |
| WO | WO 99/08897 | 2/1999 |
| WO | WO 99/21122 | 4/1999 |
| WO | WO 99/28812 | 6/1999 |
| WO | WO 99/40562 | 8/1999 |
| WO | WO 02/03316 | 1/2002 |
| WO | WO 02/07073 | 1/2002 |
| WO | WO 02/27461 | 4/2002 |
| WO | WO 03/105074 | 12/2003 |
| WO | WO 2005/034027 | 4/2005 |
| WO | WO 2005/106775 | 11/2005 |
| WO | WO 2006/095320 | 9/2006 |
| WO | WO 2007/003196 | 1/2007 |
| WO | WO 2007/064804 | 6/2007 |
| WO | WO 2009/146544 | 12/2009 |

OTHER PUBLICATIONS

International Search Report and Written Opinion for PCT/CA2007/002184 mailed Mar. 13, 2008 (13 Pages).

International Search Report and Written Opinion for PCT/CA2004/001759 mailed Feb. 21, 2005 (7 Pages).

International Search Report for PCT/CA01/00980 mailed Oct. 22, 2001 (3 Pages).

International Search Report and Written Opinion for PCT/CA2009/000773 mailed Aug. 12, 2009 (11 Pages).

European Search Opinion for EP 07 25 0888 dated Jun. 22, 2007 (2 pages).

European Search Report for EP 07 25 0888 dated Jun. 22, 20067 (2 pages).

European Search Report for EP 06 01 9269 dated Nov. 9, 2006 (4 pages).

European Search Report for EP 06 01 9268 dated Nov. 9, 2006 (4 pages).

European Search Report for EP 04 25 1392 dated Jan. 11, 2007 (2 pages).

European Search Report for EP 02 25 3594 dated Dec. 14, 2005 (3 pages).

Partial European Search Report for EP 03 25 7166 dated May 19, 2006 (4 pages).

May 12, 2009 Office Action for Canadian Patent Application No. 2,412,878 (4 pages).

(56) References Cited

OTHER PUBLICATIONS

International Search Report and Written Opinion for PCT/CA2010/001085 mailed Oct. 12, 2010.
Jul. 5, 2010 Office Action, with English translation, for Japanese Patent Application No. 2005-000268 (6 pages).
Förstner, Wolfgang, "On Estimating Rotations", Festschrift für Prof. Dr. -Ing. Heinrich Ebner Zum 60. Geburtstag, Herausg.: C. Heipke und H. Mayer, Lehrstuhl für Photogrammetrie und Fernerkundung, TU München, 1999, 12 pages. (http://www.ipb.uni-bonn.de/papers/#1999).
Funk, Bud K., CCD's in optical panels deliver high resolution, Electronic Design, Sep. 27, 1980, pp. 139-143.
Hartley, R. and Zisserman, A., "Multiple View Geometry in Computer Vision", Cambridge University Press, First published 2000, Reprinted (with corrections) 2001, pp. 70-73, 92-93, and 98-99.
Kanatani, K., "Camera Calibration", Geometric Computation for Machine Vision, Oxford Engineering Science Series, vol. 37, 1993, pp. 56-63.
Tapper, C.C., et al., "On-Line Handwriting Recognition—A Survey", Proceedings of the International Conference on Pattern Recognition (ICPR), Rome, Nov. 14-17, 1988, Washington, IEEE Comp. Soc. Press. US, vol. 2 Conf. 9, Nov. 14, 1988, pp. 1123-1132.
Wang, F., et al., "Stereo camera calibration without absolute world coordinate information", SPIE, vol. 2620, pp. 655-662, Jun. 14, 1995.
Wrobel, B., "minimum Solutions for Orientation", Calibration and Orientation of Cameras in Computer Vision, Springer Series in Information Sciences, vol. 34, 2001, pp. 28-33.
Press Release, "IntuiLab introduces IntuiFace, An interactive table and its application platform" Nov. 30, 2007.
Overview page for IntuiFace by IntuiLab, Copyright 2008.
NASA Small Business Innovation Research Program: Composite List of Projects 1983-1989, Aug. 1990.
*Touch Panel*, vol. 1 No. 1 (2005).
*Touch Panel*, vol. 1 No. 2 (2005).
*Touch Panel*, vol. 1 No. 3 (2006).
*Touch Panel*, vol. 1 No. 4 (2006).
*Touch Panel*, vol. 1 No. 5 (2006).
*Touch Panel*, vol. 1 No. 6 (2006).
*Touch Panel*, vol. 1 No. 7 (2006).
*Touch Panel*, vol. 1 No. 8 (2006).
*Touch Panel*, vol. 1 No. 9 (2006).
*Touch Panel*, vol. 1 No. 10 (2006).
*Touch Panel*, vol. 2 No. 1 (2006).
*Touch Panel*, vol. 2 No. 2 (2007).
*Touch Panel*, vol. 2 No. 3 (2007).
*Touch Panel*, vol. 2 No. 4 (2007).
*Touch Panel*, vol. 2 No. 5 (2007).
*Touch Panel*, vol. 2 No. 6 (2007).
*Touch Panel*, vol. 2 No. 7-8 (2008).
*Touch Panel*, vol. 2 No. 9-10 (2008).
*Touch Panel*, vol. 3 No. 1-2 (2008).
*Touch Panel*, vol. 3 No. 3-4 (2008).
*Touch Panel*, vol. 3 No. 5-6 (2009).
*Touch Panel*, vol. 3 No. 7-8 (2009).
*Touch Panel*, vol. 3 No. 9 (2009).
*Touch Panel*, vol. 4 No. 2-3 (2009).
Touch Panel, vol. 5 No. 2-3 (Sep. 2010).
Touch Panel, vol. 5 No. 4 (Nov. 2010).
Villamor et al. "Touch Gesture Reference Guide", Apr. 15, 2010.
Eric Weisstein, "Determinant—from Wolfram MathWorld", last updated on Feb. 16, 2009 and printed out as it appeared on the Internet on Feb. 18, 2009, retrieved from the Wayback Machine at <web.archive.org/web/20090218175549/http://rnathworld.wolfram.com/Determinant_html> on Mar. 11, 2013.

\* cited by examiner

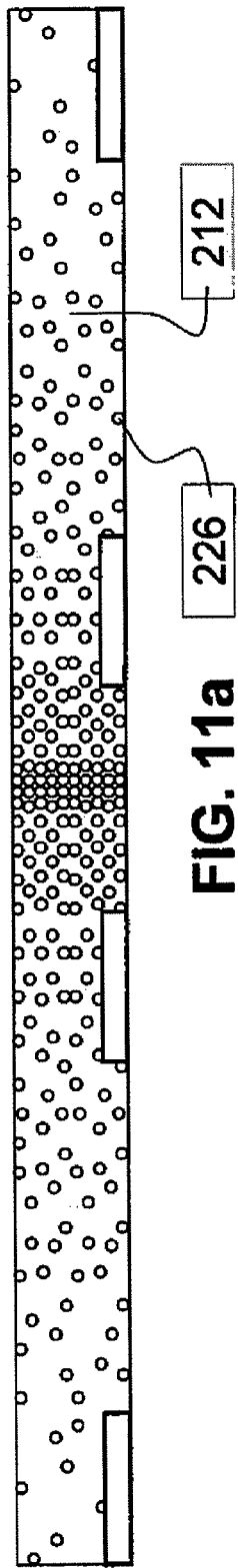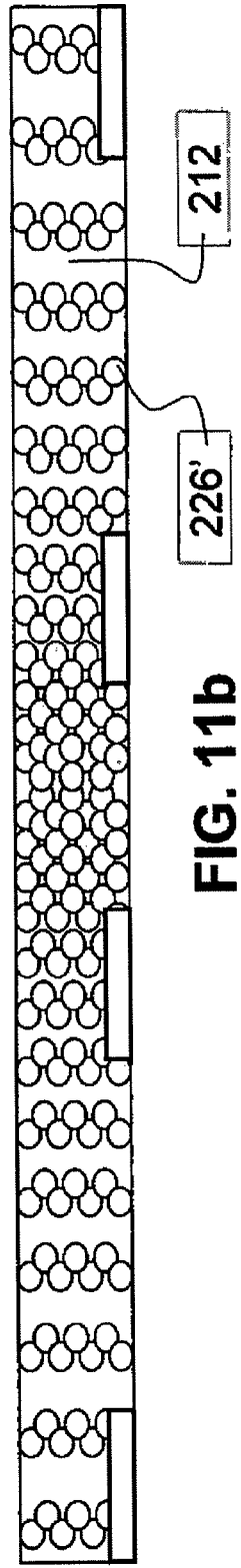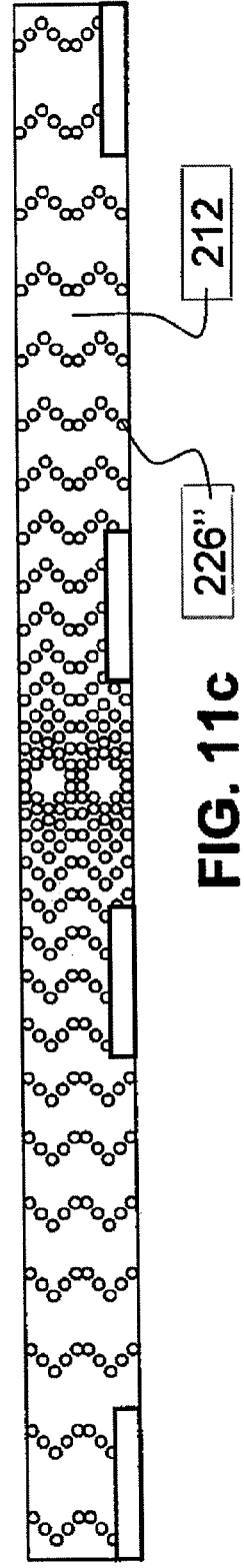

|  |  | Camera 1 | | | Camera 2 | | | Camera 3 | | |
|---|---|---|---|---|---|---|---|---|---|---|
|  |  | Observation 1 | Observation 2 | Observation 3 | Observation 1 | Observation 2 | Observation 3 | Observation 1 | Observation 2 | Observation 3 |
| Camera 1 | Observation 1 | X | X | X | T | T | T | T | T | T |
|  | Observation 2 | X | X | X | T | T | T | T | T | T |
|  | Observation 3 | X | X | X | T | T | T | T | T | T |
| Camera 2 | Observation 1 | X | X | X | X | X | X | T | T | T |
|  | Observation 2 | X | X | X | X | X | X | T | T | T |
|  | Observation 3 | X | X | X | X | X | X | T | T | T |
| Camera 3 | Observation 1 | X | X | X | X | X | X | X | X | X |
|  | Observation 2 | X | X | X | X | X | X | X | X | X |
|  | Observation 3 | X | X | X | X | X | X | X | X | X |

FIG. 14

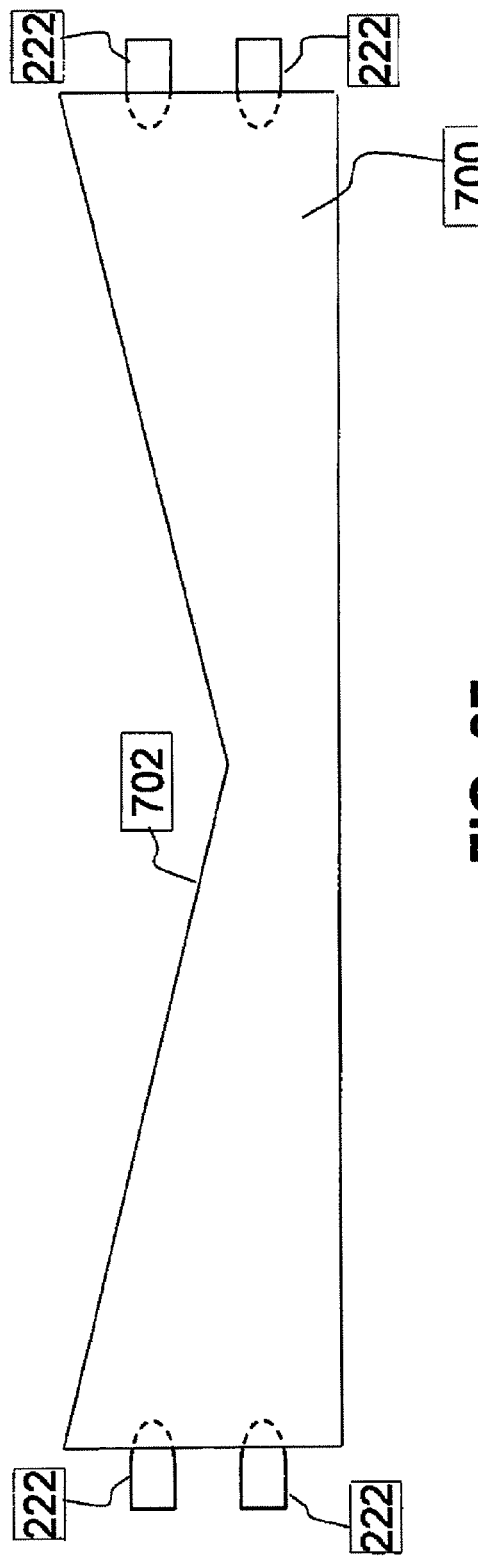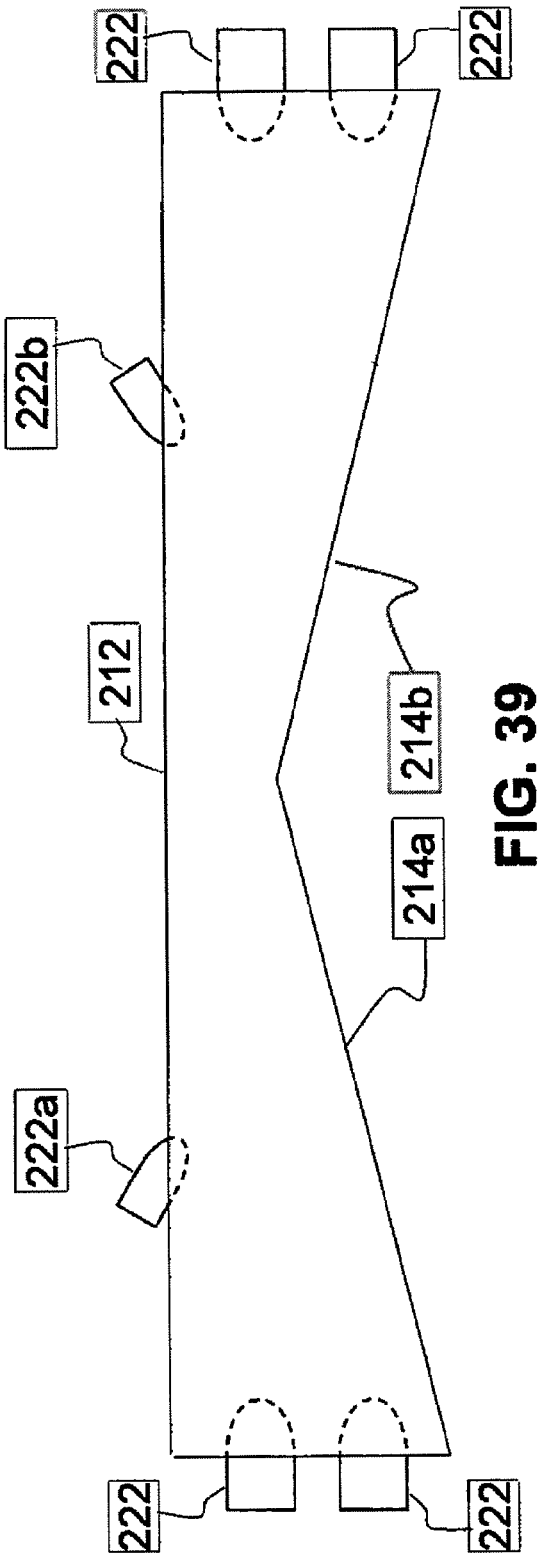

INTERACTIVE INPUT SYSTEM

FIELD OF THE INVENTION

The present invention relates generally to input systems and in particular to a multi-touch interactive input system.

BACKGROUND OF THE INVENTION

Interactive input systems that allow users to inject input such as for example digital ink, mouse events etc. into an application program using an active pointer (eg. a pointer that emits light, sound or other signal), a passive pointer (eg. a finger, cylinder or other object) or other suitable input device such as for example, a mouse or trackball, are well known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 and in U.S. Patent Application Publication No. 2004/0179001 assigned to SMART Technologies ULC of Calgary, Alberta, Canada, assignee of the subject application, the contents of which are incorporated by reference; touch systems comprising touch panels employing electromagnetic, capacitive, acoustic or other technologies to register pointer input; tablet personal computers (PCs); laptop PCs; personal digital assistants (PDAs); and other similar devices.

Above-incorporated U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports digital cameras at its four corners. The digital cameras have overlapping fields of view that encompass and look generally across the touch surface. The digital cameras acquire images looking across the touch surface from different vantages and generate image data. Image data acquired by the digital cameras is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are then conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

In environments where the touch surface is small, more often than not, users interact with the touch surface one at a time, typically using a single pointer. In situations where the touch surface is large, as described in U.S. patent application Ser. No. 10/750,219 to Hill et al., assigned to SMART Technologies ULC, the content of which is incorporated by reference, multiple users may interact with the touch surface simultaneously.

As will be appreciated, in machine vision touch systems, when a single pointer is in the fields of view of multiple imaging devices, the position of the pointer in (x,y) coordinates relative to the touch surface typically can be readily computed using triangulation. Difficulties are however encountered when multiple pointers are in the fields of view of multiple imaging devices as a result of pointer ambiguity and occlusion. Ambiguity arises when multiple pointers in the images captured by the imaging devices cannot be differentiated. In such cases, during triangulation a number of possible positions for the pointers can be computed but no information is available to the system to allow the correct pointer positions to be selected. Occlusion occurs when one pointer occludes another pointer in the field of view of an imaging device. In these instances, the image captured by the imaging device includes only one pointer. As a result, the correct positions of the pointers relative to the touch surface cannot be disambiguated from false target positions. Increasing the number of imaging devices allows pointer ambiguity and occlusion to be resolved but this of course results in increased touch system cost and complexity. The placement of the additional cameras with different vantages improves disambiguation as well as difficulties with occlusion as the field of view of each set of cameras looks at the pointers at a different angle. The additional cameras also improve the triangulation of the pointers.

It is therefore an object of the present invention to provide a novel interactive input system.

SUMMARY OF THE INVENTION

Accordingly, in one aspect there is provided in an interactive input system, a method of resolving ambiguities between at least two pointers in a plurality of input regions defining an input area comprising:

capturing images of the plurality of input regions, the images captured by a plurality of imaging devices having a field of view of a portion of the input area;

processing image data from the images to identify a plurality of targets for the at least two pointers within the input area; and analyzing the plurality of targets to resolve a real location associated with each pointer.

According to another aspect there is provided in an interactive input system, a method of resolving ambiguities between at least two pointers in a plurality of input regions defining an input area comprising:

capturing images of the plurality of input regions, the images captured by a plurality of imaging devices having a field of view of at least a portion of the input area;

processing image data from the images to identify a plurality of potential targets for the at least two pointers within the input area, the plurality of potential targets comprising real and phantom targets; and determining a pointer location for each of the at least two pointers utilizing the plurality of targets.

According to another aspect there is provided an interactive input system comprising:

an input surface defining an input area; and a plurality of imaging devices having at least partially overlapping fields of view encompassing a plurality of input regions within the input area.

According to another aspect there is provided an interactive input system comprising:

at least one imaging device mounted on the periphery of the display surface having a field of view encompassing a region of interest associated with the display surface;

a bezel disposed around the periphery of a display surface, defining an input area, the bezel having an inwardly facing diffusive surface normal to the display surface, the bezel positioned proximate to the at least one imaging device;

at least one light source disposed within the bezel to illuminate the region of interest.

According to another aspect there is provided a bezel for an interactive input system comprising at least one bezel segment to be disposed around the periphery of an input surface, the at least one bezel segment having a front surface, two opposing side surfaces, a top surface, a bottom surface, and a back surface, and the back surface tapering towards the midpoint of the bezel.

According to another aspect, there is provided an interactive input system comprising:

an input surface having at least two input areas;

a plurality of imaging devices having at least partially overlapping fields of view encompassing at least one input regions within the input area; and a processing structure for processing image data acquired by the imaging devices to track the position of at least two pointers within the input regions and resolve ambiguities between the pointers.

According to another aspect there is provided an interactive input system comprising:

an input surface defining an input area; and at least three imaging devices having at least partially overlapping fields of view encompassing at least one input region within the input area;

a processing structure for processing images acquired by the imaging devices to track the position of at least two pointers within the at least one input region, assigning a weight to each image, and resolve ambiguities between the pointers based on each weighted image.

According to another aspect there is provided in an interactive input system, a method comprising:

capturing images of a plurality of input regions, the images captured by a plurality of imaging devices having a field of view of a portion of the plurality of input regions;

processing image data from the images to identify a plurality of targets for the at least two pointers within the input area;

determining a state for each image of each target and assigning a weight to the image data of each image based on the state; and calculating a pointer location for each of the at least two pointers based on the weighted image data.

According to another aspect there is provided a computer readable medium embodying a computer program for resolving ambiguities between at least two pointers in a plurality of input regions defining an input area in an interactive input system, the computer program code comprising:

program code for resolving ambiguities between at least two pointers in a plurality of input regions defining an input area comprising:

program code for capturing images of the plurality of input regions, the images captured by a plurality of imaging devices having a field of view of at least a portion of the input area;

program code for processing image data from the images to identify a plurality of targets for the at least two pointers within the input area; and program code for analyzing the plurality of targets to resolve a real location associated with each pointer.

According to another aspect there is provided a computer readable medium embodying a computer program for resolving ambiguities between at least two pointers in a plurality of input regions defining an input area in an interactive input system, the computer program code comprising:

program code for capturing images of the plurality of input regions, the images captured by a plurality of imaging devices having a field of view of at least a portion of the input area;

program code for processing image data from the images to identify a plurality of potential targets for the at least two pointers within the input area, the plurality of potential targets comprising real and phantom targets; and program code for determining a pointer location for each of the at least two pointers utilizing the plurality of targets.

According to yet another aspect there is provided a computer readable medium embodying a computer program for resolving ambiguities between at least two pointers in a plurality of input regions defining an input area in an interactive input system, the computer program code comprising:

program code for capturing images of a plurality of input regions, the images captured by a plurality of imaging devices having a field of view of a portion of the plurality of input regions;

program code for processing image data from the images to identify a plurality of targets for the at least two pointers within the input area;

program code for determining a state for each image of each target and assigning a weight to the image data of each image based on the state; and program code for calculating a pointer location for each of the at least two pointers based on the weighted image data.

BRIEF DESCRIPTION OF THE DRAWINGS

Embodiments will now be described more fully with reference to the accompanying drawings in which:

FIG. 11a is a front elevational view of an exemplary illuminated bezel segment showing the dimple pattern of the diffusive front surface;

FIGS. 11b and 11c are front elevational views of the illuminated bezel segment showing alternative dimple patterns of the diffusive front surface;

FIG. 14 is an observation table built by the candidate generation procedure;

FIGS. 35 to 40 show alternative embodiments of the bezel segments of the interactive input system.

DETAILED DESCRIPTION OF THE EMBODIMENTS

Figure 1:
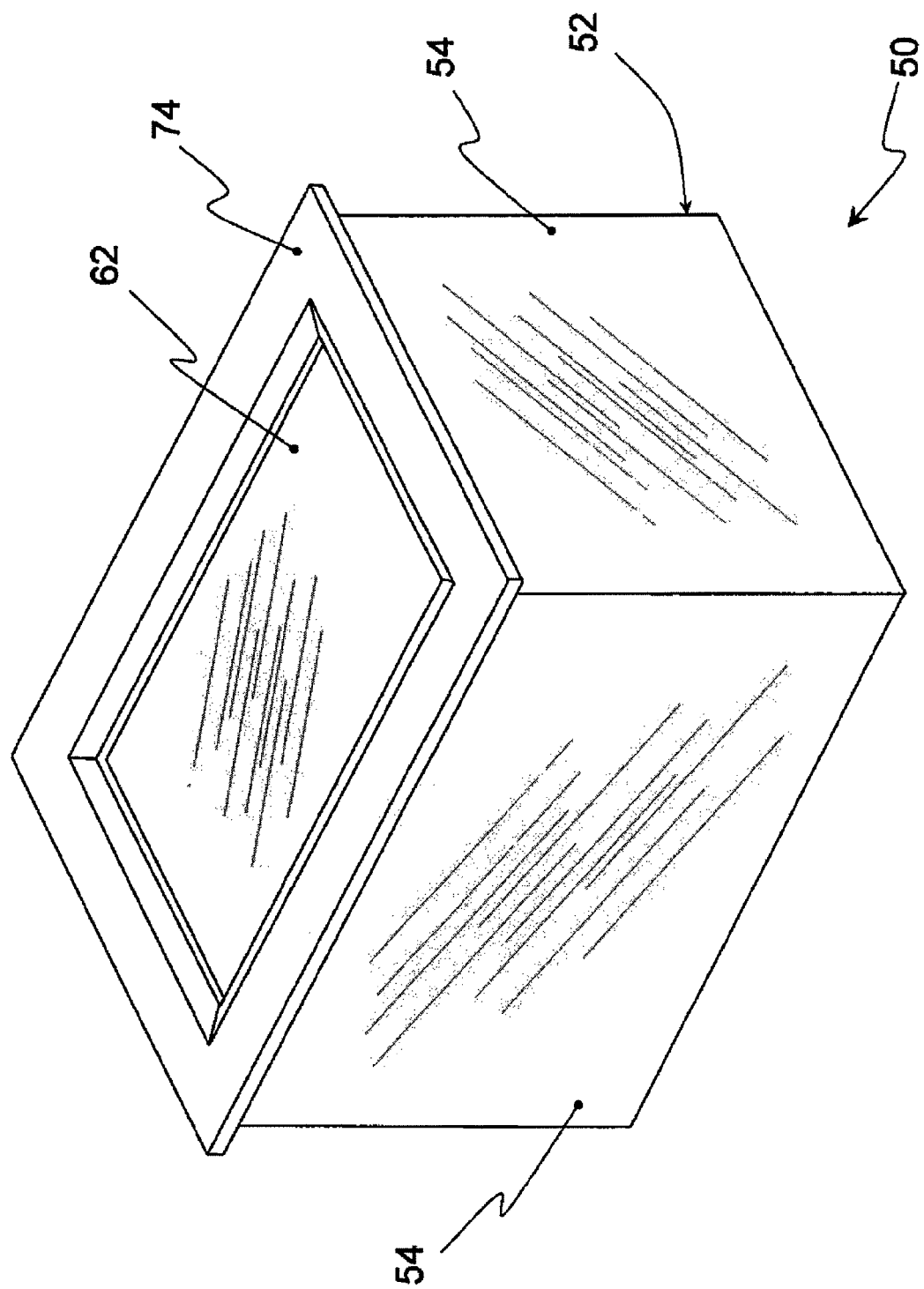
FIG. 1 is a perspective view of an interactive input system.
Figure 2:
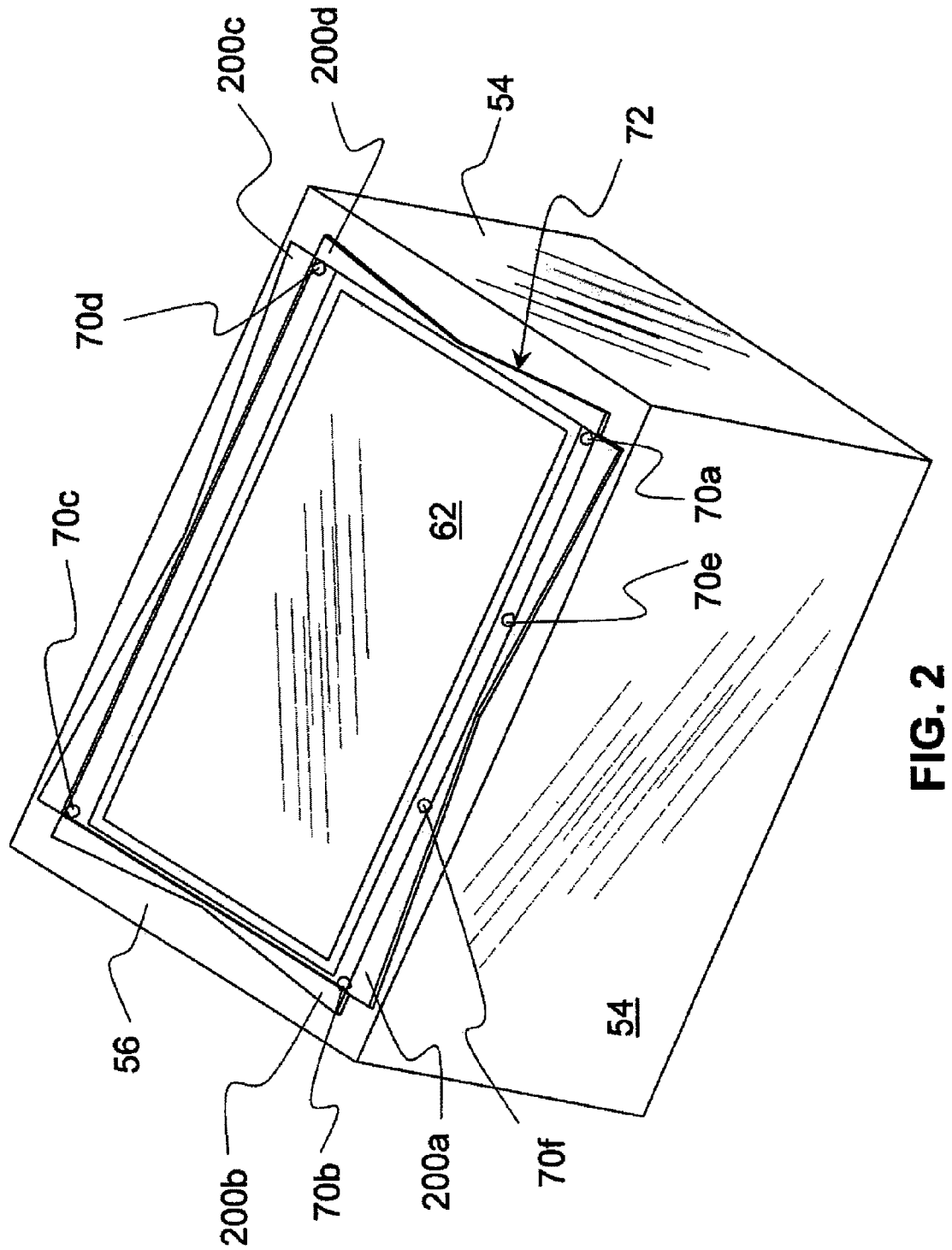
FIG. 2 is another perspective view of the interactive input system of FIG. 1 with the cover removed to expose the imaging devices and illuminated bezel surrounding the input area.
Figure 3:
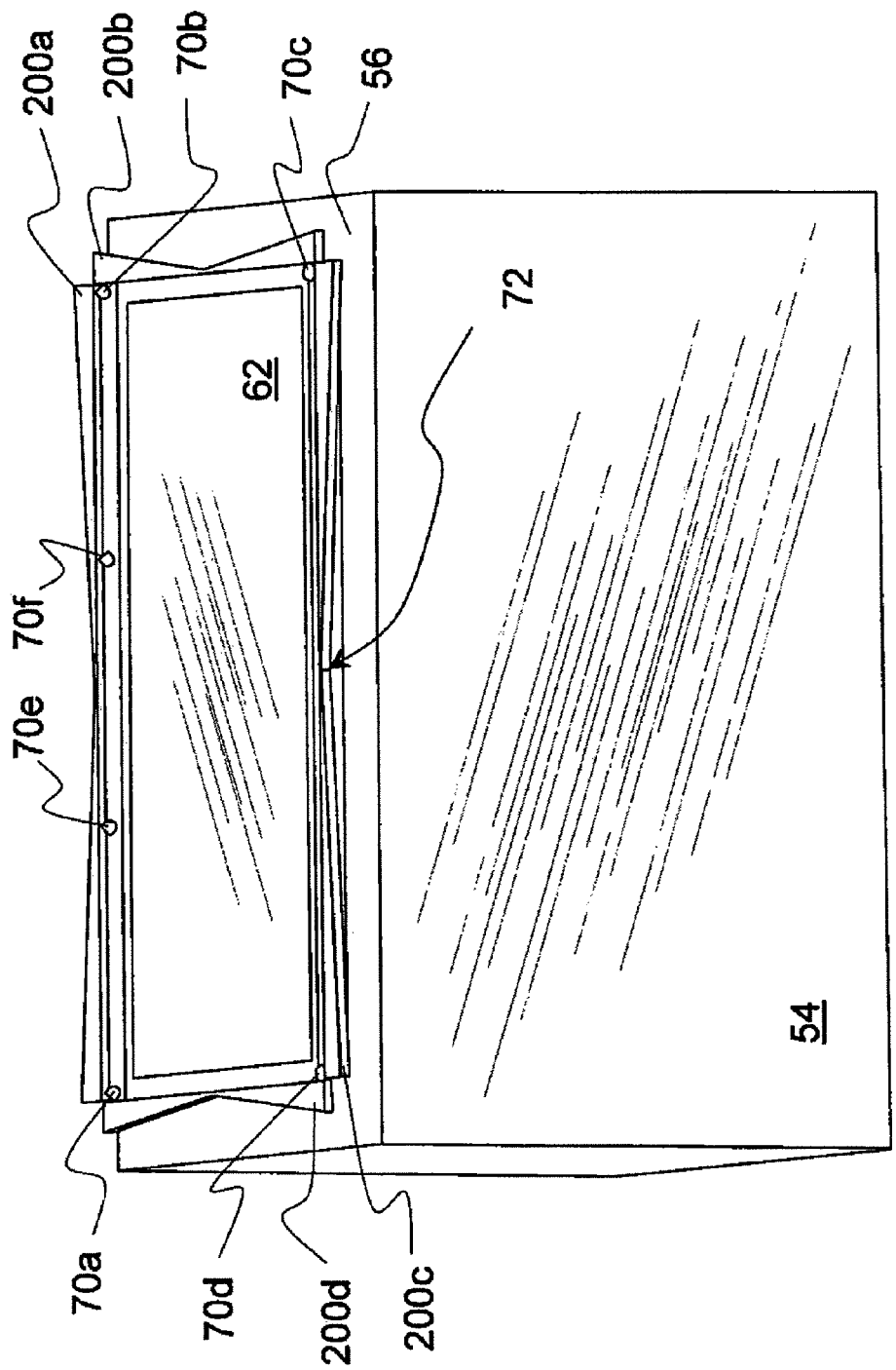
FIG. 3 is yet another perspective view of the interactive input system of FIG. 1 with the cover removed.
Figure 4:
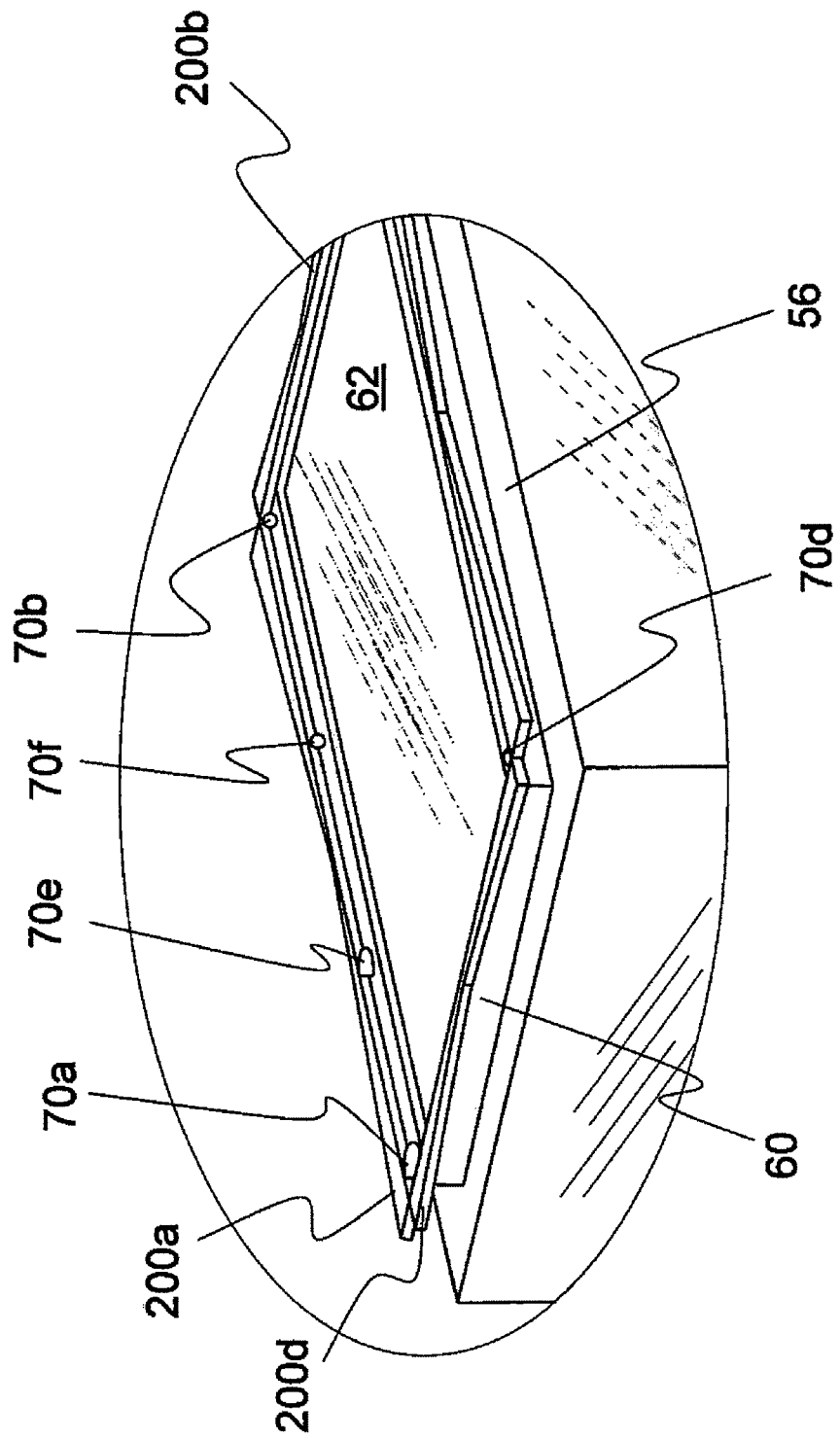
FIG. 4 is an enlarged perspective view of a portion of the interactive input system of FIG. 1 with the cover removed.

Turning now to FIGS. 1 to 6, an interactive input system is shown and is generally identified by reference numeral 50. In this embodiment, the interactive input system 50 is in the form of a touch table that is capable of detecting and tracking individually eight (8) different pointers or targets brought into proximity of the touch table. As can be seen touch table 50 comprises a rectangular box-like housing 52 having upright sidewalls 54 and a top wall 56. A liquid crystal display (LCD) or plasma panel 60 is centrally positioned on the top wall 56 and has a display surface that defines an input area 62. Alternatively, a projector-based table could be used. Imaging devices 70a to 70f are mounted on the LCD panel 60 about the input area 62 and look generally across the input area from different vantages. An illuminated bezel 72 surrounds the periphery of the input area 62 and overlies the imaging devices 70a to 70f. The illuminated bezel 72 provides backlight illumination into the input area 62. A cover 74 overlies the illuminated bezel 72.

Figure 5:
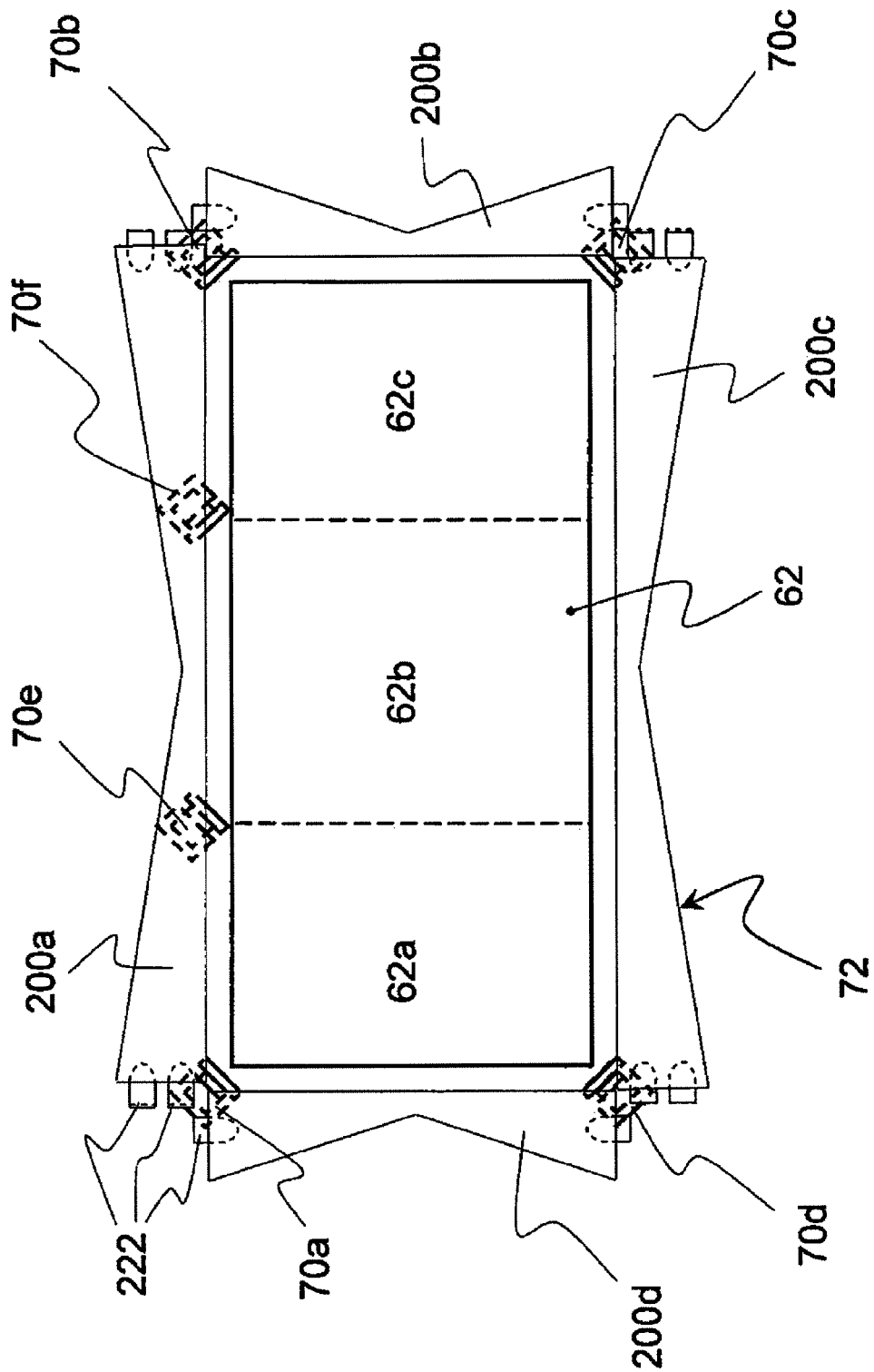
FIG. 5 is a top plan view showing the imaging devices and illuminated bezel that surround the input area.
Figure 6:
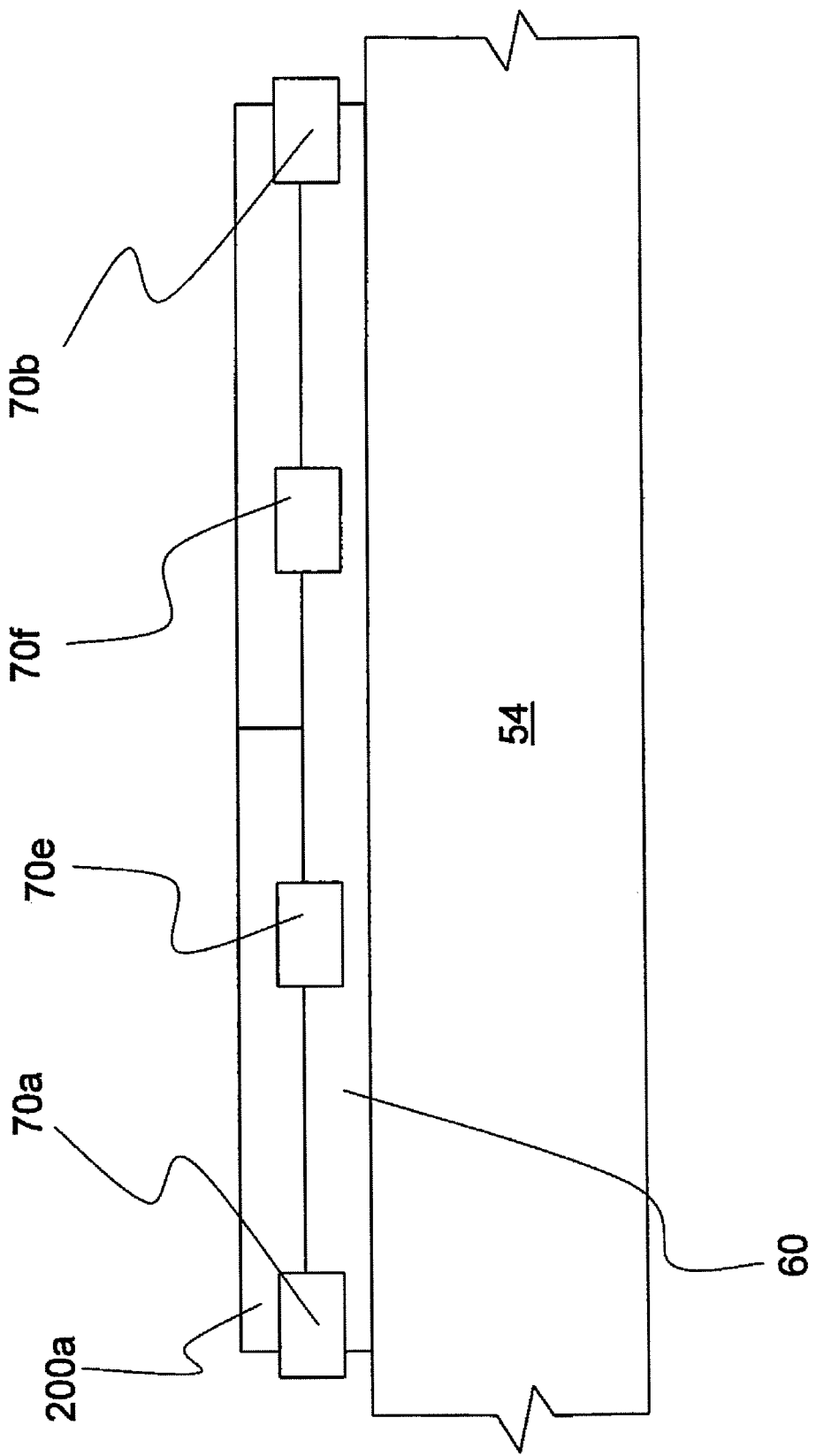
FIG. 6 is a side elevational view of a portion of the interactive input system of FIG. 1 with the cover removed.
Figure 7:
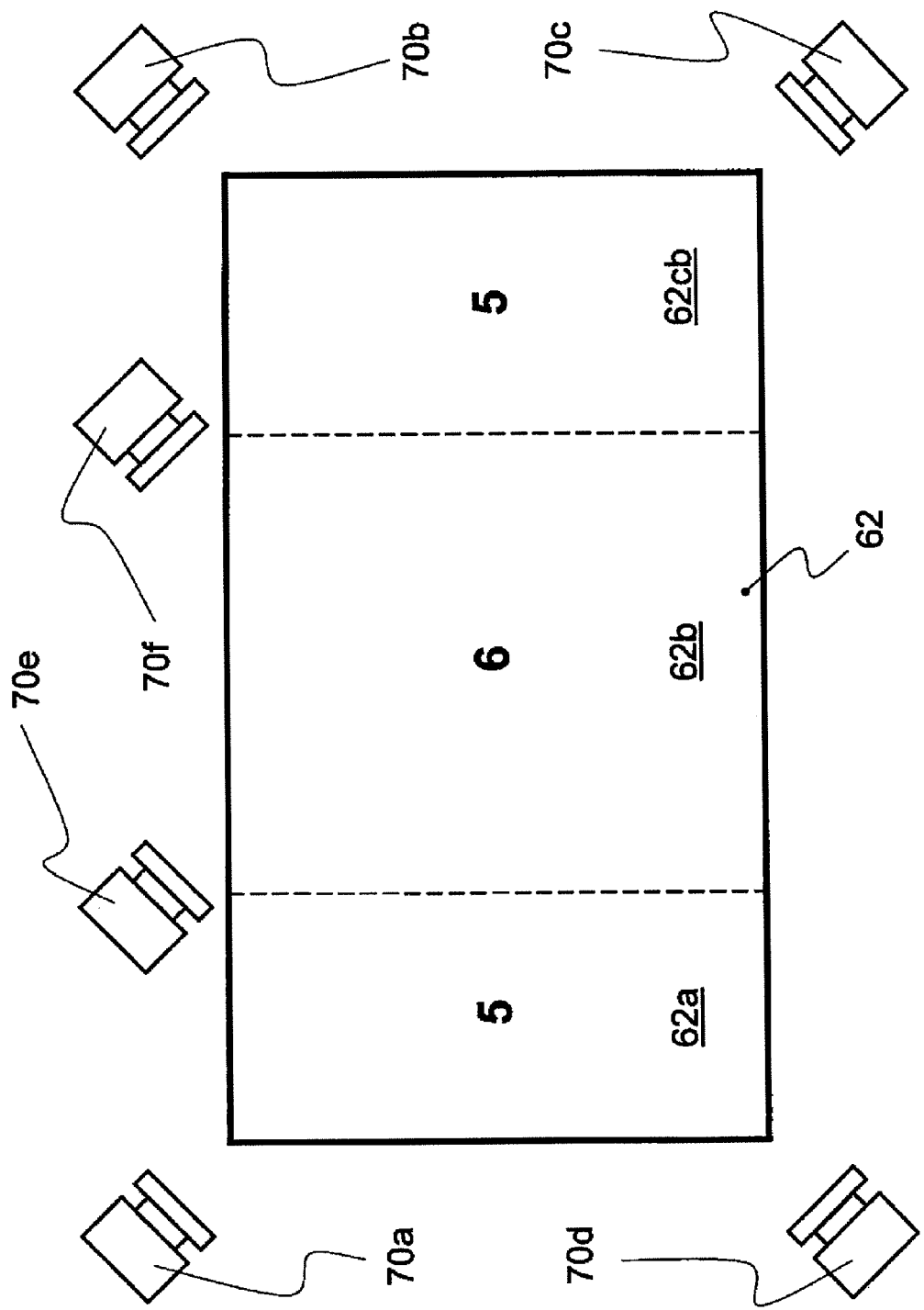
FIG. 7 is a top plan view showing the imaging devices and input regions of the input area.

In this embodiment, each of the imaging devices 70a to 70f is in the form of a digital camera device that has a field of view of approximately 90 degrees. The imaging devices 70a to 70d are positioned adjacent the four corners of the input area 62 and look generally across the entire input area 62. Two laterally spaced imaging devices 70e and 70f are positioned along one major side of the input area 62 intermediate the imaging devices 70a and 70b. The imaging devices 70e and 70f are angled in opposite directions and look towards the center of the input area 62 so that each imaging device 70e and 70f looks generally across two-thirds of the input area 62. This arrangement of imaging devices divides the input area 62 into three input regions, namely a left input region 62a, a central input region 62b and a right input region 62c as shown in FIGS. 5 and 7. The left input region 62a is within the fields of view of five (5) imaging devices, namely imaging devices 70a, 70b, 70c, 70d and 70f. The right input region 62c is also within the fields of view of five (5) imaging devices, namely imaging devices 70a, 70b, 70c, 70d and 70e. The central input region 62b is within the fields of view of all six (6) imaging devices 70a to 70f.

Figure 8:
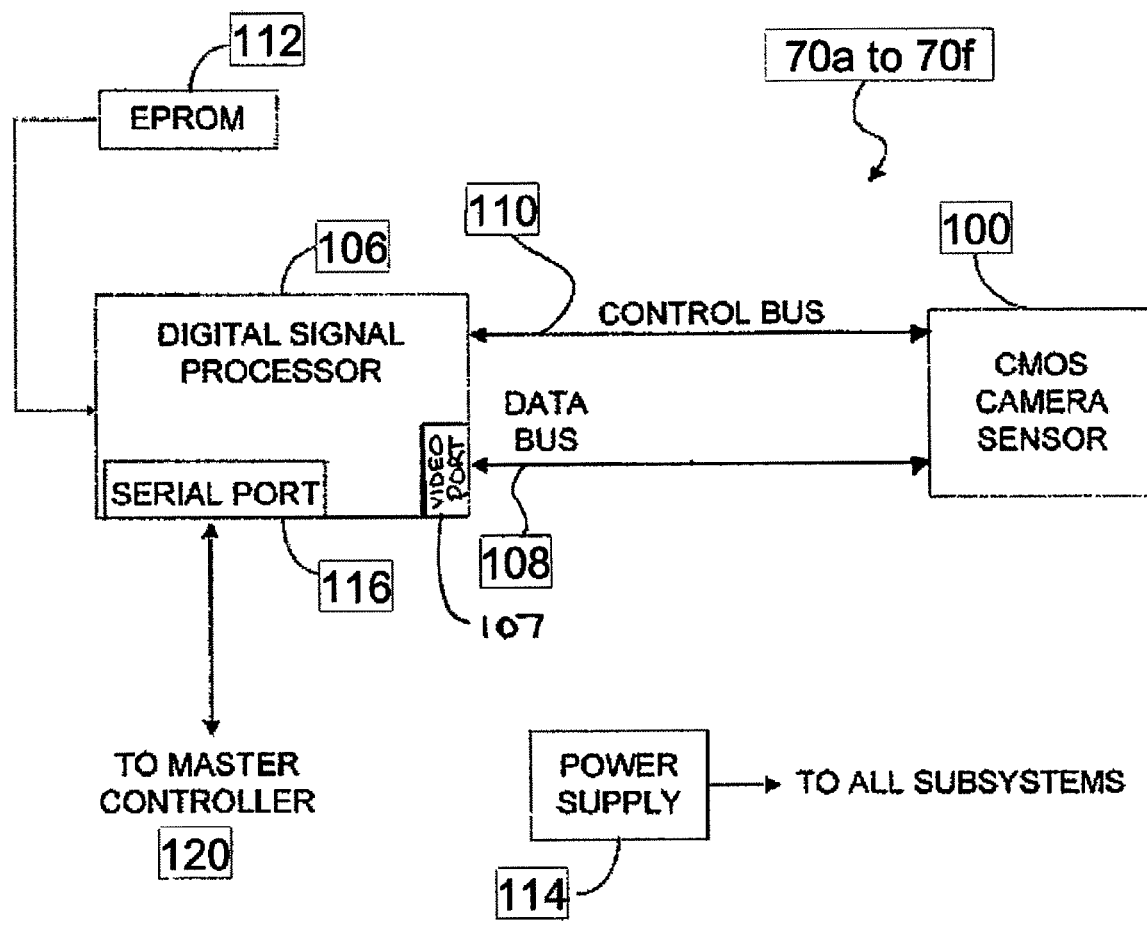
FIG. 8 is a schematic block diagram of one of the imaging devices.

FIG. 8 is a schematic block diagram of one of the imaging devices. As can be seen, the imaging device includes a two-dimensional CMOS camera image sensor 100 having associated lens assembly and a digital signal processor (DSP) 106. The parallel peripheral port 107 of the DSP 106 is coupled to the CMOS camera image sensor 100 parallel port by a data bus 108. Serial control bus 110 carries configuration information between the DSP 106 and the CMOS camera image sensor 100. A boot EPROM 112 and a power supply subsystem 114 are also included. Alternatively, CMOS line scan sensors could be used.

The CMOS camera image sensor 100 in this embodiment is an Aptina MT9V022 image sensor configured for a 30×752 pixel sub-array that can be operated to capture image frames at high frame rates including those in excess of 960 frames per second. The DSP 106 is manufactured by Analog Devices under part number ADSP-BF524.

The DSP 106 provides control information to the image sensor 100 via the control bus 110. The control information allows the DSP 106 to control parameters of the CMOS camera image sensor 100 and lens assembly such as exposure, gain, array configuration, reset and initialization. The DSP 106 also provides clock signals to the CMOS camera image sensor 100 to control the frame rate of the image sensor. The DSP 106 also communicates image information acquired from the image sensor 100 to a master controller 120 via a serial port 116.

Figure 9:
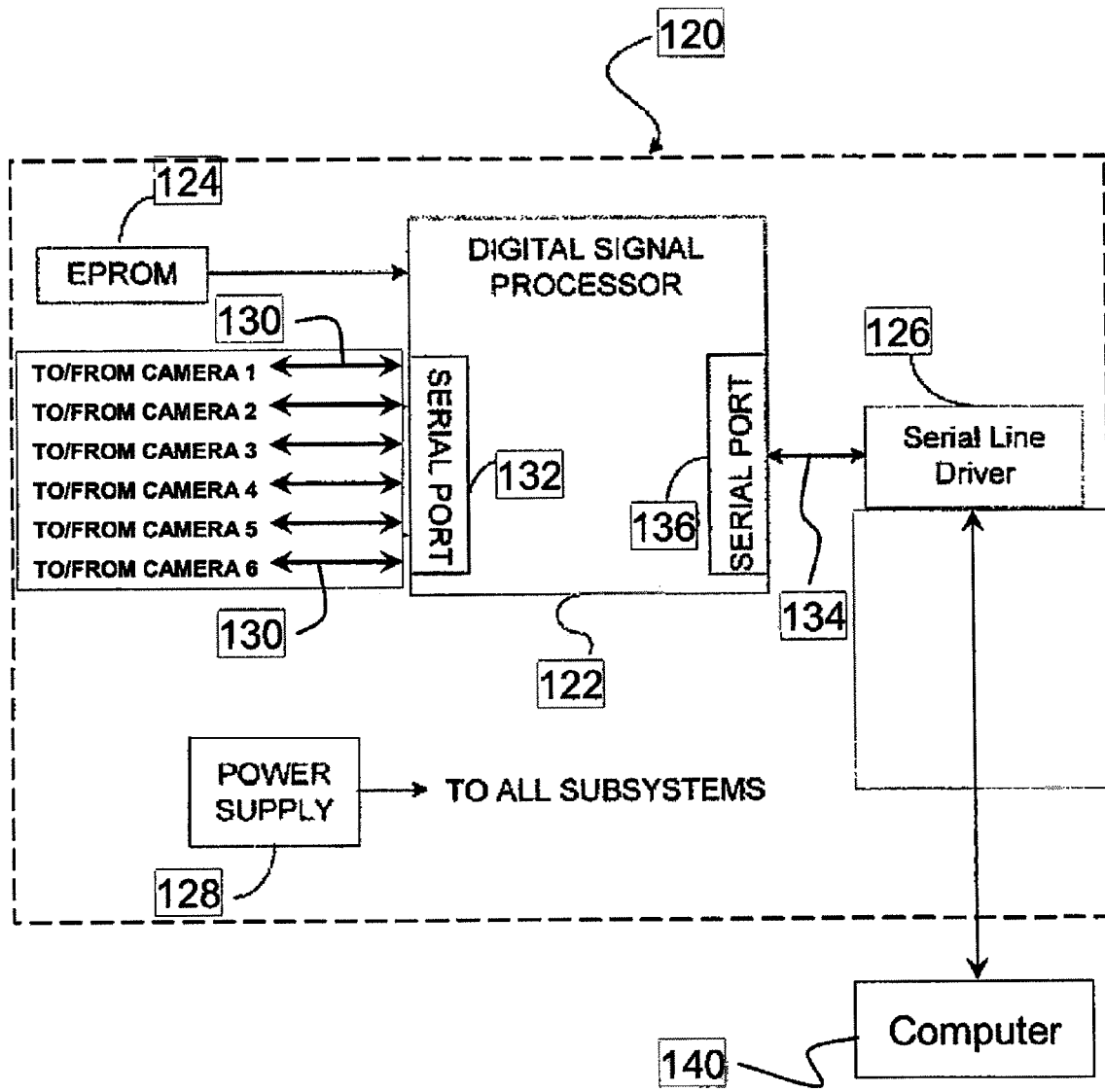
FIG. 9 is a schematic block diagram of a master processor.

Each of the imaging devices 70a to 70f communicates with the master processor 120 which is best shown in FIG. 9. Master controller 120 is accommodated by the housing 52 and includes a DSP 122, a boot EPROM 124, a serial line driver 126 and a power supply subsystem 128. The DSP 122 communicates with the DSPs 106 of each of the imaging device 70a to 70f over a data bus 130 and via a serial port 132. The DSP 122 also communicates with a processing device 140 accommodated by the housing 52 via a data bus 134, a serial port 136, and the serial line driver 126. In this embodiment, the DSP 122 is also manufactured by Analog Devices under part number ADM222. The serial line driver 138 is manufactured by Analog Devices under part number ADM222.

The master controller 120 and each imaging device follow a communication protocol that enables bi-directional communications via a common serial cable similar to a universal serial bus (USB). The transmission bandwidth is divided into thirty-two (32) 16-bit channels. Of the thirty-two channels, four (4) channels are assigned to each of the DSPs 106 in the imaging devices 70a to 70f and to the DSP 122 in the master controller 120. The remaining channels are unused and may be reserved for further expansion of control and image processing functionality (e.g., use of additional imaging devices). The master controller 120 monitors the channels assigned to the DSPs 106 while the DSP 106 in each of the imaging devices monitors the five (5) channels assigned to the master controller DSP 122. Communications between the master controller 120 and each of the imaging devices 70a to 70f are performed as background processes in response to interrupts.

In this embodiment, the processing device 140 is a general purpose computing device. The computing device comprises for example a processing unit, system memory (volatile and/or non-volatile memory), other removable or non-removable memory (hard drive, RAM, ROM, EEPROM, CD-ROM, DVD, flash memory, etc.), and a system bus coupling various components to the processing unit. The processing unit runs a host software application/operating system and provides display output to the LCD panel 60. During execution of the host software application/operating system, a graphical user interface is presented on the display surface of the LCD panel 60 allowing one or more users to interact with the graphical user interface via touch input on the display area 62.

Figure 10A:
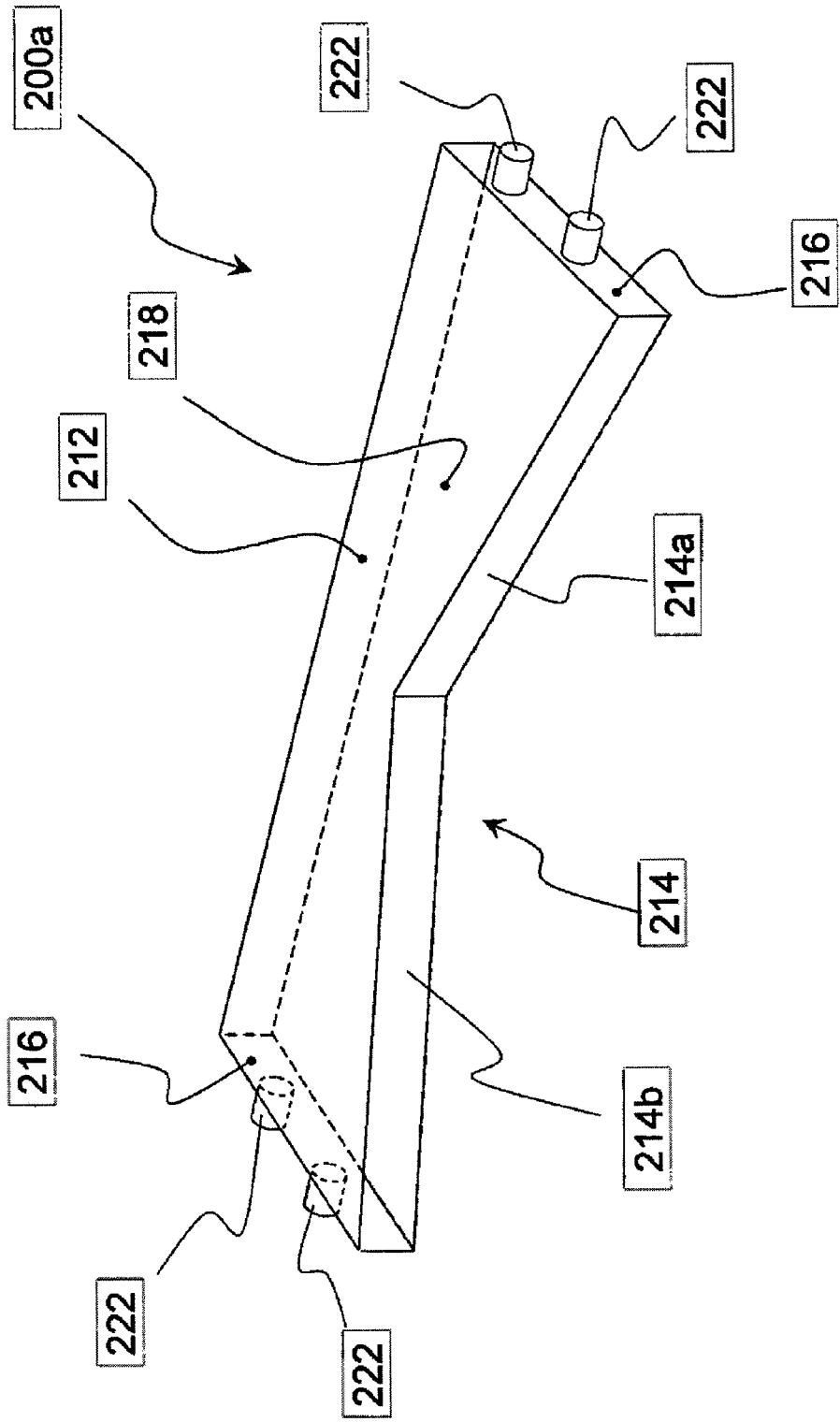
FIGS. 10a and 10b are perspective and top plan views, respectively, of a bezel segment forming part of the illuminated bezel.
Figure 10B:
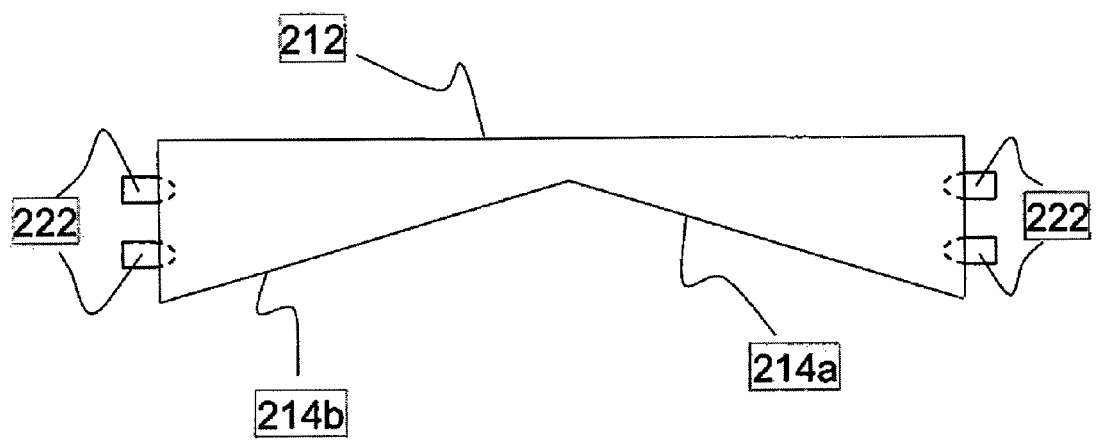
Figure 10C:
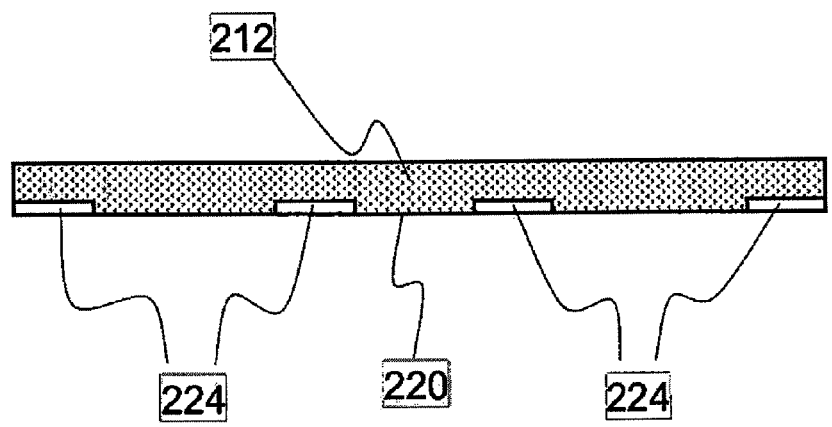
FIG. 10c shows a generic diffuser on the bezel segment of FIGS. 10a and 10b.

The illuminated bezel 72 comprises four bezel segments 200a to 200d with each bezel segment extending substantially the entire length along one side of the input area 62. FIGS. 10a to 10c better illustrate the bezel segment 200a. As can be seen, the bezel segment is formed of a homogeneous piece of clear, light transmissive material such as for example Lexan®, Plexiglas, acrylic or other suitable material. The bezel segment 200a comprises a front surface 212 that extends substantially the entire length along one major side of the input area 62, a back surface 214, two side surfaces 216, a top surface 218 and a bottom surface 220. The front, back and side surfaces of the bezel segment 200a are generally normal to the plane of the input area 62. Each side surface 216 has a pair of laterally spaced bores formed therein that accommodate light sources. In this particular embodiment, the light sources are infrared (IR) light emitting diodes (LEDs) 222 although LEDs that emit light at different wavelengths may be used. The top, bottom, side and back surfaces of the bezel segment 200a are coated with a reflective material to reduce the amount of light that leaks from the bezel segment via these surfaces. The front surface 212 of the bezel segment 200a is textured or covered with a diffusive material to produce a diffusive surface that allows light to escape from the bezel segment into the input area 62.

The geometry of the bezel segment 200a is such that the reflective back surface 214 is v-shaped with the bezel segment being most narrow at its midpoint. As a result, the reflective back surface 214 defines a pair of angled reflective surface panels 214a and 214b with the ends of the panels that are positioned adjacent the center of the bezel segment 200a being closer to the front surface 212 than the opposite ends of the surface panels. Optionally, the front surface 212 can be a diffusive material (using film, surface modifications, lenses, paint, paper, or other type of diffusive element known to those of skill in the art), in order to scatter the light more evenly. This bezel segment configuration compensates for the attenuation of light emitted by the IR LEDs 222 that propagates through the body of the bezel segment 200a by tapering towards the midpoint of the bezel segment 200a. The luminous emittance of the bezel segment 200a is maintained generally at a constant across the surface 212 by reducing the volume of the bezel segment 200a further away from the IR LEDs 222 where the attenuation has diminished the light flux. By maintaining the luminous emittance generally constant across the bezel, the amount of light leaking out the side 212 is a generally uniform density. This helps to make the bezel segment 200a illumination appear uniform to the imaging devices 70a to 70f.

Shallow notches 224 are provided in the bottom surface 220 of the bezel segment 200a to accommodate the imaging devices 70a, 70e, 70f and 70b. In this manner, the imaging devices are kept low relative to the front surface 212 so that the imaging devices block as little of the light escaping the bezel segment 200a via the diffusive front surface 212 as possible while still being able to view across the input surface, and thus, the height of the bezel segment can be reduced. An alternative embodiment may have slots within the bezel segments to accommodate the imaging devices.

Figure 12:
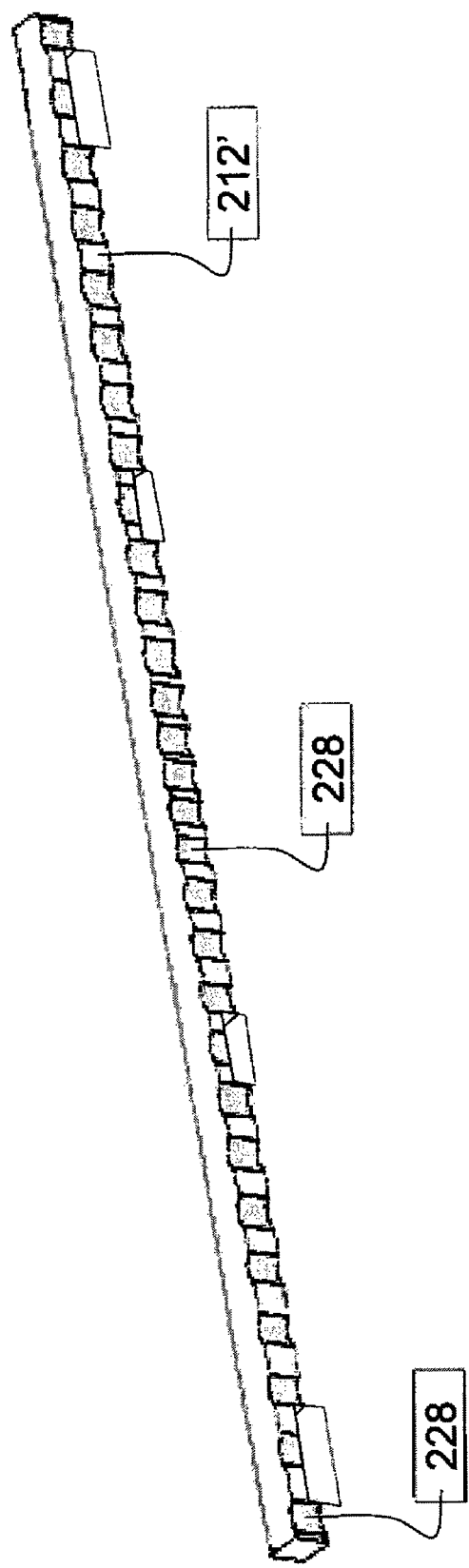
FIG. 12 is a perspective view of a portion of the illuminated bezel segment showing an alternative diffusive front surface.

FIG. 11b and 11c show alternative dimple patterns provided on the front surface 212 of the bezel segment with the density of the dimples 226' and 226" increasing towards the center of the bezel segment to allow more light to escape the center of the bezel segment as compared to the ends of the bezel segment. This type of pattern could be used with the v-shaped bezel or not. FIG. 12 shows an alternative textured front surface 212' configured to allow more light to escape the center of the bezel segment as compared to the ends of the bezel segment. As can be seen, in this embodiment spaced vertical grooves or slits 228 are formed in the front surface 212' with the density of the grooves or slits 228 increasing towards the center of the bezel segment. Although not shown, rather than texturing the front surface of the bezel segment, a film may be placed on the front surface that is configured to allow more light to escape the center of the bezel segment as compared to the ends of the bezel segment.

The bezel segment 200c extending along the opposite major side of the input area 62 has a similar configuration to that described above with the exception that the number and positioning of the notches 224 (or alternatively slots) is varied to accommodate the imaging devices 70c and 70d that are covered by the bezel segment. The bezel segments 200b and 200d extending along the shorter sides of the input area 62 also have a similar configuration to that described above with the exceptions that the side surfaces of the bezel segments only accommodate a single IR LED 222 (as the lighting requirements are reduced due to the decreased length) and the number and the positioning of the notches 224 is varied to accommodate the imaging devices that are covered by the bezel segments.

During general operation of the interactive input system 50, the IR LEDs 222 of the bezel segments 200a to 200d are illuminated resulting in infrared backlighting escaping from the bezel segments via the front surfaces into the input area 62. As mentioned above, the design of the bezel segments 200a to 200d is configured such that the illumination escaping each bezel segment is generally even along the length of the bezel segment. Each imaging device which looks across the input area 62 is conditioned by its associated DSP 106 to acquire image frames. When no pointer or target is in the field of view of an imaging device, the imaging device sees the infrared backlighting emitted by the bezel segments and thus, generates a "white" image frame. When a pointer occludes infrared backlighting emitted by at least one of the bezel segments, the target appears in the image frame as a "dark" region on a "white" background. For each imaging device, image data acquired by its image sensor 100 is processed by the DSP 106 to determine if one or more targets (e.g. pointers) is/are believed to exist in each captured image frame. When one or more targets is/are determined to exist in a captured image frame, pointer characteristic data is derived from that captured image frame identifying the target position(s) in the captured image frame.

The pointer characteristic data derived by each imaging device is then conveyed to the master controller 120. The DSP 122 of the master controller in turn processes the pointer characteristic data to allow the location(s) of the target(s) in (x,y) coordinates relative to the input area 62 to be calculated.

The calculated target coordinate data is then reported to the processing device 140, which in turn records the target coordinate data as writing or drawing if the target contact(s) is/are write events or injects the target coordinate data into the active application program being run by the processing device 140 if the target contact(s) is/are mouse events. As mentioned above, the processing device 140 also updates the image data conveyed to the LCD panel 60 so that the image presented on the display surface of the LCD panel 60 reflects the pointer activity.

When a single pointer exists in the image frames captured by the imaging devices 70, the location of the pointer in (x,y) coordinates relative to the input area 62 can be readily computed using triangulation. When multiple pointers exist in the image frames captured by the imaging devices 70, computing the positions of the pointers in (x,y) coordinates relative to the input area 62 is more challenging as a result of the pointer ambiguity and occlusion issues.

Pointer ambiguity arises when multiple targets are in contact with the input area 62 at different locations and are within the fields of view of multiple imaging devices. If the targets do not have distinctive markings to allow them to be differentiated, the observations of the targets in each image frame produce real and false target results that cannot be readily differentiated.

Pointer occlusion arises when a target in the field of view of an imaging device occludes another target in the field of view of the imaging device, resulting in observation merges as will be described.

Depending on the position of an imaging device relative to the input area 62 and the position of a target within the field of view of the imaging device, an imaging device may or may not see a target brought into its field of view adequately to enable image frames acquired by the imaging device to be used to determine the position of the target relative to the input area 62. Accordingly, for each imaging device, an active zone with the field of view of the imaging device is defined. The active zone is an area that extends to a distance of radius away from the imaging device. This distance is pre-defined and based on how well a camera can measure an object at a certain distance. When a target appears in the active zone of the imaging device, image frames acquired by the imaging device are deemed to observe the target sufficiently such that the observation of the target within the image frame captured by the imaging device is processed. When a target is within the field of view of an imaging device but is beyond the active zone of the imaging device, the observation of the target is ignored. When a target is within the radius 'r' but outside the field of view of the imaging device, it will not be seen and that imaging device is not used in further to process the position of the target.

When a target appears in the field of view of an imaging device, the observation of the target defined by the area formed between two straight lines is created by the master processor, namely one line that extends from the imaging device to the bezel segment and crosses the left edge of the target, and another line that extends from the imaging device to the bezel segment and crosses the right edge of the target. When two or more imaging devices observe the same target and the observations created by the imaging devices overlap, the overlapping region of the observations is referred to as a candidate. The lines defining the perimeter of a candidate are referred to as a bounding box. If another observation partially overlaps a candidate, the bounding box is updated to include only the area where all observations overlap. At least two observations are needed to create a bounding box.

When a target is in an input region of the input area 62 and all imaging devices whose fields of view encompass the input region and whose active zones include at least part of the target, create observations that overlap, the resulting candidate is deemed to be a consistent candidate. The consistent candidate may represent a real target or a phantom target.

Figure 13:
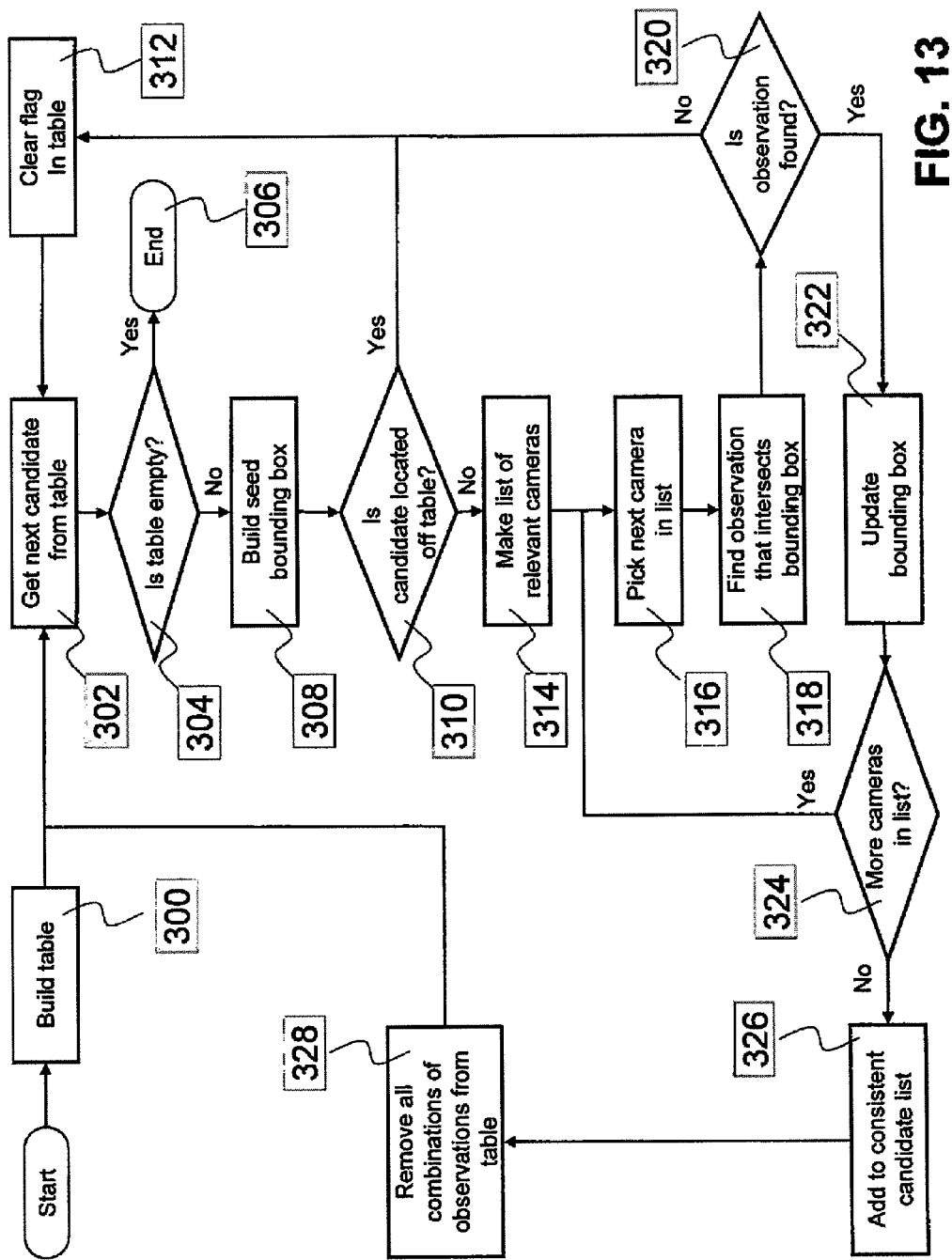
FIG. 13 is a flow chart showing the steps performed by during a candidate generation procedure.

The master processor 120 executes a candidate generation procedure to determine if any consistent candidates exist in captured image frames. FIG. 13 illustrates steps performed during the candidate generation procedure. During the candidate generation procedure, a table is initially generated, or "built", that lists all imaging device observations so that the observations generated by each imaging device can be cross referenced with all other observations to see if one or more observations result in a candidate (step 300).

As the interactive input system 50 includes six (6) imaging devices 70a to 70f and is capable of simultaneously tracking eight (8) targets, the maximum number of candidates that is possible is equal to nine-hundred and sixty (960). For ease of illustration, FIG. 14 shows an exemplary table identifying three imaging devices with each imaging device generating three observations. Cells of the table with an X indicate observations that are not cross-referenced with each other. For example, imaging device observations cannot be cross-referenced with any of their own observations. Cells of the table that are redundant are also not cross-referenced. In FIG. 14, cells of the table designated with a "T" are processed. In this example of three imaging devices and three targets, the maximum number of candidates to examine is twenty-seven (27). Once the table has been created at step 300, the table is examined from left to right and starting on the top row and moving downwards to determine if the table includes a candidate (step 302). If the table is determined to be empty (step 304), the table therefore does not include any candidates, and the candidate generation procedure ends (step 306).

At step 304, if the table is not empty and a candidate is located, a flag is set in the table for the candidate and the lines that make up the bounding box for the candidate resulting from the two imaging device observations are defined (step 308). A check is then made to determine if the position of the candidate is completely off the input area 62 (step 310). If the candidate is determined to be completely clear of the input area 62, the flag that was set in the table for the candidate is cleared (step 312) and the procedure reverts back to step 302 to determine if the table includes another candidate.

At step 310, if the candidate is determined to be partially or completely on the input area 62, a list of the imaging devices that have active zones encompassing at least part of the candidate is created excluding the imaging devices whose observations were used to create the bounding box at step 308 (step 314). Once the list of imaging devices has been created, the first imaging device in the list is selected (step 316). For the selected imaging device, each observation created for that imaging device is examined to see if it intersects with the bounding box created at step 308 (steps 318 and 320). If no observation intersects the bounding box, the candidate generation procedure reverts back to step 312 and the flag that was set in the table for the candidate is cleared. At step 320, if an observation that intersects the bounding box is located, the bounding box is updated using the lines that make up the observation (step 322). A check is then made to determine if another non-selected imaging device exists in the list (step 324). If so, the candidate generation procedure reverts back to step 316 and the next imaging device in the list is selected.

At step 324, if all of the imaging devices have been selected, the candidate is deemed to be a consistent candidate and is added to a consistent candidate list (step 326). Once the candidate has been added to the consistent candidate list, the combinations of observations that relate to the consistent candidate are removed from the table (step 328). Following this, the candidate generation procedure reverts back to step 302 to determine if another candidate exists in the table. As it will be appreciated, the candidate generation procedure generates a list of consistent candidates representing targets that are seen by all of the imaging devices whose fields of view encompass the target locations. For example, a consistent candidate resulting from a target in the central input region 62b is seen by all six imaging devices 70a to 70f whereas a consistent candidate resulting from a target in the left or right input region 62a or 62c is only seen by five imaging devices.

Figure 15:
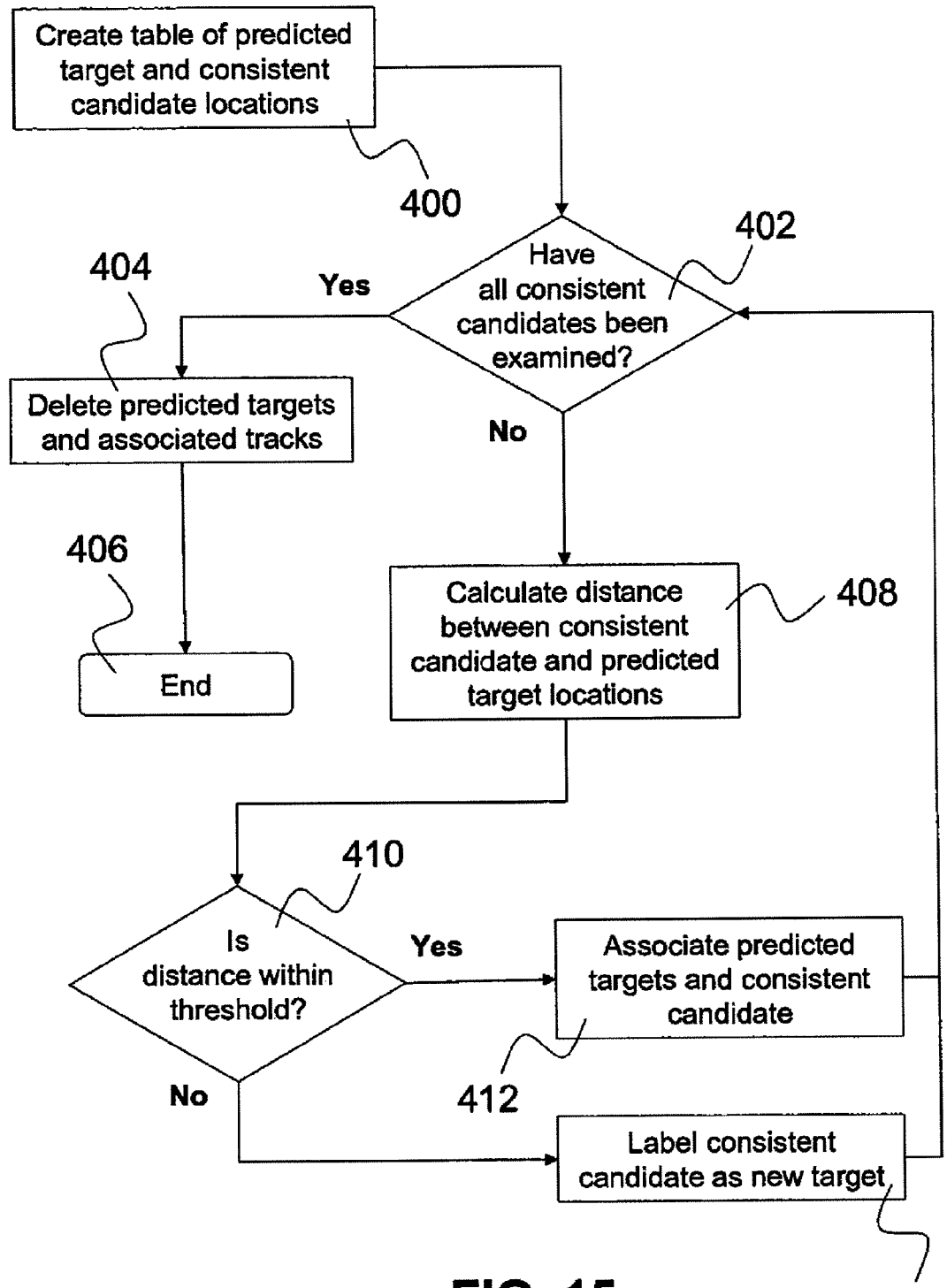
FIG. 15 is a flow chart showing the steps performed during an association procedure.

The master processor 120 also executes an association procedure as best shown in FIG. 15 to associate candidates with existing targets. During the association procedure, a table is created that contains the coordinates of the predicted target locations generated by the tracking procedure as will be described, and the location of the consistent candidates in the consistent candidate list created during the candidate generation procedure (step 400). A check is then made to determine if all of the consistent candidates have been examined (step 402). If it is determined that all of the consistent candidates have been examined, any predicted targets that are not associated with a consistent candidate are deemed to be associated with a dead path. As a result, the predicted target location and previous tracks associated with these predicted targets are deleted (step 404) and the association procedure is terminated (step 406).

At step 402, if it is determined that one or more of the consistent candidates have not been examined, the next unexamined consistent candidate in the list is selected and the distance between the consistent candidate and all of the predicted target locations is calculated (step 408). A check is then made to determine whether the distance between the consistent candidate and a predicted target location falls within a threshold (step 410). If the distance falls within the threshold, the consistent candidate is associated with the predicted target (step 412). Alternatively, if the distance is beyond the threshold, the consistent candidate is labeled as a new target (step 414). Following either of steps 412 and 414, the association procedure reverts back to step 402 to determine if all of the consistent candidates in the consistent candidate list have been selected. As a result, the association procedure identifies each candidate as either a new target contacting the input area 62 or an existing target.

Figure 16:
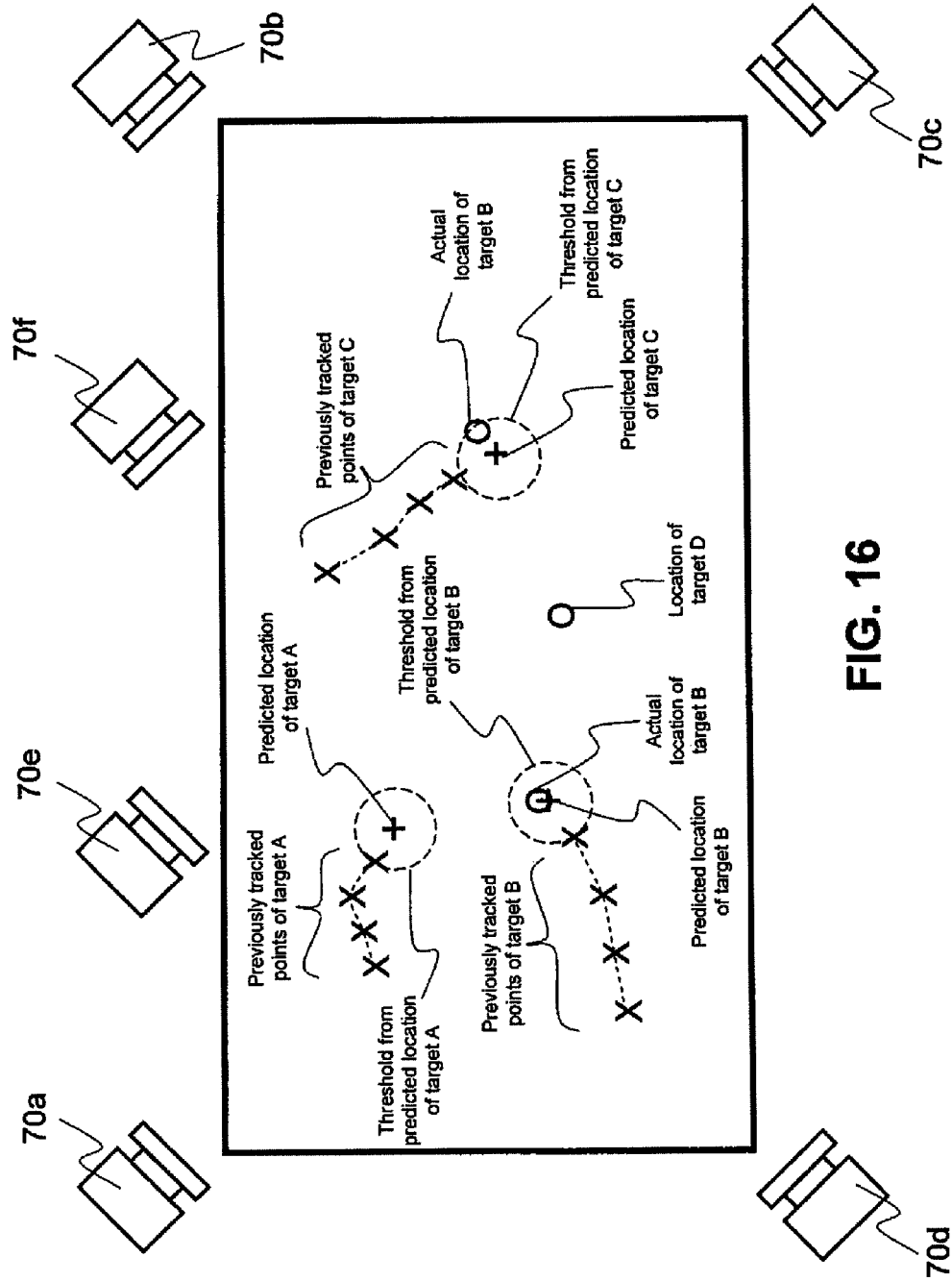
FIG. 16 shows an example of multiple target tracking.

FIG. 16 shows an example of the interactive input system 50 tracking three objects; A, B and C. The locations of four previously triangulated targets for objects A, B and C are represented by an X. From these previously tracked target locations, an estimate (e.g. predicted target location) is made for where the location of the object should appear in the current frame, and is represented by a +. Since a user can manipulate an object on the input area 62 at an approximate maximum velocity of 4 m/s, and if the interactive input system 50 is running at 100 frames per second, then the actual location of the object should appear within [400 cm/s/100 frames/s×1 frame=4 cm] 4 centimeters of the predicted target location. This threshold is represented by a broken circle surrounding the predicted target location. Objects B and C are both located within the threshold of their predicted target locations and are thus associated with those respective previously tracked target location. The threshold around the predicted target location of object A does not contain object A, and is therefore considered a dead track and no longer used in subsequent image processing. Object D is seen at a position outside all of the calculated thresholds and is thus considered a new object and will continue to be tracked in subsequent frames.

The master processor 120 executes a state estimation procedure to determine the status of each candidate, namely whether each candidate is clear, merged or irrelevant. If a candidate is determined to be merged, a disentanglement process is initiated. During the disentanglement process, the state metrics of the targets are computed to determine the positions of partially and completely occluded targets. Initially, during the state estimation procedure, the consistent candidate list generated by the candidate generation procedure, the candidates that have been associated with existing targets by the association procedure, and the observation table are analyzed to determine whether each imaging device had a clear view of each candidate in its field of view or whether a merged view of candidates within its field of view existed. Candidates that are outside of the active areas of the imaging devices are deemed not relevant and flagged as being irrelevant.

Figure 41:
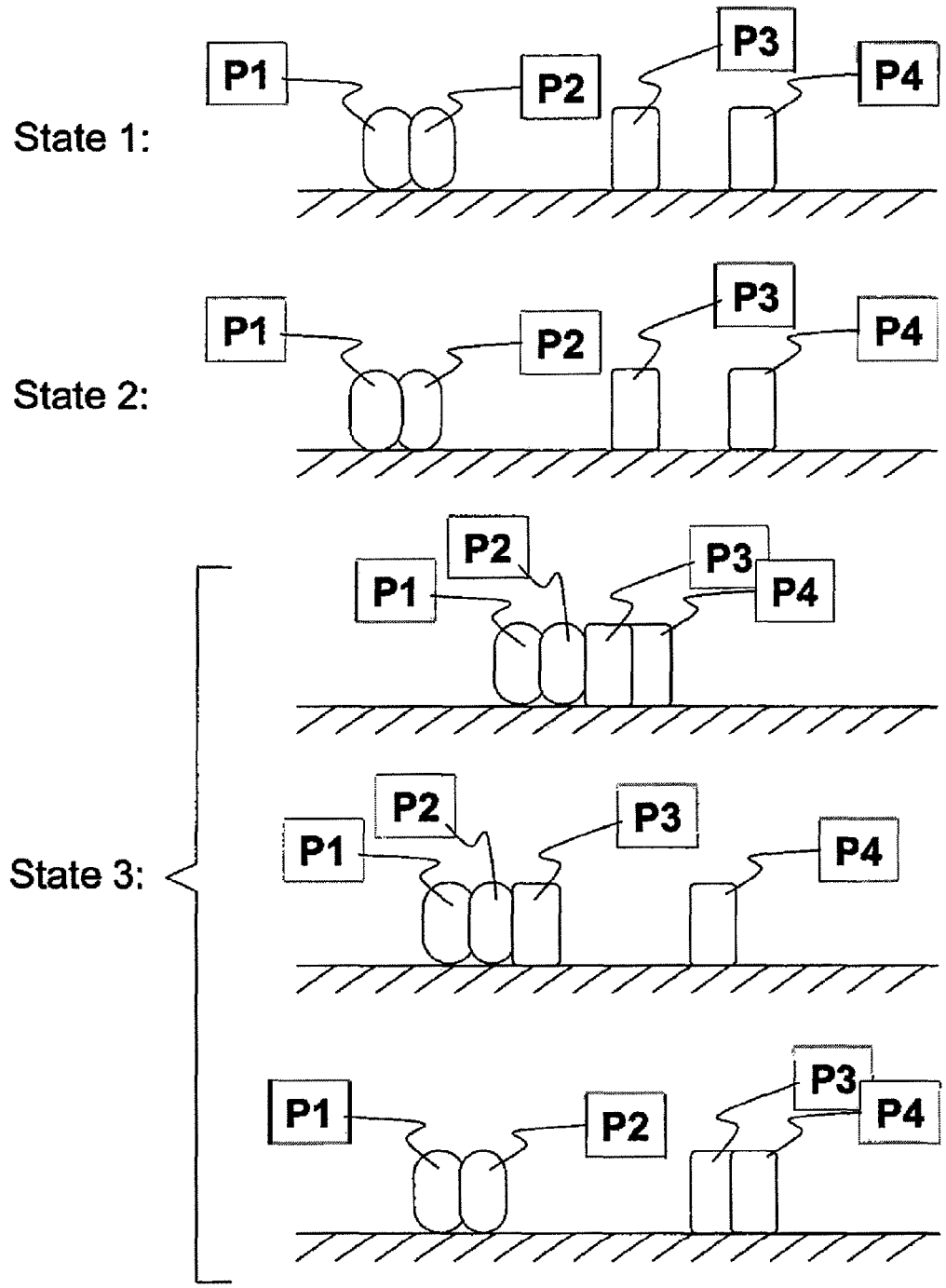
FIG. 41 shows exemplary frame captures of the input area showing the three possible states for multiple targets as seen by an imaging device.

The target and phantom track identifications from the previous frames are used as a reference to identify true target merges. When a target merge for an imaging device is deemed to exist, the disentanglement process for that imaging device is initiated. The disentanglement process makes use of the Viterbi algorithm. Depending on the number of true merges, the Viterbi algorithm assumes a certain state distinguishing between a merge of only two targets and a merge of more than two targets. In this particular embodiment, the disentanglement process is able to occupy one of the three states shown in FIG. 41, which depicts a four-input situation.

A Viterbi state transition method computes a metric for each of the three states. In this embodiment, the metrics are computed over five (5) image frames including the current image frame and the best estimate on the current state is given to the branch with the lowest level. The metrics are based on the combination of one dimensional predicted positions and widths with one dimensional merged observations. The state with the lowest branch is selected and is used to associate targets within a merge thereby to enable the predictions to disentangle merge observations.

For states 1 and 2, the disentanglement process yields the left and right edges for the merged targets. Only the center position for all the merges in state 3 is reported by the disentanglement process.

Once the disentanglement process has been completed, the states flag indicating a merge is cleared and a copy of the merged status before being cleared is maintained. To reduce triangulation inaccuracies due to disentanglement observations, a weighting scheme is used on the disentangled targets. Targets associated with clean observations are assigned a weighting of one (1). Targets associated with merged observations are assigned a weighting in the range from 0.5 to 0.1 depending on how far apart the state metrics are from each other. The greater the distance between state metrics, the higher the confidence of disentangling observations and hence the higher the weighting selected from the above range.

Figure 17:
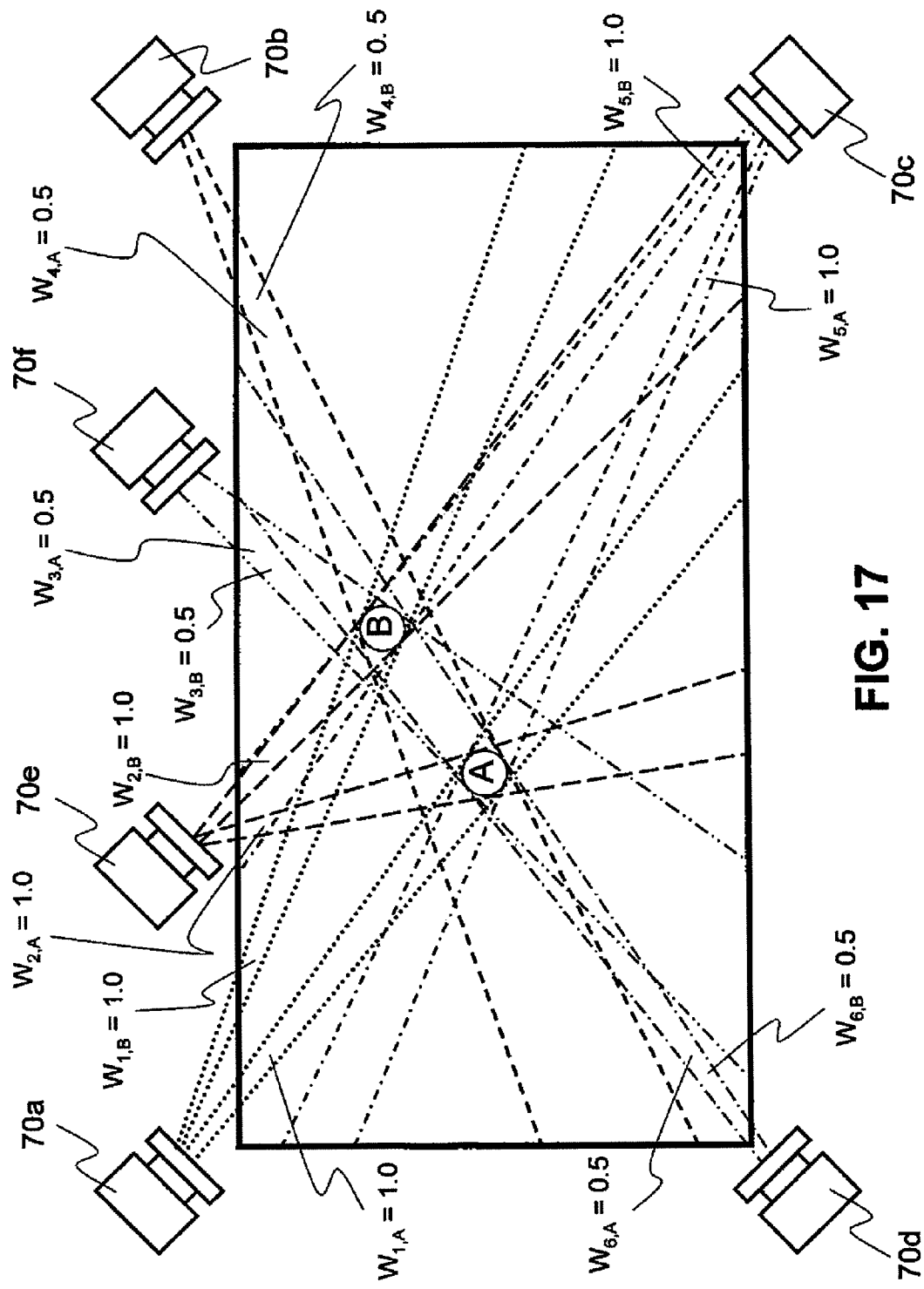
FIGS. 17 and 18 show two targets contacting the input area 62 and the weights assigned to the observations associated with the targets.

FIG. 17 shows an example of two objects, A and B, contacting the input area 62 and being viewed by imaging devices 70*a* to 70*f*. Imaging devices 70*a*, 70*e* and 70*c* all have two observations, one of object A and the other of object B. Imaging devices 70*f*, 70*b*, and 70*d* all have one observation. Since at least one imaging device shows two observations, the state estimation module determines that there must be two objects contacting the input area 62. Imaging devices 70*a*, 70*e* and 70*c* each see objects A and B clearly and so each observation is assigned a weight of 1.0. Imaging devices 70*f*, 70*b* and 70*d* observe only one object, determine that these two objects must appear merged, and assign a weight of 0.5 to each observation.

Figure 18:
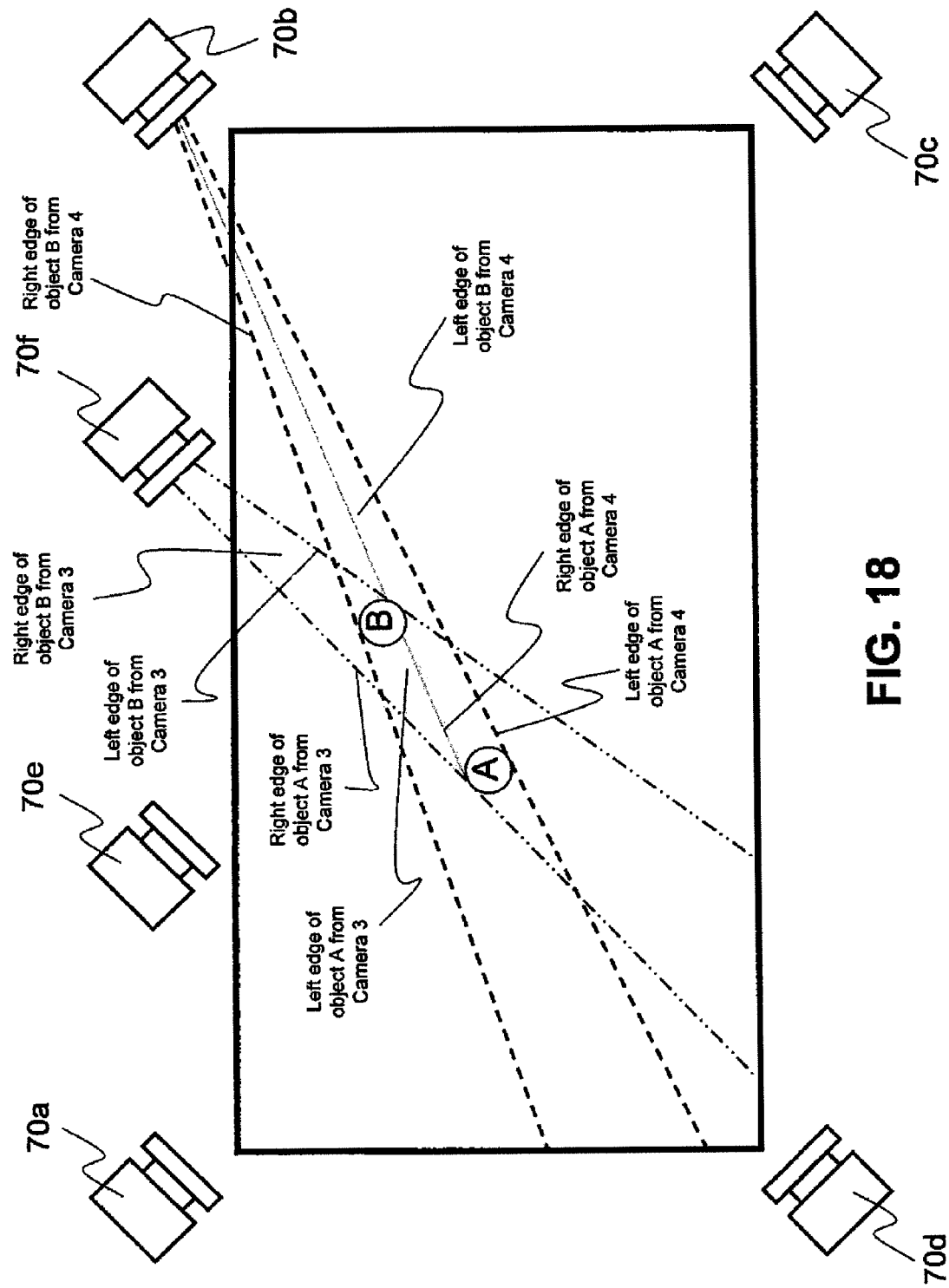

FIG. 18 shows objects A and B as viewed by imaging devices 70*f* and 70*b*. Since these objects appear merged to these imaging devices, the state estimation procedure approximates the actual position of the objects based on earlier data. From previous tracking information, the approximate widths of the objects are known. Since the imaging devices 70*f* and 70*b* are still able to view one edge of each of the objects, the other edge is determined based on the previously stored width of the object. The state estimation module calculates the edges of both objects for both imaging devices 70*f* and 70*b*. Once both edges of each object are known, the center line for each object from each imaging device is calculated.

As mentioned previously, the master processor 120 also executes a tracking procedure to track existing targets. During the tracking procedure, each target seen by each imaging device is examined to determine its center point and a set of radii. The set of radii comprises a radius corresponding to each imaging device that sees the target represented by a line extending from the optical axis of the imaging device to the center point. If a target is associated with an object, a Kalman filter is used to estimate the current state of the target and to predict its next state. This information is then used to backwardly triangulate the location of the target at the next time step which approximates an observation of the target if the target observation overlaps another target observation seen by the imaging device. If the target is not associated with a candidate, the target is considered dead and the target tracks are deleted from the track list. If the target is not associated with a candidate, and the number of targets is less than the maximum number of permitted targets, in this case eight (8), the candidate is considered to be a new target.

Figure 19:
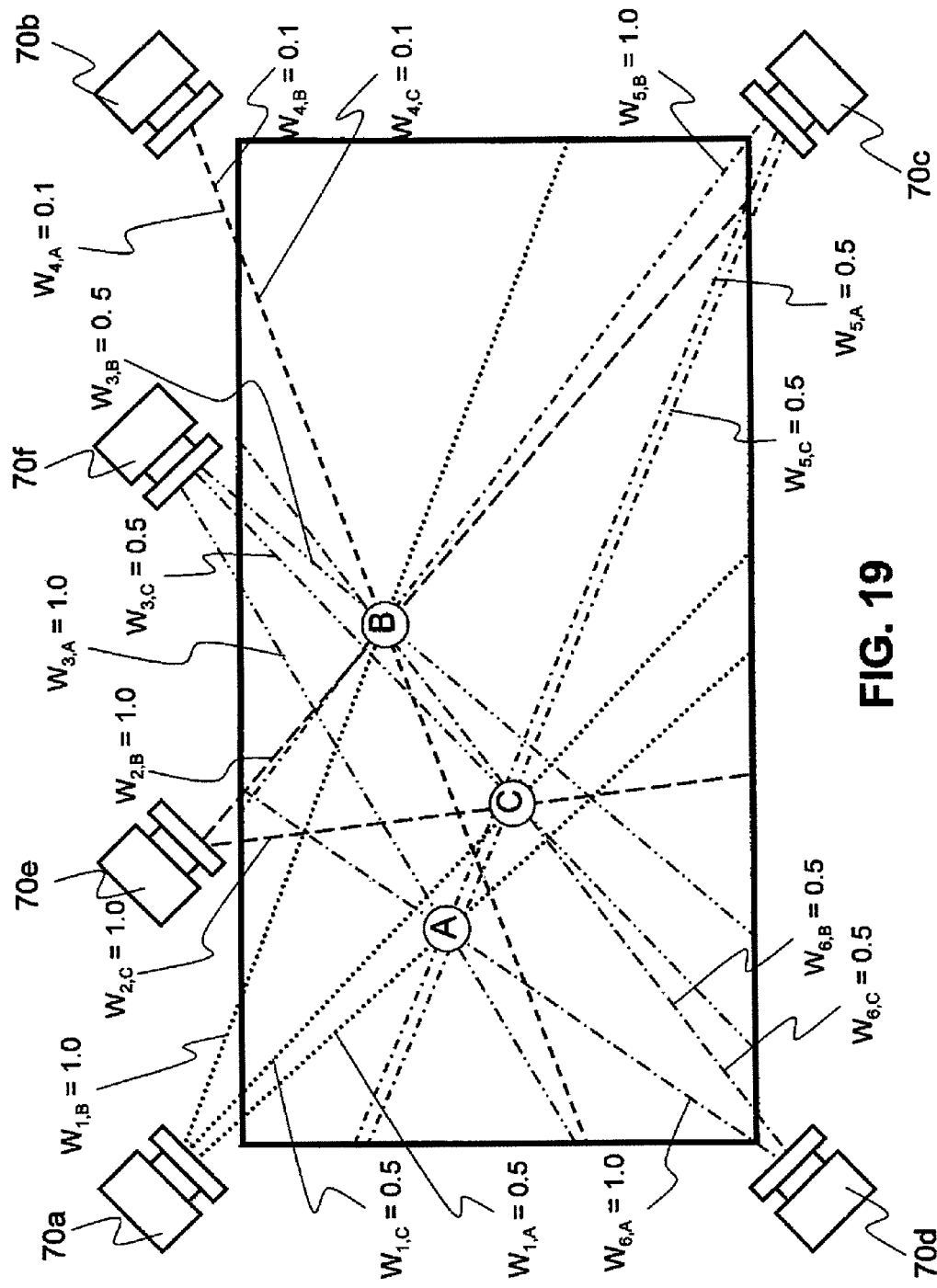
FIGS. 19 to 24 show multiple target scenarios, determined centerlines for each target observation and the weights assigned to the target observations.

FIG. 19 shows an input situation, similar to that of FIGS. 16 to 18. The centerline for each imaging device observation of each target is shown along with the corresponding assigned weight. Note that the centerlines of targets A and C as seen from imaging device 70a can be determined, along with the centerline of targets B and C as seen from imaging device 70f. The centerline of targets A, B and C as seen from imaging device 70b could not be determined and as a result, the center of the merged observation is used for the centerline. The value of the weight assigned to these observations is very low.

Figure 20:
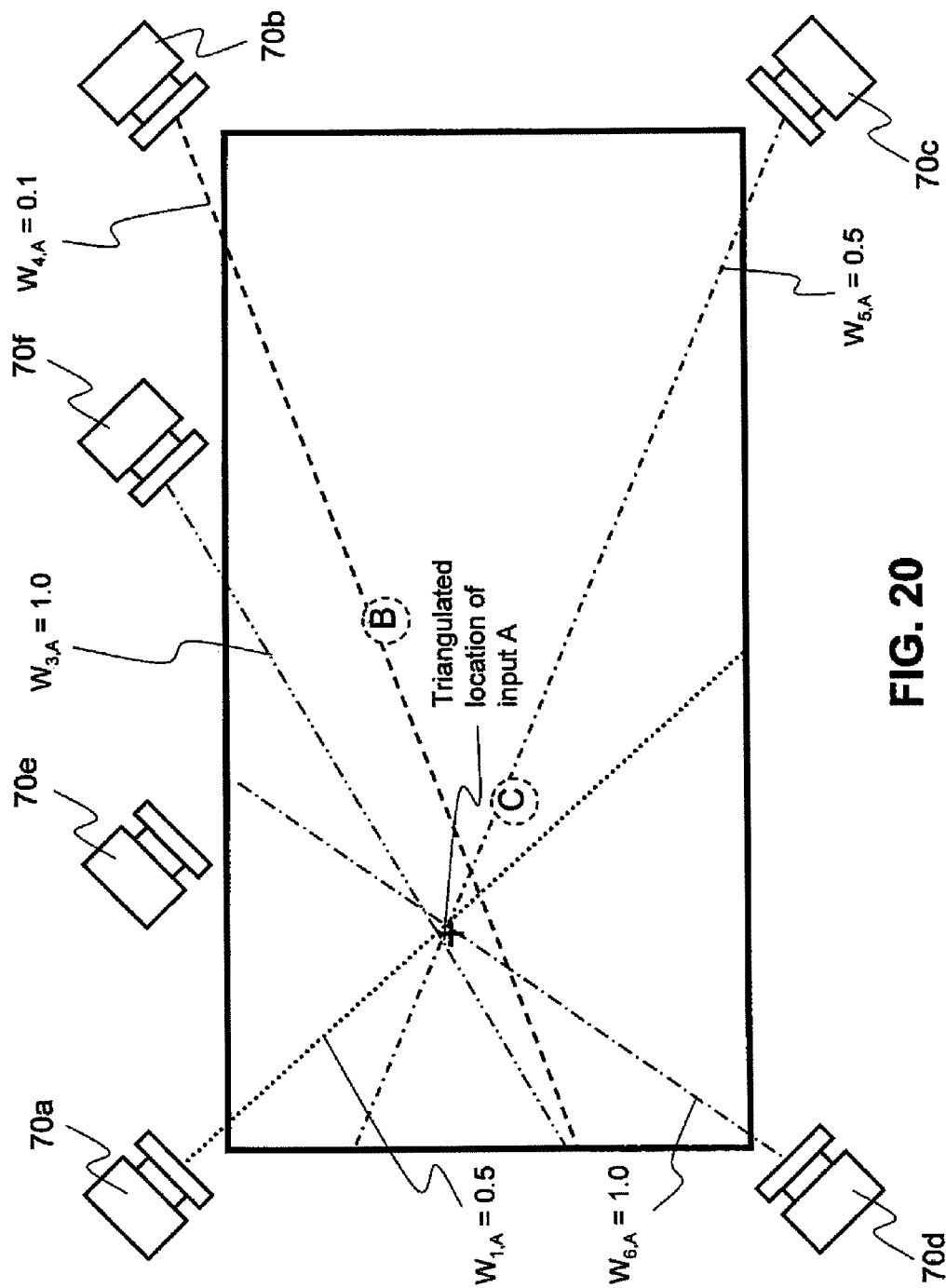

FIG. 20 shows the triangulated location of target A from the centerlines of the observations from imaging devices 70a, 70f and 70b. Since imaging device 70f has a clear view of the target A and has an observation with a high weight, the observation of imaging device 70a has a medium weight, and the observation of imaging device 70b has a low weight; the triangulated location is located closer to the intersection of the two lines with the higher weight since those observations are more reliable.

Figure 21:
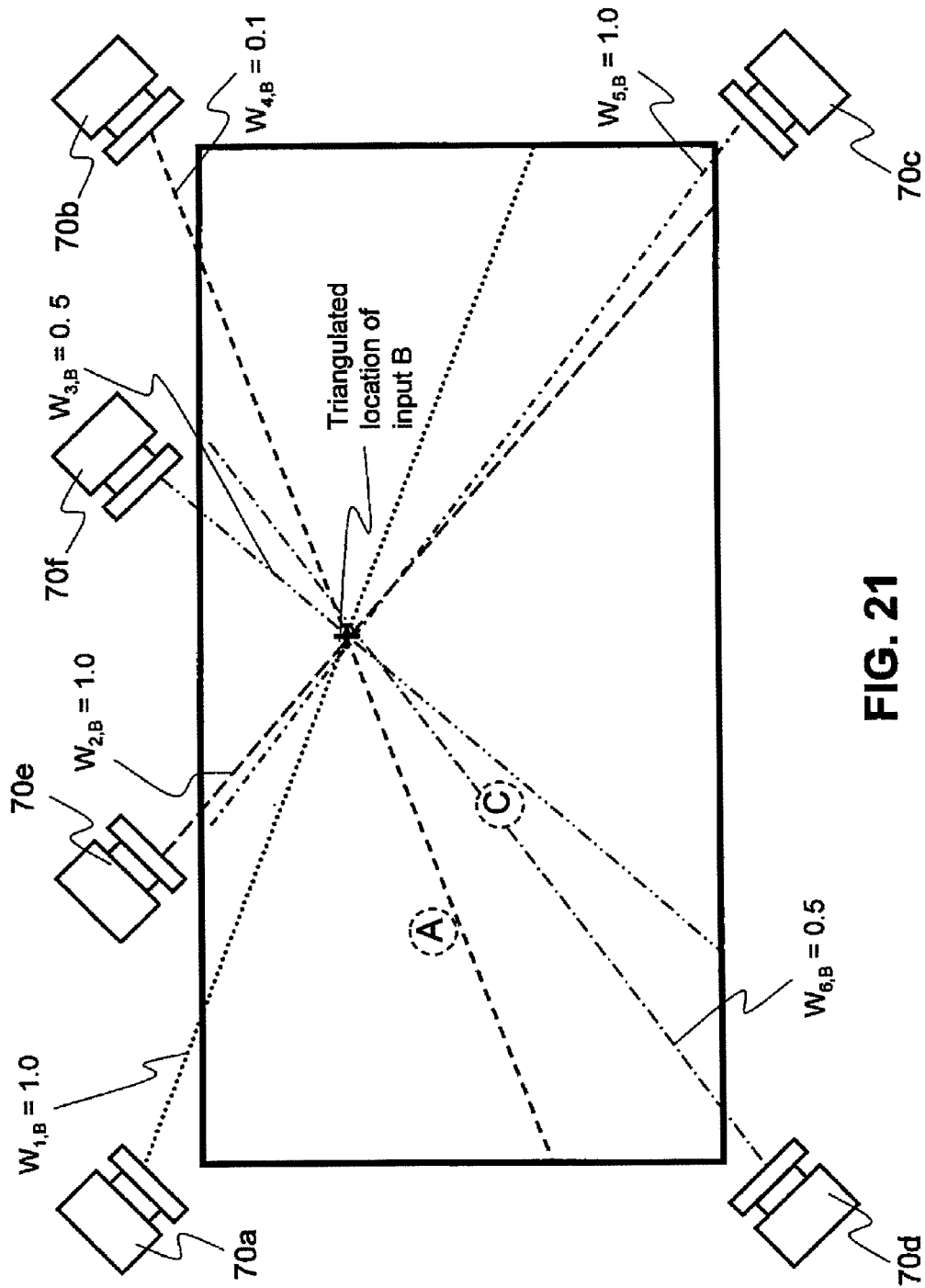

Similar to FIG. 20, FIG. 21 shows the centerline and triangulated position for target B. The triangulation is dominated by the highly weighted observations from imaging devices 70a and 70e.

Figure 22:
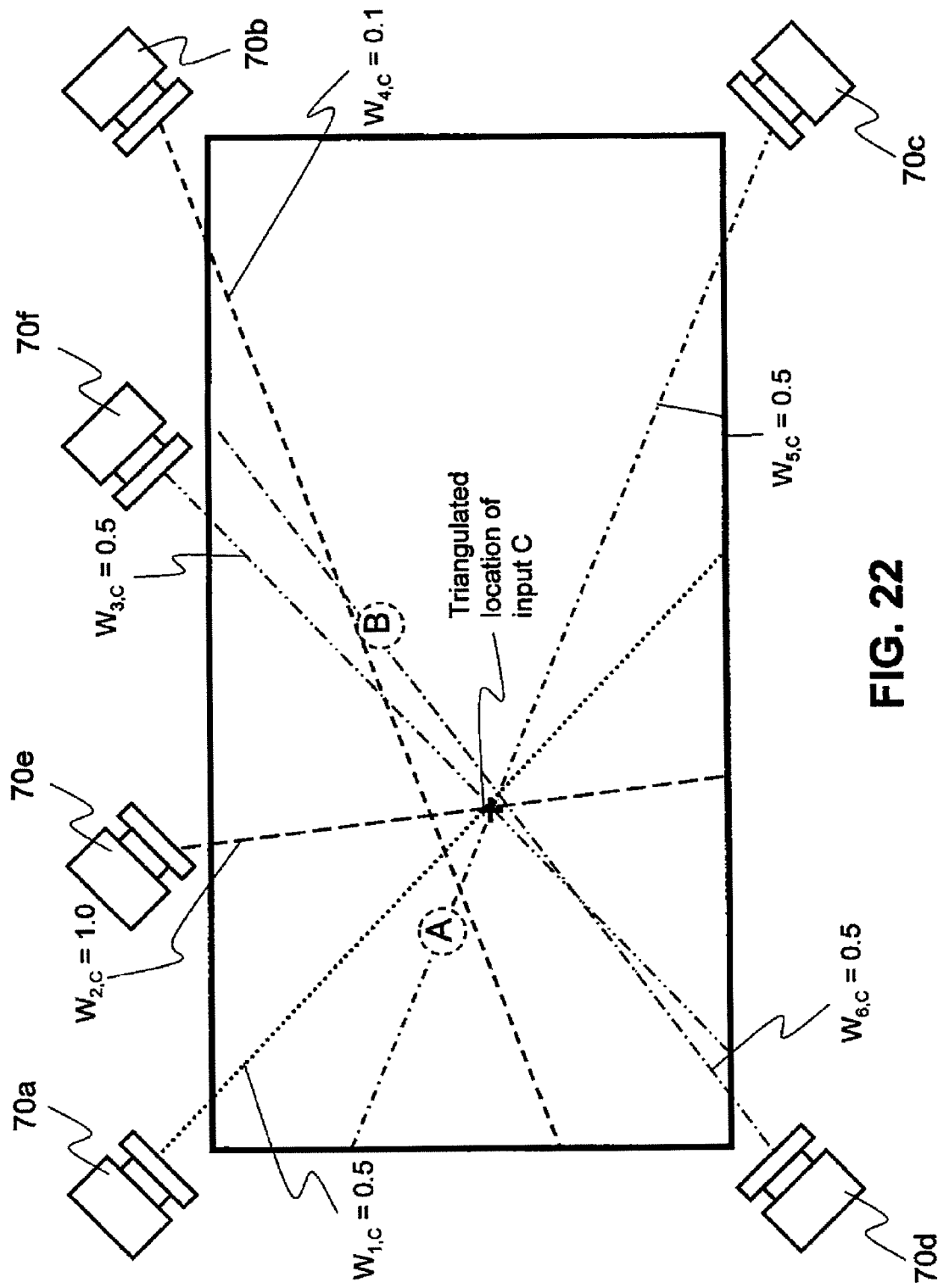

FIG. 22 shows the centerline and triangulated position for target C. It is clearly shown that the triangulated position was insignificantly influenced by the low weighted observation of imaging device 70b.

Figure 23:
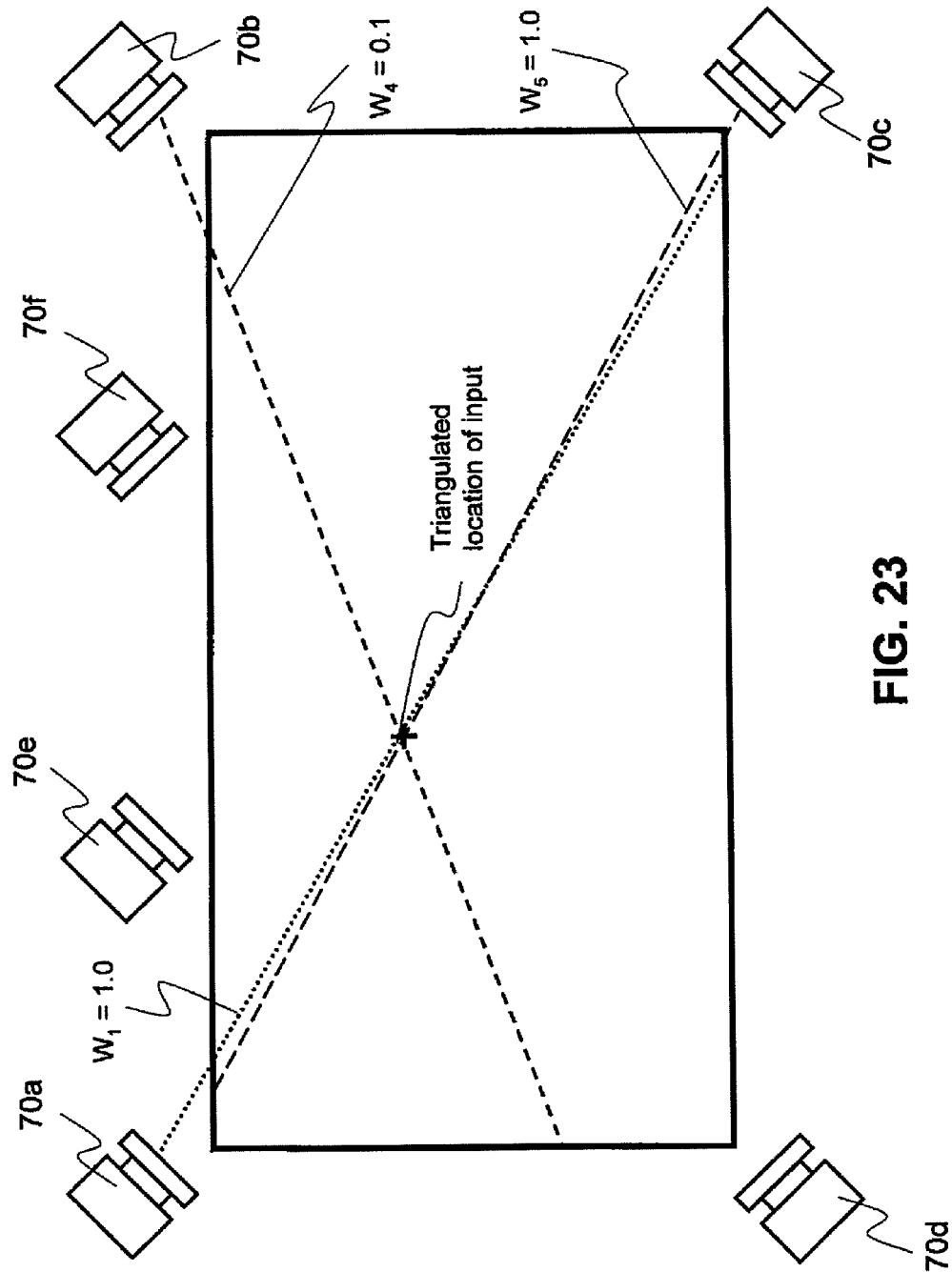

FIG. 23 shows an example of when a low weighted observation becomes important for an input. In this scenario the target is located almost directly between imaging devices 70a and 70c, which both have a clear view of the target and corresponding highly weighted observations. Imaging device 70b has a low weighted observation due to an ambiguity such as that situation presented in FIG. 19. The triangulation result from two imaging devices, in this case 70a and 70c, triangulating a point directly or nearly directly between the two imaging devices is unreliable. In this case where one observation is lowly weighted, the observation is important because it provides an additional view of the target needed for triangulation. Even though the observation is low weighted, it is still better than no other observation at all.

Figure 24:
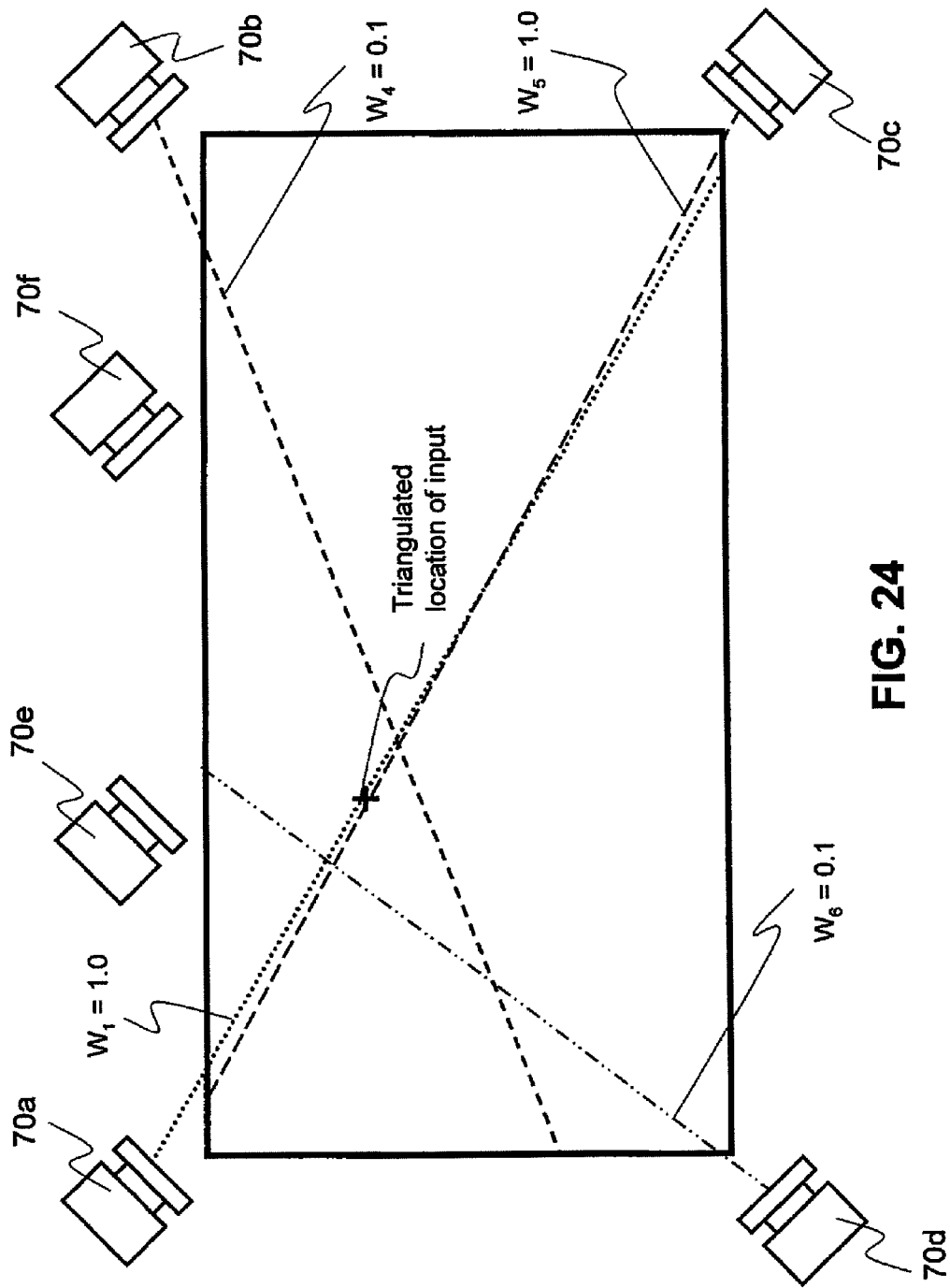

FIG. 24 depicts a similar scenario to that of FIG. 19 but has two imaging devices with low weighted observations (imaging devices 70b and 70d) and one imaging device with a high weighted observation (imaging device 70c). The observations from imaging device 70b and 70d are averaged to result in a triangulated point between the two observations and along the observation from imaging device 70c. In this case the triangulated location uses both low weighted observations to better locate the target.

Figure 25:
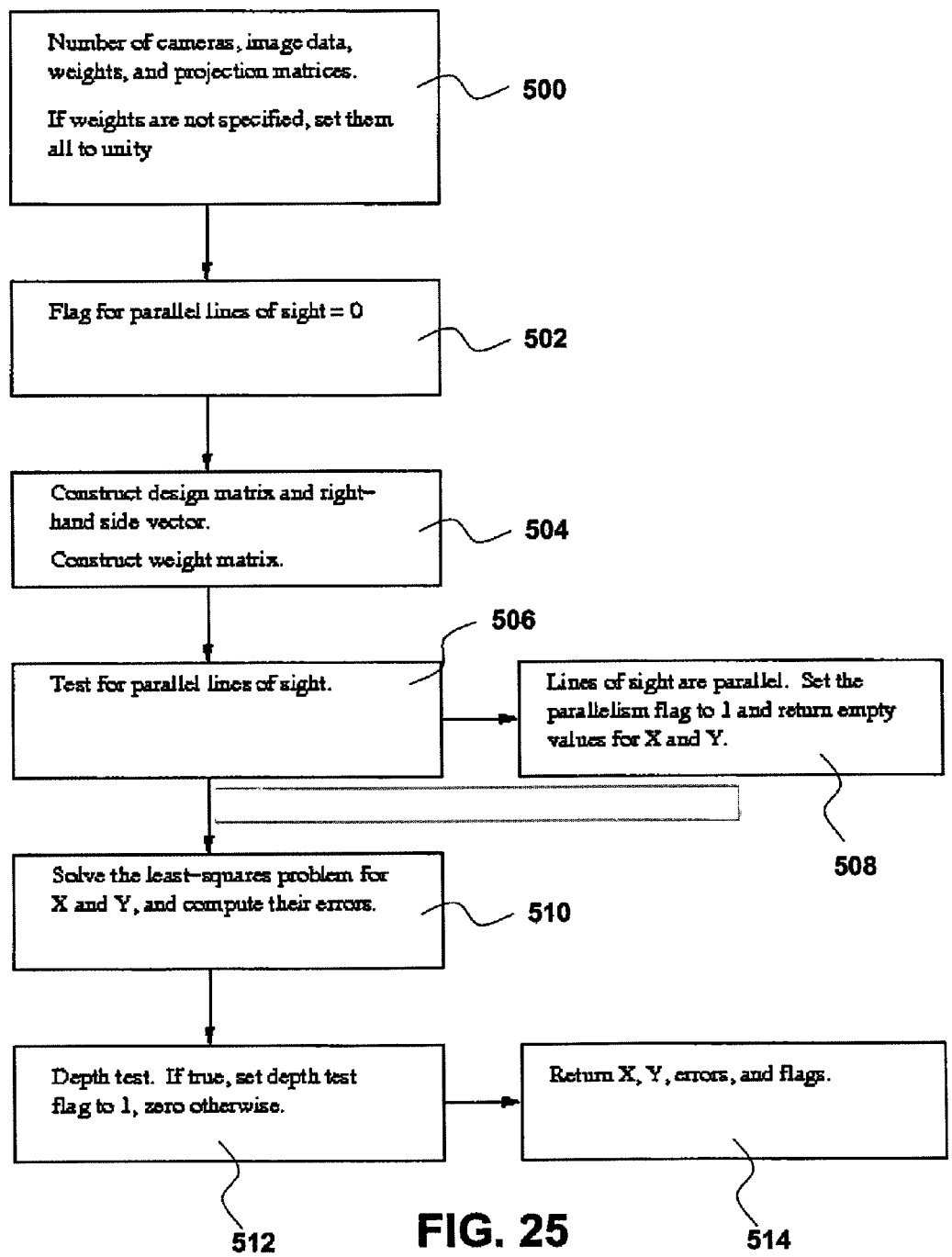
FIG. 25 is a flow chart showing the steps performed during triangulation of real and phantom targets.

FIG. 25 shows the steps performed during triangulation of real and phantom targets captured on the input area. During triangulation, the number N of imaging devices being used to triangulate a target (X,Y) coordinate, a vector x of length N containing image x-positions from each imaging device, a 2N x 3 matrix Q containing the projection matrices P for each imaging device, where Q=[P1|P2|...|PN], and a vector w of length N containing the weights assigned to each image observation position in x are used (step 500). If the weight vectors w are not specified, the weight vectors are set to a value of one (1). A binary flag for each parallel line of sight is then set to zero (0) (step 502). A tolerance for the parallel lines of sight is set to 2ϵ, where ϵ is the difference between 1 and the smallest exactly representable number greater than one. This tolerance gives an upper bound on the relative error due to rounding of floating point numbers and is hardware dependent. A least-squares design matrix A(N x 2) and right-hand side vector b are constructed by looping over the N available imaging device views (step 504). During this process, a 2 x 3 camera matrix P is extracted for the current image frame. A row is added to the design matrix containing [P11−x·P21, P12−x·P22]. An element is added to b containing [x·P23−P10]. An N x N diagonal matrix W containing the weights w is then created. The determinant (typically constructed using the method outlined in Wolfram MathWorld of the weighted normal equations is computed and a check is made to determine whether or not it is less than the tolerance for parallelism according to det(W·A)T·(W·A)) 2ϵ(step 506). This test determines whether A has linearly dependent rows. If the determinant is less than the tolerance, the parallelism flag is set to one (1) and X and Y are set to empty matrices (step 508). Otherwise, the linear least-squares problem for X and Y are solved according to (W A)T (W A)X=(W A)Tb (step 510) where X=[X,Y]T and b is also a two-element vector. The errors σx and σy X and Y are computed from the square roots of the diagonal elements Cii of the covariance matrix C defined by C=σ2·((W·A)T·(W·A))−1, where σ1 is the RMS error of the fit (i.e. the square root of chi-squared).

If N=2, no errors are computed as the problem is exactly determined. A check is then made to determine if the triangulated point is behind any of the imaging devices (step 512). Using the triangulated position, the expected target position for each imaging device is computed according to $x_{cal}$=P·X, where x contains the image position x and the depth λ. The second element of $x_{cal}$ is the depth λ from the imaging device to the triangulated point. If λ=0, the depth test flag is set to one (1) and zero (0) otherwise. If all components of $x_{cal}$ are negative, the double negative case is ignored. The computed X,Y, error values and test flags are then returned (step 514).

Figure 26:
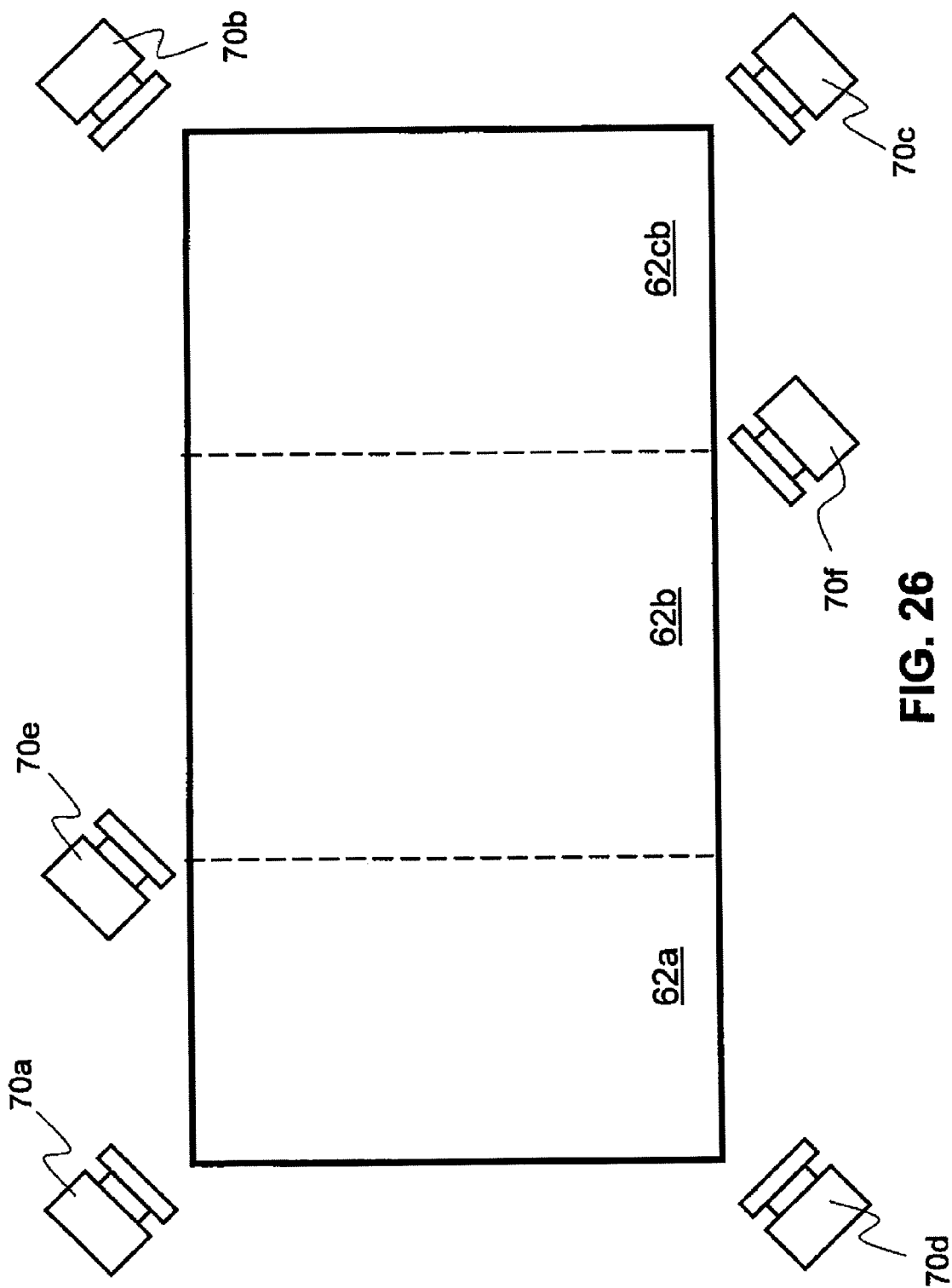
FIGS. 26 to 34 show alternative imaging device configurations for the interactive input system.

In the embodiment shown and described above, the interactive input system comprises six (6) imaging devices arranged about the input area 62 with four (4) imaging devices being positioned adjacent the corners of the input area and two imaging devices 70e and 70f positioned at spaced locations along the same side of the input area. Those of skill in the art will appreciate that the configuration and/or number of imaging devices employed in the interactive input system may vary to suit the particular environment in which the interactive input system is to be employed. For example, the imaging devices 70e and 70f do not need to be positioned along the same side of the input area. Rather, as shown in FIG. 26, imaging device 70e can be positioned along one side of the input area and imaging device 70f can be positioned along the opposite side of the input area.

Figure 27:
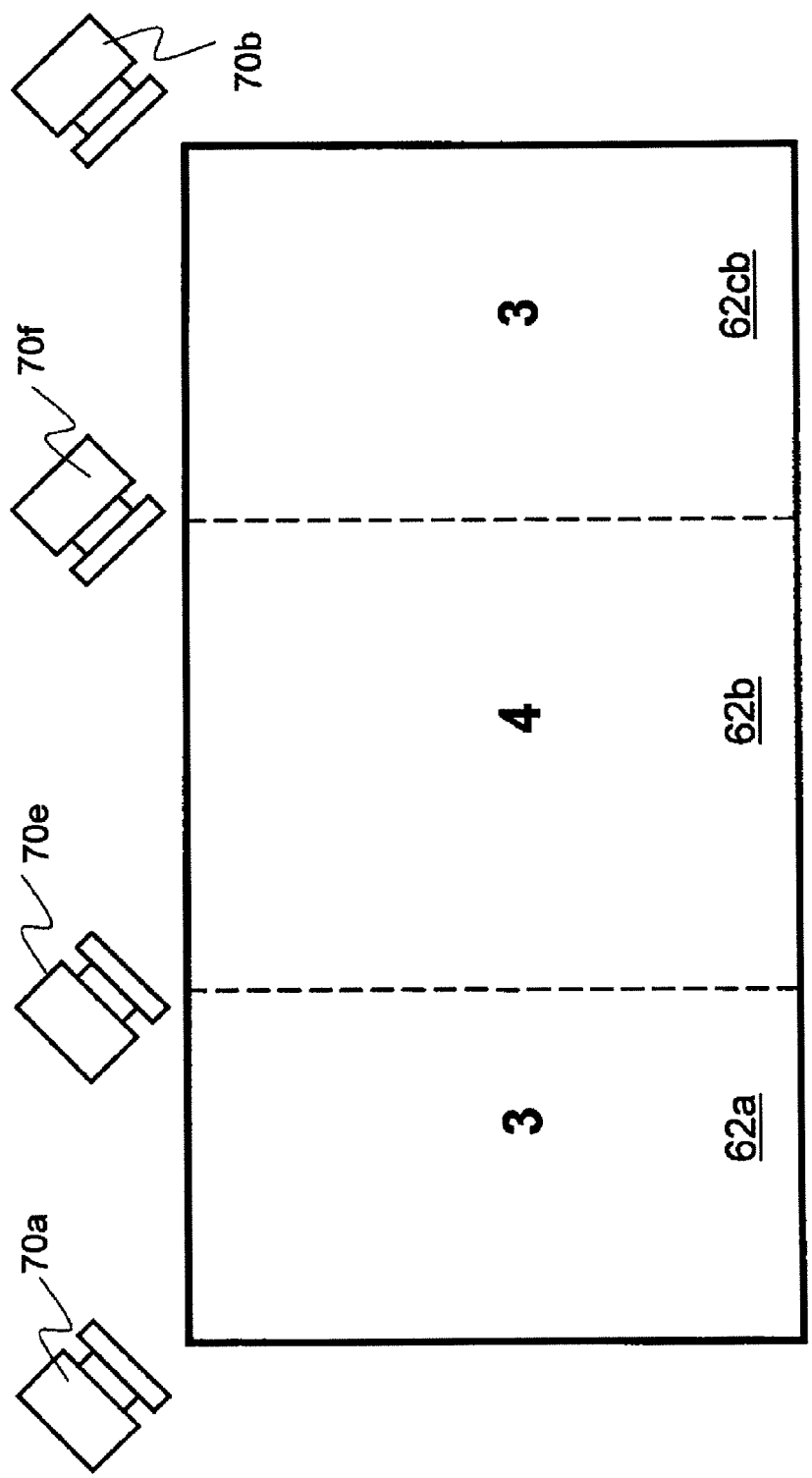

Turning now to FIG. 27, an alternative imaging device configuration for the interactive input system is shown. In this configuration, the interactive input system employs four (4) imaging devices 70a, 70e, 70f, and 70b arranged along one side of the input area 62. Imaging devices 70a, 70b are positioned adjacent opposite corners of the input area 62 and look generally across the entire input area 62. The intermediate imaging devices 70e, 70f are angled in opposite directions towards the center of the input area 62 so that the imaging devices 70a, 70e, 70f and 70b look generally across the two-thirds of input area 62. This arrangement of imaging devices divides the input area 62 into three input regions, namely a left input region 62a, a central input region 62b and a right input region 62c as shown. The left input region 62a is within the fields of view of three imaging devices, namely imaging devices 70a, 70e, and 70b. The right input region 62c is also within the fields of view of three imaging devices, namely imaging devices 70a, 70f, and 70b. The central input region 62b is within the fields of view of all four imaging devices 70a, 70e, 70f and 70b.

Figure 28:
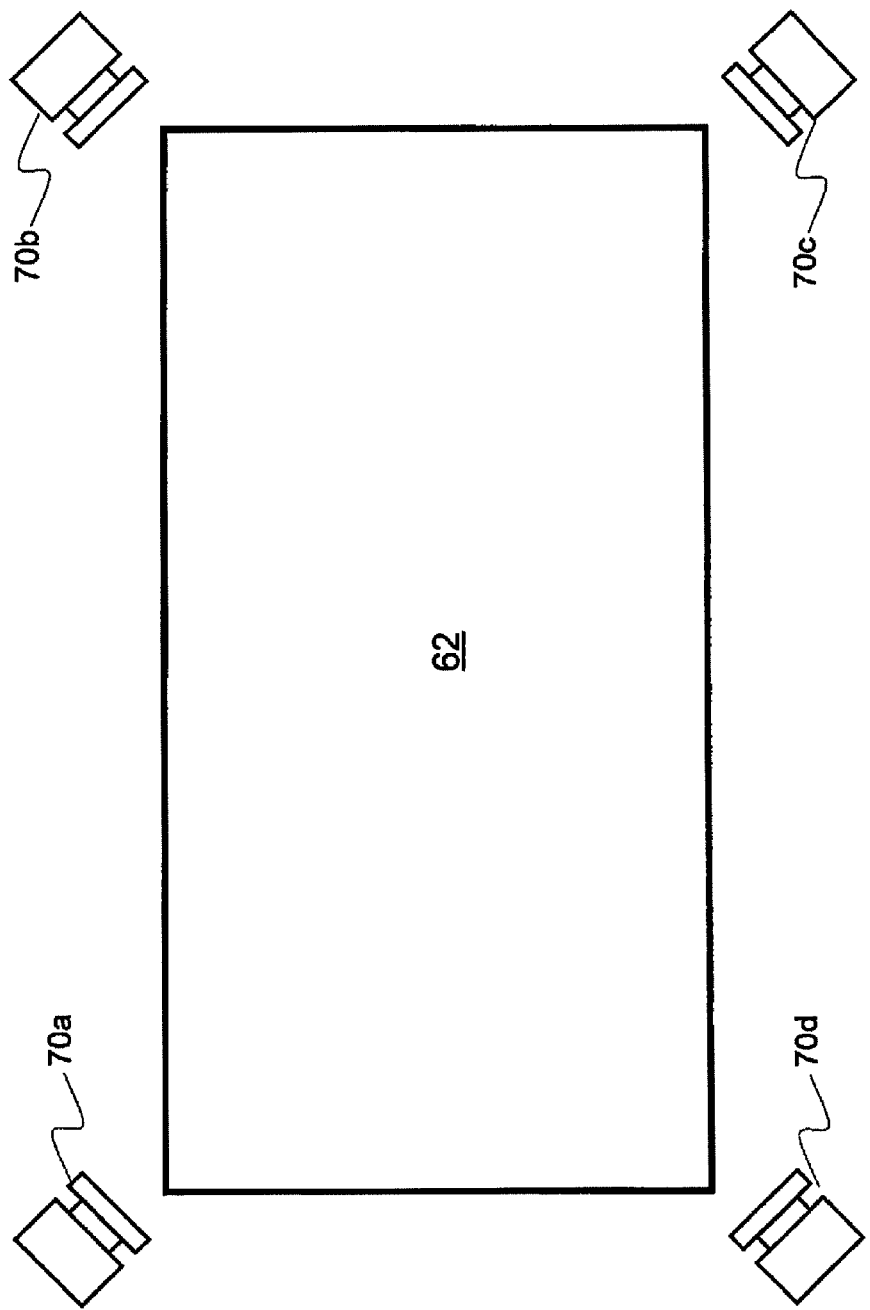

FIG. 28 shows another alternative imaging device configuration for the interactive input system. In this configuration, the interactive input system employs four (4) imaging devices 70a, 70b, 70c, 70d with each imaging device being positioned adjacent a different corner of the input area 62 and looking generally across the entire input area 62. With this imaging device arrangement, the entire input area 62 is within the fields of view of all four imaging devices.

Figure 29:
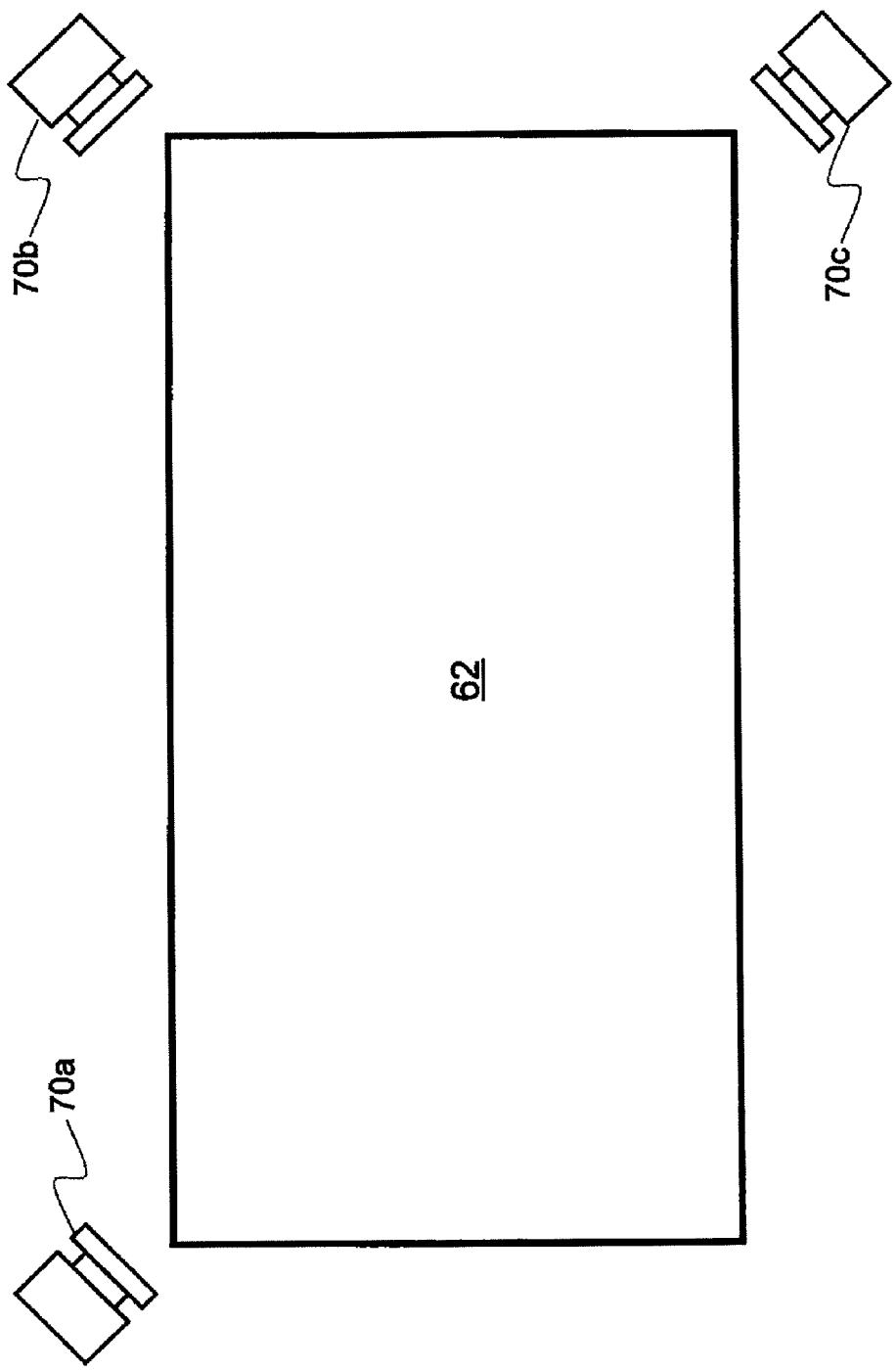

FIG. 29 shows yet another alternative imaging device configuration for the interactive input system. In this configuration, the interactive input system employs three (3) imaging devices 70a, 70b, 70c with each imaging device being positioned adjacent a different corner of the input area 62 and looking generally across the entire input area 62. With this imaging device arrangement, the entire input area is within the fields of view of all three imaging devices.

Figure 30:
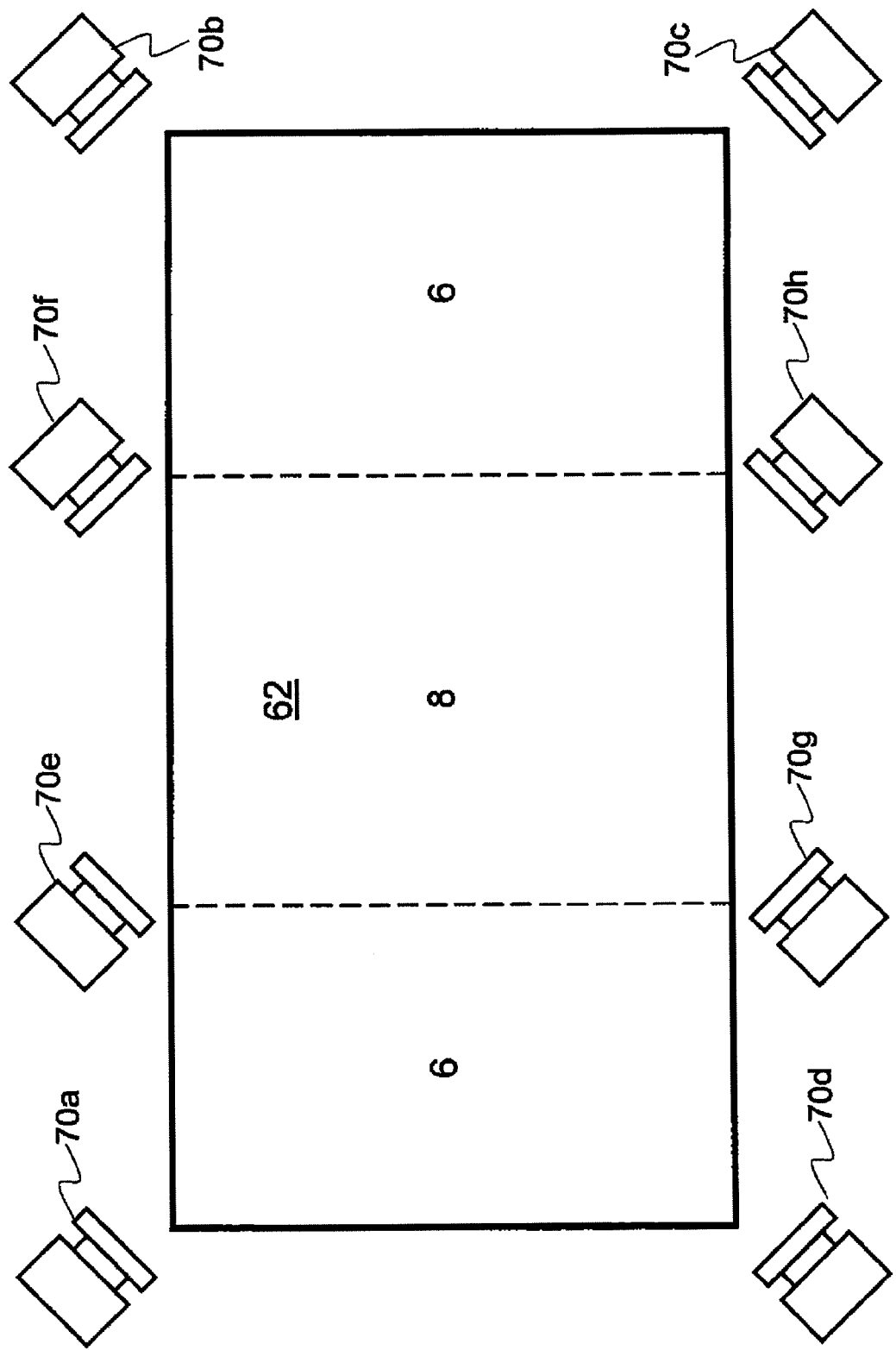

In FIG. 30, yet another alternative imaging device configuration for the interactive input system is shown. In this configuration, the interactive input system employs eight (8) imaging devices, with four imaging devices 70a, 70e, 70f, 70b being arranged along one major side of the input area 62 and with four imaging devices 70d, 70g, 70h, 70c being arranged along the opposite major side of the input area 62. Imaging devices 70a, 70b, 70c, 70d are positioned adjacent the corners of the input area and look generally across the entire input area. The intermediate imaging devices 70e, 70f, 70g, 70h along each major side of the input area are angled in opposite directions towards the center of the input area 62. This arrangement of imaging devices divides the input area into 3 input regions. The number in each input region identifies the number of imaging devices whose fields of view see the input region.

Figure 31:
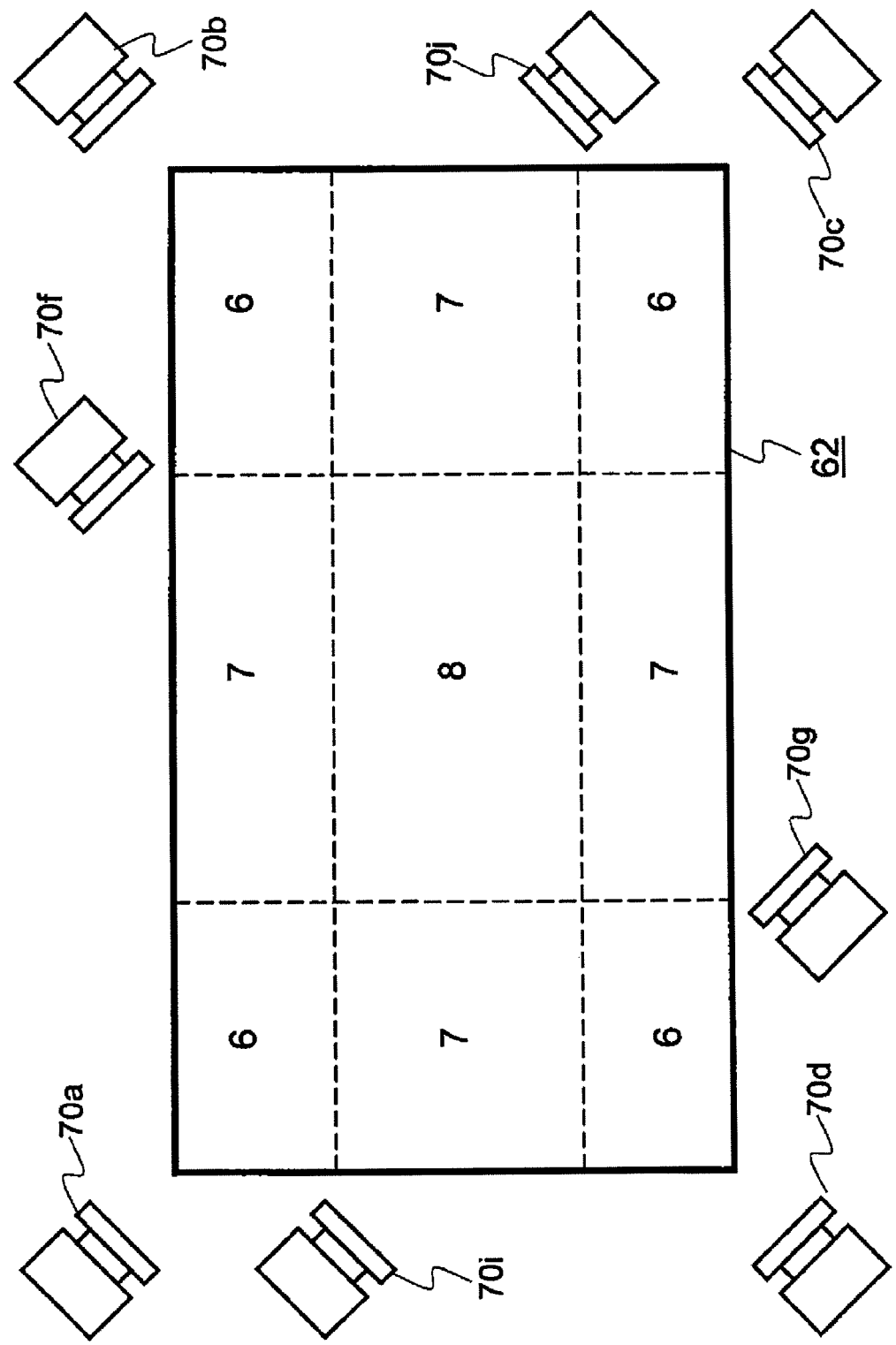

FIG. 31 shows yet another alternative imaging device configuration for the interactive input system. In this configuration, the interactive input system employs eight (8) imaging devices 70. Imaging devices 70a, 70b, 70c, 70d are positioned adjacent the corners of the input area 62 and look generally across the entire input area. Intermediate imaging devices 70f, 70g are positioned on opposite major sides of the input area and are angled in opposite directions towards the center of the input area 62. Intermediate imaging devices 70i, 70j are positioned on opposite minor sides of the input area 62 and are angled in opposite directions towards the center of the input area 62. This arrangement of imaging devices divides the input area into nine (9) input regions as shown. The number in each input region identifies the number of imaging devices whose fields of view see the input region.

Figure 32:
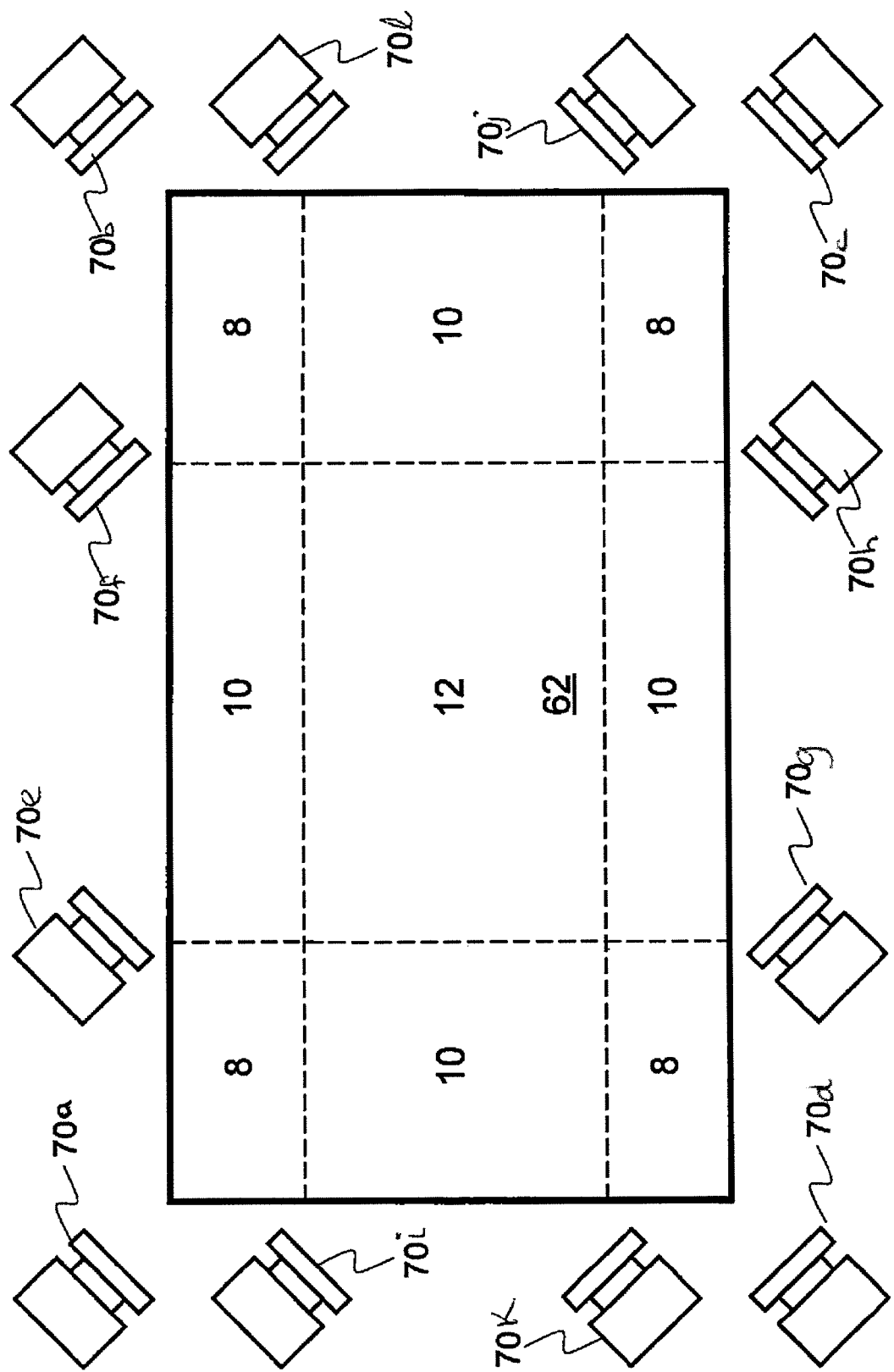

In FIG. 32, yet another alternative imaging device configuration for the interactive input system is shown. In this configuration, the interactive input system employs twelve (12) imaging devices. Imaging devices 70a, 70b, 70c, 70d are positioned adjacent the corners of the input area 62 and look generally across the entire input area 62. Pairs of intermediate imaging devices 70e and 70f, 70g and 70h, 70i and 70k, 70j and 70l are positioned along each side of the input area and are angled in opposite directions towards the center of the input area 62. This arrangement of imaging devices divides the input area into nine (9) input regions as shown. The number in each input region identifies the number of imaging devices whose fields of view see the input region.

Figure 33:
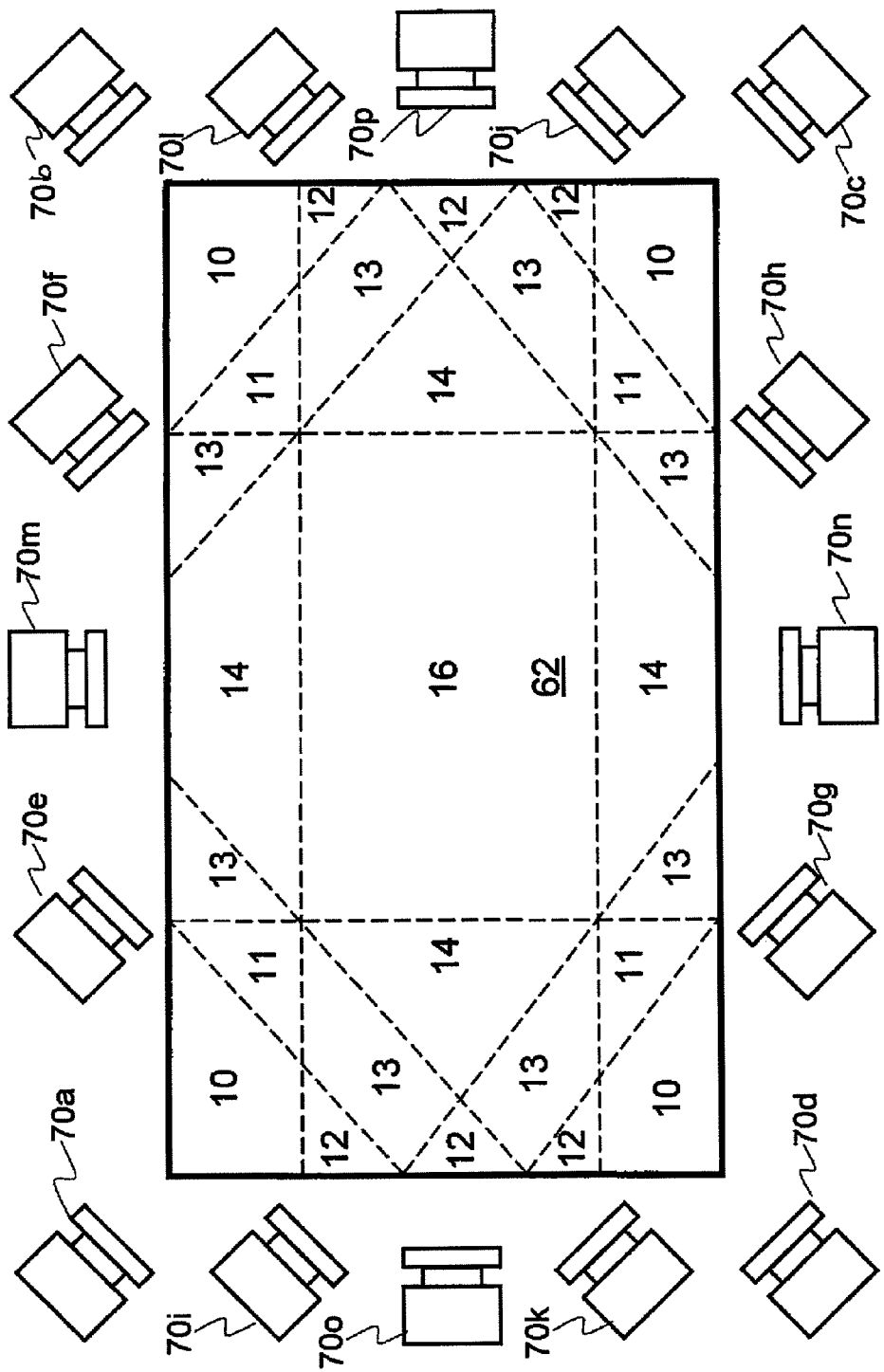

FIG. 33 shows yet another alternative imaging device configuration for the interactive input system. In this configuration, the interactive input system employs sixteen (16) imaging devices 70. Imaging devices 70a, 70b, 70c, 70d are positioned adjacent the corners of the input area and look generally across the entire input area. Pairs of intermediate imaging devices 70e and 70f, 70g and 70h, 70i and 70k, 70j and 70l are positioned along each side of the input area and are angled in opposite directions towards the center of the input area 62. Four midpoint imaging devices 70m, 70n, 70o, 70p are positioned at the midpoint of each side of the input area 62 and generally look across the center of the input area 62. This arrangement of imaging devices 70 divides the input area 62 into twenty-seven (27) input regions as shown. The number in each input region identifies the number of imaging devices whose fields of view see the input region.

Figure 34:
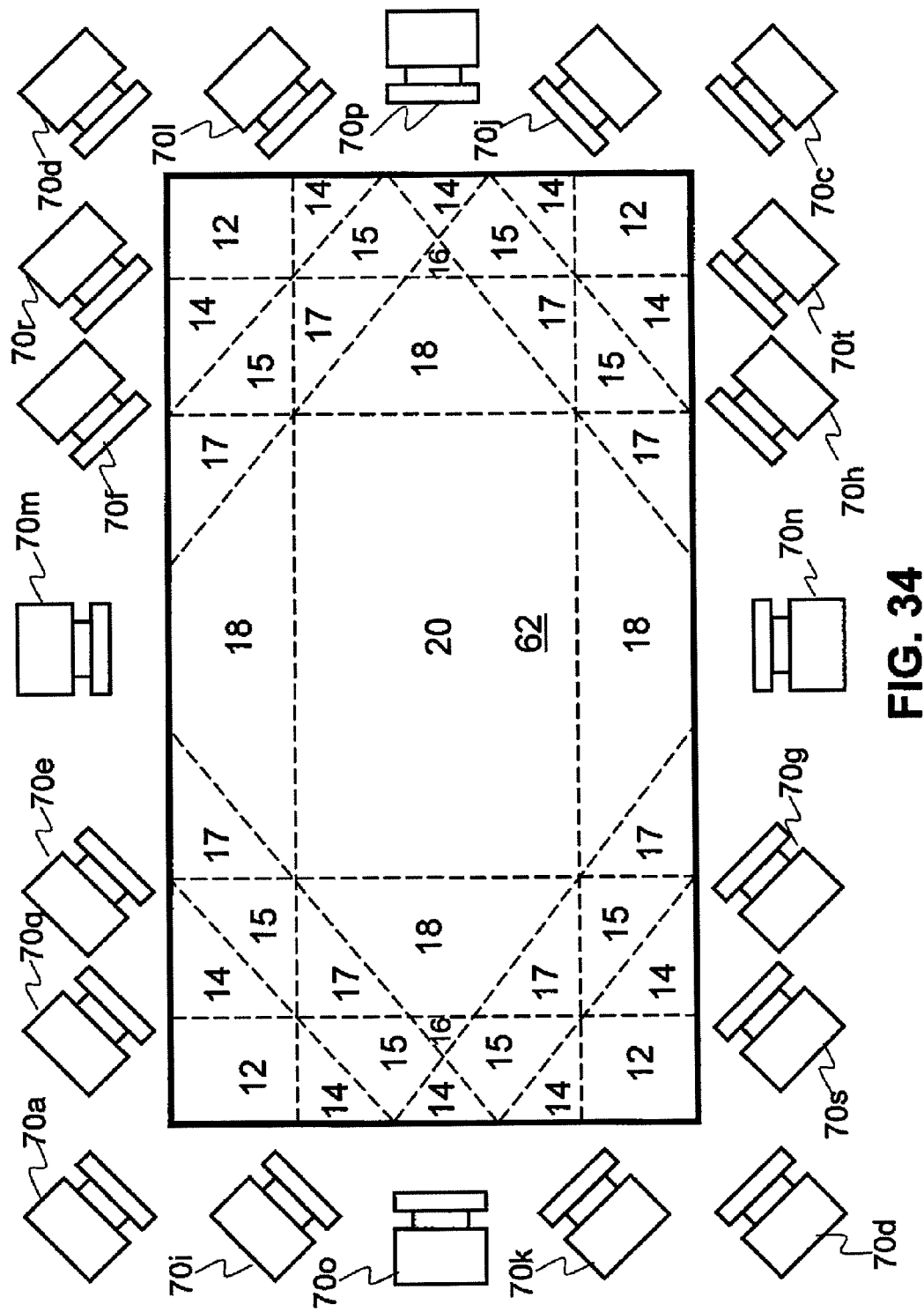

FIG. 34 shows yet another alternative imaging device configuration for the interactive input system. In this configuration, the interactive input system employs twenty (20) imaging devices 70. Imaging devices 70a, 70b, 70c, 70d are positioned adjacent the corners of the input area and look generally across the entire input area. Pairs of intermediate imaging devices 70e and 70f, 70g and 70h, 70i and 70k, 70j and 70l are positioned along each side of the input area and are angled in opposite directions towards the center of the input area 62. Two further intermediate imaging devices 70q, 70r, 70s, 70t are positioned along each major side of the input area 62 and are angled in opposite directions towards the center of the input area 62. Four midpoint imaging devices 70m, 70n, 70o, 70p are positioned at the midpoint of each side of the input area 62 and generally look across the center of the input area 62. This arrangement of imaging devices divides the input area into thirty-seven (37) input regions as shown. The number in each input region identifies the number of imaging devices whose fields of view see the input region.

Figure 35:
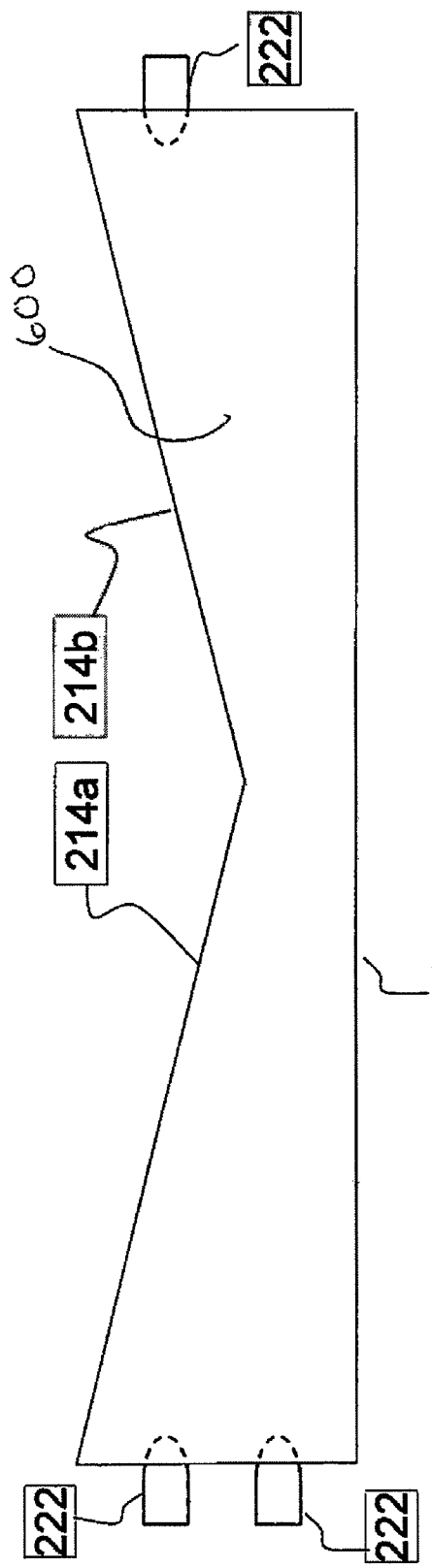
Figure 36:
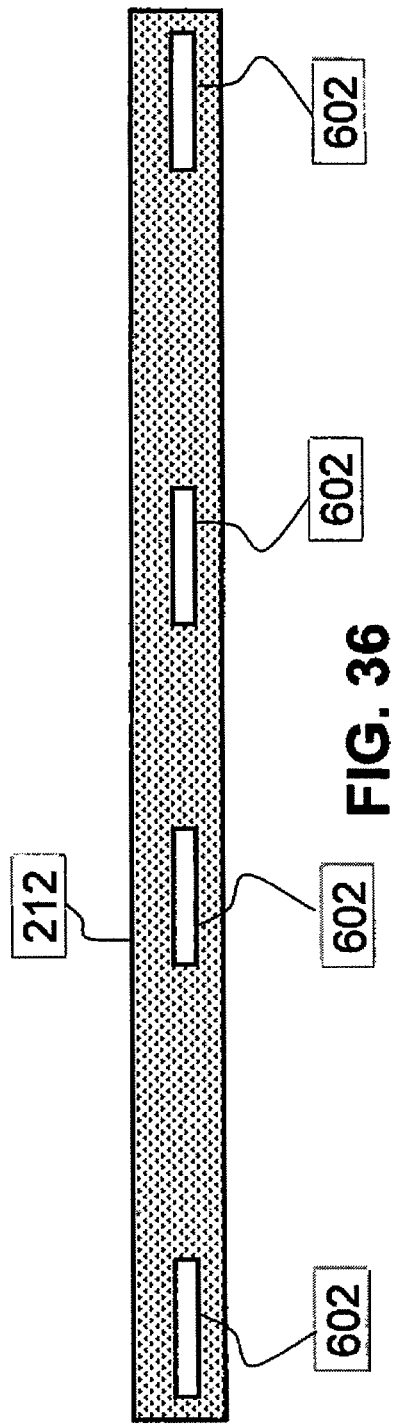

Although particular embodiments of the bezel segments have been described above, those of skill in the art will appreciate that many alternatives are available. For example, more or fewer IR LEDs may be provided in one or more of the bezel surfaces. For example, FIG. 35 shows an embodiment of the bezel segment generally identified by numeral 600 one surface accommodating a pair of IR LEDs 222a, 222b and the opposite surface accommodating a single IR LED 222c. If desired, rather than providing notches in the undersurface of the bezel segments, recesses 602 may be provided in the body of the bezel segments to accommodate the imaging devices as shown in FIG. 36. Of course a combination of notches and recesses may be employed.

Figure 38:
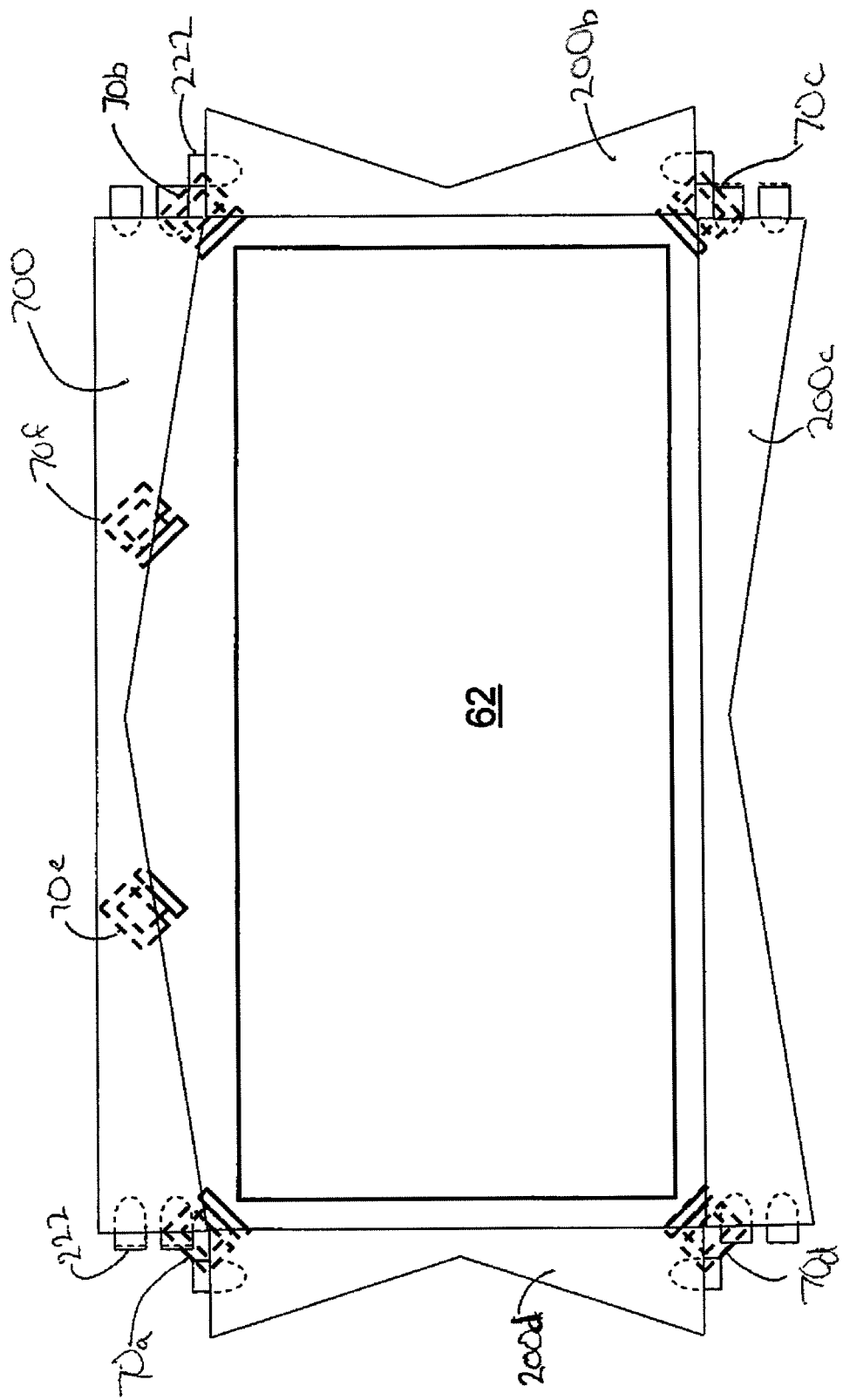
Figure 40:
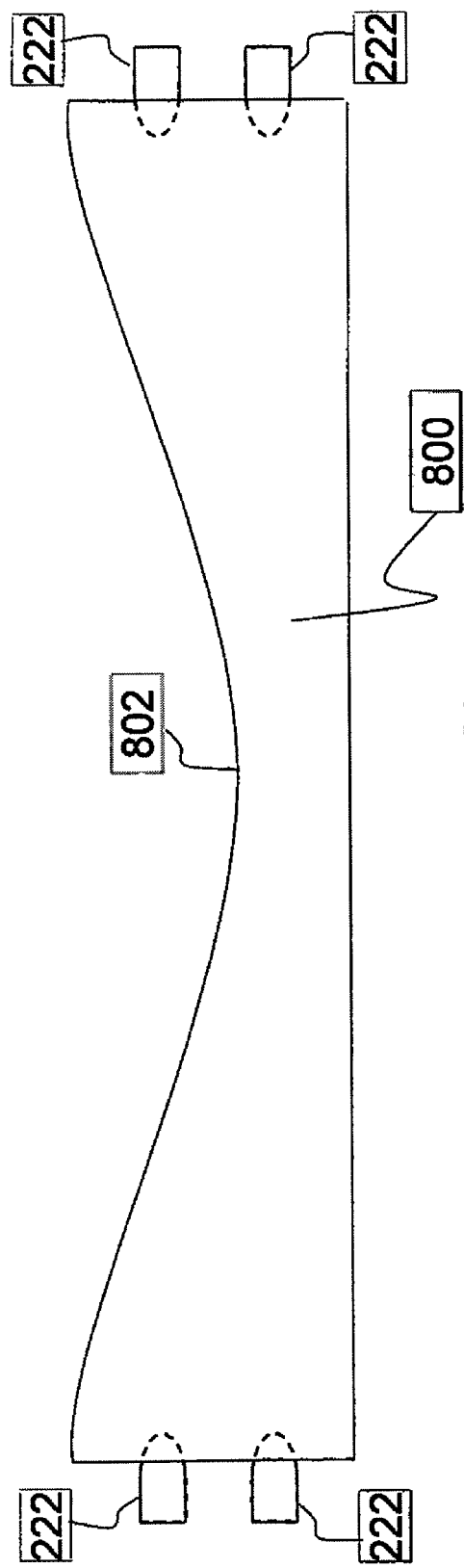

In the above embodiments, each bezel segment has a planar front surface and a v-shaped back reflective surface. If desired, the configuration of one or more of the bezel segments can be reversed as shown in FIG. 37 so that the bezel segment 700 comprises a planar reflective back surface 204 and a v-shaped front surface 702. Optionally, the v-shaped front surface could be diffusive. Alternatively, the v-shaped back surface could be diffusive and the planar front surface could be transparent. In a further alternative embodiment bezel 800, instead of using a v-shaped back reflective surface, a parabolic shaped back reflective surface 802 may be used as shown in FIG. 40 or other similarly shaped back reflective surfaces may be used. FIG. 38 shows the interactive input system employing an illuminated bezel formed of a combination of bezel segments. In particular, bezel segment 700 is of the type shown in FIG. 37 while bezel segments 200b to 200d are of the type shown in FIGS. 1 to 6. If desired, for bezel segment, supplementary IR LEDs 222a, 222b may be accommodated by bores formed in the planar reflective back surface as shown in FIG. 39. In this case, the supplementary IR LEDs 222a, 222b are angled towards the center of the bezel segment.

In a still further embodiment, the textured front surface 212 has a dimple pattern arranged such that the density of dimples 226 increases towards the center of the bezel segment 200a as shown in FIG. 11a. This dimple pattern allows more light to escape the center of the bezel segment as compared to the ends of the bezel segment. As will be appreciated, if such a dimple pattern was not provided on the diffusive front surface 212, the majority of light emitted by the IR LEDs 222 would exit the bezel segment adjacent the ends of the diffusive front surface 212 closest to the IR LEDs 222 and as a result, the bezel segment illumination would not appear uniform to the imaging devices 70a to 70f.

Although embodiments of the interactive input system have been shown and described above, those of skill in the art will appreciate that further variations and modifications may be made without departing from the spirit and scope thereof as defined by the appended claims.

What is claimed is:

1. An interactive input system comprising:
an input surface having at least two input areas;
a plurality of imaging devices having at least partially overlapping fields of view encompassing at least one input regions within the input area; and
a processing structure configured to process image data acquired by the imaging devices to track the position of at least two pointers within the input regions by:
identifying consistent candidates in the processed image data to facilitate resolving ambiguities between the pointers, each of the consistent candidates comprising observations located in image frames captured by all of the plurality of imaging devices having a field of view encompassing a target's input region;
determining the position of the consistent candidates by assigning a weight to the observations based on the clarity of the observations;
wherein the observations are clear when the imaging devices have a clear view of the observations and the consistent candidates are merged when the imaging devices have a merged view of a plurality of the observations, and
wherein a first weight is assigned to the clear observations, the first weight having predefined value, and a second weight is assigned to the merged observations, the second weight being less than the first weight.

2. The interactive input system of claim 1, wherein the processing structure further comprises an association procedure module to associate the consistent candidates with target associated with the at least two pointers.

3. The interactive input system of claim 2, wherein the processing structure further comprises a tracking procedure module for tracking the targets in the at least two input regions.

4. The interactive input system of claim 3, wherein the processing structure further comprises a state estimation module for determining locations of the at least two pointers based on information from the association procedure module and the tracking procedure module and image data from the plurality of imaging devices.

5. The interactive input system of claim 4, wherein the processing structure further comprises a disentanglement process module for, when the at least two pointers appears merged, determining locations for each of the pointers based on information from the state estimation module, the tracking procedure module and image data from the plurality of imaging devices.

6. The interactive input system of claim 1, wherein the processing structure uses weighted triangulation for processing the image data.

7. The interactive input system of claim 6, wherein weights are assigned to the image data from each of the plurality of imaging devices.

8. An interactive input system comprising:
an input surface defining an input area; and
at least three imaging devices having at least partially overlapping fields of view encompassing at least one input region within the input area;
a processing structure for processing images acquired by the imaging devices to determine the position of at least two pointers within the at least one input region by assigning a weight to observations in each image based on the clarity of the observation, the observations representative of the at least two pointers, and triangulate the positions of the at least two pointers based on each weighted observation;
wherein the observations are clear when the imaging devices have a clear view of the observations and the observations are merged when the imaging devices have a merged view of a plurality of the observations; and
wherein a first weight is assigned to the clear observations, the first weight having predefined value, and a second weight is assigned to the merged observations, the second weight being less than the first weight.

9. The interactive input system of claim 8, wherein the weighted triangulation resolves ambiguities in the observations.

10. In an interactive input system, a method of resolving ambiguities between at least two pointers in a plurality of input regions defining an input area comprising:
capturing images of a plurality of input regions, the images captured by a plurality of imaging devices having a field of view of a portion of the plurality of input regions;
processing image data from the images to identify a plurality of targets for the at least two pointers within the input area;
determining a state for each target of each image, the state indicating whether the target is clear or merged, wherein the target is clear when the imaging devices have a clear view of the target and the target is merged when the imaging devices have a merged view of a plurality of the targets;
assigning a weight to each target of each image based on the determined state, wherein a first weight is assigned to the image data for the clear target, the first weight having predefined value, and a second weight is assigned to the image data for the merged target, the second weight being less than the first weight; and
calculating a pointer location for each of the at least two pointers based on the weighted target data.

11. The method of claim 10, wherein the calculating is performed using weighted triangulation.

12. The method of claim 10 further comprising determining real and phantom targets associated with each pointer.

13. The method of claim 10, wherein the second weight is selected from a range of values, wherein a top value of the range of values is less than the first weight.

14. A non-transitory computer readable medium embodying a computer program for resolving ambiguities between at least two pointers in a plurality of input regions defining an input area in an interactive input system, the computer program code operable to:

- receive images of a plurality of input regions, the images captured by a plurality of imaging devices having a field of view of a portion of the plurality of input regions;
- process image data from the images to identify a plurality of targets for the at least two pointers within the input area;
- determine a state for each target of each image, the state indicating whether the target is clear or merged, wherein the target is clear when the imaging devices have a clear view of the target and the target is merged when the imaging devices have a merged view of a plurality of the targets;
- assign a weight to each target of each image based on the determined state, wherein a first weight is assigned to the image data for the clear target, the first weight having predefined value, and a second weight is assigned to the image data for the merged target, the second weight being less than the first weight; and
- calculate a pointer location for each of the at least two pointers based on the weighted target data.

* * * * *